United States Patent [19]

Shah

[11] 4,332,716

[45] Jun. 1, 1982

[54] POLYMER/POLYISOCYANATE COMPOSITIONS, PROCESSES FOR MAKING SAME AND PROCESSES FOR MAKING POLYURETHANE PRODUCTS THEREFROM

[75] Inventor: Naresh R. Shah, Nitro, W. Va.

[73] Assignee: Union Carbide Corporation, Danbury, Conn.

[21] Appl. No.: 215,097

[22] Filed: Dec. 10, 1980

[51] Int. Cl.$^3$ .................. C08G 18/14; C08G 18/63; C08K 5/05; C08K 5/16

[52] U.S. Cl. .................. 521/137; 525/127; 525/129; 528/75; 524/109; 524/195; 524/197; 524/377; 524/714; 524/752; 524/754; 524/762; 524/871; 524/873

[58] Field of Search .................. 528/75; 260/45.9 KB, 260/45.95 R, 45.95 S; 521/137; 525/127, 129

[56] References Cited

U.S. PATENT DOCUMENTS

| | | | |
|---|---|---|---|
| 3,422,165 | 1/1969 | Brotherton et al. | 260/859 |
| 3,654,106 | 4/1972 | Wagner et al. | 204/159.23 |
| 3,823,201 | 7/1974 | Pizzini et al. | 260/861 |
| 3,968,089 | 7/1976 | Cuscurida et al. | 260/859 R |
| 4,119,586 | 10/1978 | Shah | 521/137 |
| 4,122,049 | 10/1978 | Wagner | 521/136 |
| 4,148,840 | 4/1979 | Shah | 260/859 R |

FOREIGN PATENT DOCUMENTS

| | | |
|---|---|---|
| 50-149795 | 12/1975 | Japan . |
| 54-650091 | 4/1979 | Japan . |
| 1447273 | 8/1976 | United Kingdom . |

*Primary Examiner*—H. S. Cockeram
*Attorney, Agent, or Firm*—Paul W. Leuzzi, II

[57] ABSTRACT

Novel polymer/polyisocyanate compositions made by polymerizing at least one ethylenically unsaturated monomer in situ in a blend of a first organic polyisocyanate and a stabilizer. The stabilizer comprises a polyoxyalkylene polyol having a number average molecular weight of at least 4000; an isocyanato terminated prepolymer formed by reacting the polyoxyalkylene polyol and a second organic polyisocyanate with the proviso that the isocyanato terminated prepolymer and the first organic polyisocyanate provide greater than 25 equivalents of isocyanato groups per equivalent of hydroxyl groups; a polymer/polyol formed using the polyoxyalkylene polyol; a polymer/prepolymer formed using the polyoxyalkylene polyol with the proviso indicated for the prepolymer above; or a modified polyol containing an ester group formed using the polyoxyalkylene polyol. The novel compositions provide highly stable dispersions of polymer particles in the first organic polyisocyanate and are highly useful in the production of polyurethane products.

51 Claims, No Drawings

POLYMER/POLYISOCYANATE COMPOSITIONS, PROCESSES FOR MAKING SAME AND PROCESSES FOR MAKING POLYURETHANE PRODUCTS THEREFROM

FIELD OF THE INVENTION

This invention relates to novel polymer/polyisocyanate compositions that are reactive with active hydrogen organic compounds having two or more active hydrogen atoms per molecule to produce polyurethane products. The invention also relates to novel processes for making such compositions and to methods for making polyurethane products therefrom.

BACKGROUND OF THE INVENTION

Compositions containing polymers of ethylenically unsaturated monomers in polyisocyanates are described in U.S. and foreign patents and patent publications. Such prior art compositions have found little, if any, use commercially because of any one of many difficulties notably instability, excessive particle size, very high viscosity or the inability when reacted with active hydrogen-containing compounds to provide improved properties, e.g., high modulus to the resulting polyurethanes in those cases where the polymers were dissolved in or reacted with the polyisocyanate. In those instances where dispersions of the polymer in the polyisocyanate did result, the dispersions were relatively unstable and lacked sufficient usefulness in most modern techniques of polyurethane manufacture. A significant development in providing stable polymer/polyisocyanate dispersions is disclosed in U.S. Patent application Ser. No. 135,397, filed Mar. 31, 1980. This application discloses the preparation of stable polymer/polyisocyanate dispersions having beneficial utility in most modern techniques of polyurethane manufacture.

Polymer/polyol dispersions have been and currently are being used in the production of polyurethane products by mixing with polyisocyanates and other polyurethane-forming reagents and reacted to form the polyurethane product and serve as a convenient, efficient and economical means for improving resultant polyurethane properties. This procedure and the resulting polymer/polyol dispersions have been widely accepted by the polyurethane industry and continue to be extensively used throughout the industry.

As mentioned above, prior attempts have been made to make polymer dispersions in polyisocyanates and to use such dispersions in the manufacture of polyurethanes by reaction with active hydrogen compounds. It is believed that these attempts have met with little or no commercial success for a variety of reasons. With the exception of polymer/polyisocyanate dispersions disclosed in U.S. Patent application Ser. No. 135,397, filed Mar. 31, 1980, polymer/polyisocyanate dispersions obtained pursuant to the prior art teachings had very high viscosities at desirable polymer concentrations to be commercially feasible. The development of more sophisticated, higher speed and larger volume equipment, machines and systems for handling, mixing and reacting the polyurethane-forming ingredients have created the need for improvement in polymer/polyisocyanate, polymer/polyol and other dispersions used. The need for more stable dispersions has developed so that they can be stored until used without undergoing any significant settling or separation. Another criterion imposed by sophisticated equipment is the need for small particle sizes because large particles tend to damage the pumps employed in such equipment.

At one time there was not much concern for the viscosity or filterability of the polyurethane-forming reactants, i.e., the polymer/polyol and other dispersions in actual commercial practice. However, the state of the art of polyurethane production now has advanced to the point where these considerations are very important. There is now much concern with filterability and viscosity because of the more sophisticated machine systems now in use for large volume production. Also, the prior art dispersions could not be made in highly stable condition with the relatively low molecular weight polyisocyanates, thus rendering the lower molecular weight materials less desirable than the higher molecular weight materials as a component of the dispersions. The lower molecular weight materials, however, are of value in those instances where low viscosity is essential and for foams, coatings, adhesives and some types of sealants.

The present invention provides highly stable and highly filterable polymer/polyisocyanate compositions having low viscosity and beneficial utility in the manufacture of polyurethane products. It provides better dispersion stability than can be obtained by earlier procedures and eliminates or minimizes the expenses and hazards or difficulties accompanying some of the earlier techniques. The present invention also provides means for providing highly stable or reasonably stable polymer/polyisocyanate compositions having high polymer contents and the production of polyurethanes having improved physical properties. It also permits a wider selection of polyisocyanates and polymer contents to be used in the manufacture of stable polymer/polyisocyanate compositions. It also permits the use of polyisocyanates of lower viscosities to make polymer/polyisocyanate compositions with higher polymer contents in the dispersion without impairing stability. These and other advantages are obtained by polymerizing at least one ethylenically unsaturated monomer in situ in a blend of an organic polyisocyanate and a stabilizer.

Nowhere in the prior art currently known to us is there any disclosure or suggestion of the discovery of the advantages of the present invention in polymerizing at least one ethylenically unsaturated monomer in situ in a blend of an organic polyisocyanate and a stabilizer to form stably dispersed polymer particles in the organic polyisocyanate. U.S. Pat. No. 3,968,089 discloses the polymerization of ethylenically unsaturated monomers in a polyol-polyisocyanate prepolymer. U.S. Pat. No. 3,422,165 discloses polymer/polyisocyanate complex compositions formed by polymerizing ethylenically unsaturated monomers in polyisocyanates and also discloses the production of polyurethanes from such complex compositions. British Pat. No. 1,447,273 discloses polymer/polyisocyanate compositions formed by the polymerization of at least one ethylenically unsaturated monomer in an isocyanate. However, none of these prior art references and no prior art is currently known to us which discloses, teaches or suggests stable polymer/polyisocyanates having the advantageous properties of the compositions of this invention prepared by polymerizing at least one ethylenically unsaturated monomer in a blend of an organic polyisocyanate and a stabilizer as claimed and described herein.

SUMMARY OF THE INVENTION

The present invention provides polymer/polyisocyanate compositions that are highly stable and highly filterable. These compositions, in addition to being highly stable, can be highly fluid and substantially free of scrap and seeds. The polymer particles of the compositions of this invention are small in size, in a most preferred embodiment less than 30 microns in diameter. Polymer/polyisocyanate compositions can be made, according to this invention, with exceptionally low viscosities. They can also be made with relatively high polymer contents. Polymer/polyisocyanate compositions of this invention can be readily converted to polyurethane products of exceptional properties, including improved flexural modulii and improved indentation load deflections in the case of foams.

The above-mentioned deficiencies of the prior art can be overcome by this invention by the in situ polymerization of at least one ethylenically unsaturated monomer in a blend of an organic polyisocyanate and a stabilizer to form highly stable and highly filterable polymer/polyisocyanate compositions.

In its broad aspect, this invention achieves the above-mentioned advantages by providing stable liquid polymer/polyisocyanate compositions comprising: (1) a major amount of a first organic polyisocyanate; (2) a minor amount of a first polymer of at least one ethylenically unsaturated monomer stably dispersed in the first organic polyisocyanate; and (3) a minor amount of a stabilizer selected from the group consisting of: (a) a polyoxyalkylene polyol having a number average molecular weight of at least 4000, or (b) an isocyanato terminated prepolymer formed by reacting the polyoxyalkylene polyol and a second organic polyisocyanate with the proviso that the isocyanato terminated prepolymer and the first organic polyisocyanate are present in a relative amount that provides greater than 25 equivalents of isocyanato groups per equivalent of hydroxyl groups. The polyoxyalkylene polyol may contain stably dispersed therein a minor amount of a second polymer of at least one ethylenically unsaturated monomer to form a stabilizer consisting of a polymer/polyol or a polymer/prepolymer. In addition, the polyoxyalkylene polyol may be modified to contain an ester group.

The stable liquid polymer/polyisocyanate compositions are convertible by reaction with poly(active hydrogen) organic compounds to polyurethane products and are normally liquid at the temperature at which the composition is converted to the polyurethane product and also the temperature at which the polymer of the polymer/polyisocyanate composition is formed in situ from one or more ethylenically unsaturated monomers. The polymer/polyisocyanate compositions of this invention are preferably liquid at 25° C. The invention provides stable dispersions of small particles of solid polymers in the polyisocyanate by the in situ polymerization of at least one ethylenically unsaturated monomer in a blend of an organic polyisocyanate and a stabilizer. Another advantage of this invention is that a wider range of free radical catalysts can be used in the polymerization forming the final polymer/polyisocyanate without critically narrow limitations and without substantialy impairing stability or filterability. Azo catalysts or peroxide catalysts can be used as described or required and catalysts that are safer and easier to use are preferably selected.

This invention also relates to the process for making the highly stable and highly filterable polymer/polyisocyanate compositions which comprises polymerizing a minor amount of a first polymer of at least one ethylenically unsaturated monomer in a major amount of first organic polyisocyanate in the presence of an effective amount of a free radical catalyst and a minor amount of a stabilizer selected from the group consisting of (a) a polyoxyalkylene polyol having a number average molecular weight of at least 4000 and (b) an isocyanato terminated prepolymer formed by reacting the polyoxyalkylene polyol and a second organic polyisocyanate with the proviso that the isocyanato terminated prepolymer and the first organic polyisocyanate are present in a relative amount that provides greater than 25 equivalents of isocyanato groups per equivalent of hydroxyl groups. The polyoxyalkylene polyol may contain stably dispersed therein a minor amount of a second polymer of at least one ethylenically unsaturated monomer to form a stabilizer consisting of a polymer/polyol or polymer/prepolymer. In addition, the polyoxyalkylene polyol may be modified to contain an ester group. In a preferred form, the first organic polyisocyanate and stabilizer or the first organic polyisocyanate, stabilizer and free radical catalyst may be added in the form of a blend. The reaction temperature for the process can range from about 75° C. to about 140° C. The stabilizer, in an effective amount, improves the affinity of the polymer particles for the first organic polyisocyanate and provides a stable dispersion of the polymer particles therein.

The invention further relates to the method for making polyurethane products using the novel polymer/polyisocyanate compositions of this invention. These compositions can be converted by reaction with poly(active hydrogen) organic compounds to high flex modulus polyurethane elastomers and high ILD polyurethane foams. In addition, the polymer component of the compositions made pursuant to this invention also can function as a filler to add bulk to, decrease the FNCO content of and/or increase the viscosity of the polyisocyanate component thereof in those instances where it is desired to do so.

DESCRIPTION OF PREFERRED EMBODIMENTS

The novel polymer/polyisocyanate compositions of this invention are generally liquid, stable dispersions of polymers hereinafter also called the first polymer, in a blend comprising a major amount, preferably about 70 to 95 wt. %, more preferably about 75 to 90 wt. % and most preferably 80 to 90 wt. %, of an organic polyisocyanate, hereinafter also called the first or base organic polyisocyanate, and a minor amount, preferably about 5 to 30 wt. %, more preferably about 10 to 25 wt. % and most preferably 10 to 20 wt. %, of a stabilizer. The weight percents are based on the total weight of the organic polyisocyanate and the stabilizer in the composition.

The stabilizer can consist of a polyoxyalkylene polyol having a number average molecular weight of at least 4000, more preferably about 5000 and most preferably about 6000, or an isocyanate terminated prepolymer formed by reacting the polyoxyalkylene polyol and a second organic polyisocyanate with the proviso that the isocyanato terminated prepolymer and the first organic polyisocyanate are present in a relative amount that provides greater than 25 equivalents, more preferably greater than 30 equivalents and most preferably greater than 40 equivalents, of isocyanato groups per equivalent of hydroxyl groups. The polyoxyalkylene polyol may contain stably dispersed therein a minor amount of a second polymer of at least one ethylenically unsaturated monomer to form a polymer/polyol stabilizer or a polymer/prepolymer stabilizer. The polyoxyalkylene polyol may also contain an ester group to form a modified polyol stabilizer. The first and second organic polyisocyanate may be the same as or different from one another. Likewise, the first and second polymer may be the same as or different from one another. It should be noted that when either the isocyanato terminated prepolymer or the polymer/prepolymer is employed as the stabilizer, the preferred concentration range for the first organic polyisocyanate in the polymer/polyisocyanate composition may be reduced below the lower limit, below about 70 wt. %, provided that the isocyanato terminated prepolymer and the first organic polyisocyanate are present in a relative amount that provides greater than 25 equivalents of isocyanato groups per equivalent of hydroxyl groups. The number average molecular weights of the polyoxyalkylene polyols are used herein and are the theoretical (or apparent) values calculated from theoretical functionality and hydroxyl number. The true average molecular weights may be somewhat less, depending on how much the true functionality is below the starting or theoretical functionality. Obviously, in order to secure stable dispersions, all components should be compatible with each other.

The proportion of total polymer in the polymer/polyisocyanate compositions of this invention can preferably range from about 4 to about 35 wt. %, more preferably from about 10 to about 30 wt. % and most preferably from about 15 to about 25 wt. %. The weight percents are based on the total weight of the total polymer/polyisocyanate composition.

Substantially any of the organic polyisocyanates previously used in the art to make polymer/polyisocyanates can be used for the first and second organic polyisocyanates of this invention provided they meet the mutual compatibility requirement set forth above. The organic polyisocyanates that are useful in producing polymer/polyisocyanate compositions in accordance with this invention are organic compounds that contain at least two isocyanate groups. Illustrative of the organic polyisocyanates useful as the first and second organic polyisocyanates in producing the polymer/polyisocyanate compositions in accordance with this invention and the isocyanato terminated prepolymers and polymer/prepolymers used to make said compositions include: tolylene diisocyanates (TDI), such as the 2,4- and 2,6-isomers and their mixtures; methylene bis(phenylisocyanates), such as the 2,2'-, 2,4'- and 4,4'-isomers and mixtures thereof including 4,4'-diphenylmethylene diisocyanate (MDI) and 3,3'-diphenylmethylene diisocyanate and MDI modified with carboiimide linkages to liquify same; mixtures of TDI and polymeric MDI; m-phenylene diisocyanate; p-phenylene diisocyanate; 1,5-naphthalene diisocyanate; xylene-1,4-diisocyanate; xylylene-1,3-diisocyanate; bis(4-isocyanatophenyl)methane; bis(3-methyl-4-isocyanatophenyl)methane; trimethylhexamethylene diisocyanate; lysine diisocyanate methyl ester; methylene bis(cyclohexylisocyanate) and isomers and mixtures thereof; and polymethylene poly(phenyleneisocyanates) including polymeric MDI having the formula:

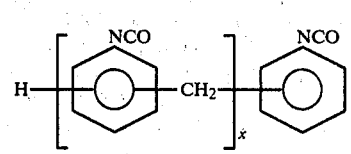

wherein x has an average value from 1.1 to 5 inclusive and mixtures thereof.

The preferred organic polyisocyanates used in the preparation of polymer/polyisocyanate compositions of this invention include tolylene diisocyanates (TDI) and isomeric mixtures, thereof, 4,4'-diphenylmethylene diisocyanate (MDI) including mixtures thereof, MDI modified with carboiimide linkages, and other polymethylene poly(phenyleneisocyanates) according to the above formula including polymeric MDI. Isocyanate mixtures of TDI and polymeric MDI are also preferred.

The polymerizable ethylenically unsaturated monomers which can be used for the first and second polymers in this invention to form the polymer/polyisocyanate compositions and the polymer/polyol stabilizer and polymer/prepolymer stabilizer used to make said compositions include the polymerizable ethylenically unsaturated hydrocarbon monomers and polymerizable ethylenically unsaturated organic monomers, the molecules of which are composed of carbon, hydrogen and at least one of halogen, O, S, or N. The monomers useful in the process of this invention are the polymerizable monomers characterized by the presence therein of at least one polymerizable ethylenic unsaturated group of the type C=C. The monomers can be used singly or in combination to produce homopolymer/polyisocyanate, copolymer/polyisocyanate or terpolymer/polyisocyanate reactive compositions.

These monomers are well known in the art and include the hydrocarbon monomers such as butadiene, isoprene, 1,4-pentadiene, 1,6-hexadiene, 1.7-octadiene, styrene, alphamethylstyrene, methylstyrene, 2,4-dimethylstyrene, ethylstyrene, isopropylstyrene, butylstyrene, phenylstyrene, cyclohexylstyrene, benzylstyrene, and the like, substituted styrenes such as cyanostyrene, nitrostyrene, N,N-dimethylaminostyrene, acetoxystyrene, methyl 4-vinylbenzoate, phenoxystyrene, p-vinyl diphenyl sulfide, p-vinylphenyl phenyl oxide, and the like; the acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate benzyl methacrylate, isopropyl methacrylate, octyl methacrylate, methacrylonitrile, ethyl alphaethoxyacrylate, methyl alphaacetaminoacrylate, butyl acrylate, 2-ethylhexyl acrylate, phenyl acrylate, phenyl methacrylate, acrylamide, N,N-dimethylacrylatmide, N,N-dibenzylacrylamide, N-butylacrylamide, methacrylyl formamide, acrylonitrile, and the like; vinylidene chloride; the vinyl esters, vinyl ethers, vinyl ketones, etc., such as vinyl acetate, vinyl alcohol, vinyl butyrate, isopropenyl acetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate dimethylaminoethyl methacrylate, glycidyl acrylate, allyl alcohol glycol monoesters of itaconic acid, vinyl pyridine, and the like. Any of the known polymerizable monomers can be used and the compounds listed above are illustrative and not restrictive of the monomers suitable for use in this invention. Any of the known chain transfer agents can be present if desired.

The preferred monomer used to make the polymers of the polymer/polyisocyanate compositions of this invention and the polymer/polyol stabilizer and polymer/prepolymerstabilizer is acrylonitrile alone as a homopolymer. The preferred copolymer of this invention is acrylonitrile and a monomer selected from the following: acrylamide, acrylic acide, methyl methacrylate, vinylidene chloride and styrene. The preferred terpolymer of this invention is acrylonitrile, acrylamide and acrylic acid.

The polyoxyalkylene polyols which can be used in this invention as a stabilizer for the polymer/polyisocyanate compositions or to form an isocyanato terminated prepolymer, a polymer/polyol, a polymer/prepolymer and a modified polyol, all of which are also stabilizers for the polymer/polyisocyanate compositions of this invention, include any compatible poly(active hydrogen) organic compound containing two or more active hydrogen atoms per molecule and having a number average molecular weight of at least 4000. Among the polyols which can be employed are those selected from one or more of the following classes of compositions, alone or in admixture, known to those skilled in the polyurethane art:

(a) alkylene oxide adducts of polyhydroxyalkanes having a number average molecular weight of at least 4000;

(b) Alkylene oxide adducts of non-reducing sugars and sugar derivatives, having a number average molecular weight of at least 4000;

(c) Alkylene oxide adducts of phosphorus and polyphosphorus acids, having a number average molecular weight of at least 4000;

(d) Alkylene oxide adducts of polyphenols having a number average molecular weight of at least 4000;

(e) The polyols from natural oils such as castor oil, and the like, having a number average molecular weight of at least 4000.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. A preferred class of alkylene oxide adducts of polyhydroxyalkanes are the ethylene oxide, propylene oxide, butylene oxide, or mixtures thereof, adducts of trihydroxyalkanes.

A further class of polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novolac resins, condensation products of various phenolic compounds and acrolein; the simplest member of this class being the 1,1,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenol) ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids, such as tripolyphosphoric acid, the polymethaphosphoric acids, and the like are desirable for use in this connection.

The polyols employed can have hydroxyl numbers which vary over a wide range. In general, the hydroxyl numbers of the polyols employed in this invention can range from about 20, and lower, to about 1200, and higher. The hydroxyl number is defined as the number of milligrams of potassium hydroxide required for the complete hydrolysis of the fully phthalated derivative prepared from 1 gram of polyols. The hydroxyl number can also be defined by the equation:

$$OH = \frac{56.1 \times 1000 \times f}{m.w.}$$

where
OH = hydroxyl number of the polyol
f = functionality, that is, average number of hydroxyl groups per molecule of polyol
m.w. = molecular weight of the polyol.

The most preferred class of polyols employed in the polymer/polyisocyanate compositions of this invention are the ethylene oxide and propylene oxide adducts such as the poly(oxyethylene) glycols, the poly(oxypropylene) glycols, triols and higher functionality polyols. These polyols also include poly(oxypropylene-oxyethylene) polyols; however, desirably, the oxyethylene content should comprise less than 80 percent of the total and preferably less than 60 percent. The ethylene oxide when used can be incorporated in any fashion along the polymer chain. Stated another way, the ethylene oxide can be incorporated either in internal blocks, as terminal blocks, or may be randomly distributed along the polymer chain. The preferred class of polyols may also be modified, by reaction with either dibasic acids such as dicarboxylic acid or anhydrides such as maleic anhydride and succinic anhydride, to include an ester group or additional unsaturation or both in accordance with the teachings of U.S. Pat. No. 3,652,639, U.S. Pat. No. 4,014,846 and U.S. Pat. No. 4,144,395. The preferred modified polyols used as stabilizers in the polymer/polyisocyanate compositions of this invention were prepared from the reaction of a polyoxyalkylene polyol having a number average molecular weight of at least 4000 and maleic anhydride or succinic anhydride. As is well known in the art, the polyols that are most preferred herein contain varying small amount of unsaturation. Unsaturation in itself does not affect in any adverse way the formation of the polymer/polyisocyanate compositions in accordance with the present invention. However, when selecting the amount and type of a high molecular weight polyol, other factors such as effects on foaming characteristics and foam and elastomer properties should be taken into consideration.

Catalysts useful in producing the polymer/polyisocyanate compositions of this invention are the free radical type of vinyl polymerization catalysts such as the peroxides, persulfates, perborates, percarbonates and the azo compounds or any other suitable free radical catalyst specified in the above-mentioned patents and application. Illustrative of a few such catalysts are 2,2'-azo-bis-isobutyronitrile, 2,2'-azo-bis(2,4-dimethylvaleronitrile), dibenzoyl peroxide, lauroyl peroxide, di-t-butyl peroxide, diisopropyl peroxide carbonate, t-butyl peroxy-2-ethylhexanoate, t-butylperperpivalate, 2,5-dimethylhexane-2,5-di-per-2-ethyl hexoate, t-butylperneodecanoate, t-butylperbenzoate, t-butylpercrotonate, t-butyl perisobutyrate, di-t-butyl perphthalate and the like. Azo bis (isobutyronitrile) is the preferred catalyst since it does not impart any objectionable product odor or require special handling in the plant because of possible hazards.

The catalyst concentration is not very critical and can be varied within wide limits. As a representative range in forming the polymer/polyisocyanate compositions, the concentration can vary from about 0.9 to about 5.0 weight percent, based upon the total feed (polyisocyanate, monomer(s) and stabilizer) to the reactor. Up to a certain point, increases in the catalyst concentration result in increased monomer conversion but further increases do not substantially increase conversion. On the other hand, increasing catalyst concentration increasingly improves product stability. The catalyst concentration selected will usually be an optimum value considering all factors, including costs.

The temperature range used in producing the polymer/polyisocyanate compositions of this invention is not narrowly critical and may vary from about 70° C. to about 140° C. the preferred range being from 90° C. to 130° C. The catalyst and temperature should be selected so that the catalyst has a reasonable rate of decomposition with respect to the hold-up time in the reactor for a continuous flow reactor or the feed time for a semi-batch reactor.

The preferred process used in producing the polymer/polyisocyanate compositions of this invention involves polymerizing the monomer(s) in the organic polyisocyanate while maintaining a low monomer to organic polyisocyanate ratio throughout the reaction mixture during the polymerization. This provides in the most preferred case polymer/polyisocyanate compositions in which essentially all of the polymer particles have diameters of less than 30 microns and generally less than one micron. Such low ratios are achieved by employing process conditions that provide rapid conversion of monomer to polymer. In practice, a low monomer to polyisocyanate ratio is maintained, in the case of semi-batch and continuous operation, by control of the temperature and mixing conditions and, in the case of semi-batch operation, also by slowly adding the monomers to the polyisocyanate. The process can be carried out in various manners such as by a semi-batch reactor, a continuous backmixed stirred tank reactor, etc. For the latter, a second stage may be used to incrementally increase the conversions of monomers. The mixing conditions employed are those attained using a back-mixed reactor (e.g., a stirred flask or stirred autoclave). Such reactors keep the reaction mixture relatively homogeneous and so prevent localized high monomer to polyisocyanate ratios such as occur in certain tubular reactors (e.g., in the first stages of "Marco" reactors when such reactors are operated conventionally with all the monomer added to the first stage).

When using a semi-batch process, the feed times can be varied (as well as the proportion of polyisocyanate in the reactor at the start versus polyisocyanate fed with the monomer) to effect changes in the product viscosity. Generally, longer feed times result in higher product viscosities.

The preferred temperature used in producing the polymer/polyisocyanate compositions in accordance with this invention is any temperature at which the half life of the catalyst at that temperature is not longer than about 25 percent of the residence time of the reactants and catalyst in the reactor. As an illustration, the half life of the catalyst at a given reaction temperature may be no longer than six minutes (preferably no longer than from 1.5 to 2 minutes) when the residence time is 24 minutes or greater. The half lives of the catalysts become shorter as the temperature is raised. By way of illustration, azo-bis-isobutyronitrile has a half life of 6 minutes at 100° C. and, thus, the residence time should be at least 24 minutes. The maximum temperature used is not critical but should be lower than the temperature at which significant decomposition of the reactants or thermal abuse of isocyanates or discoloration of the product occurs. At any high temperature (greater than 90° C.), the prolonged exposure of isocyanates should be minimized. From this viewpoint the continuous process having reasonably shorter residence time for polymerization and stripping is preferred.

In the process used to produce the polymer/polyisocyanate compositions of this invention, the monomers are polymerized in the organic polyisocyanate. Usually, the monomers are soluble in the organic polyisocyanate. When the monomers are not soluble in the organic polyisocyanates, known techniques (e.g., dissolution of the insoluble monomers in another solvent) may be used to disperse the monomers in the organic polyisocyanate prior to polymerization. The conversion of the monomers to polymers achieved by this process is remarkably high (e.g., conversions of at least 72% to 95% of the monomers are generally achieved). It is understood that the solvent is nonreactive with the isocyanate.

The process of this invention produces polymer/polyisocyanate compositions which are highly stable, have small polymer particle sizes, are free from troublesome scrap and seeds, have good filterability and are convertible to highly useful polyurethane elastomers and foams. The viscosities (25° C.—Brookfield) of the polymer/polyisocyanate compositions of this invention are less than 60,000 cps, preferably not greater than 30,000 cps, more preferably not greater than 20,000 cps and most preferably not greater than 10,000 cps. The polymer/polyisocyanate compositions of this invention are stable dispersions such that essentially all of the polymer particles remain suspended on standing over periods of several months without showing any significant settling.

The final polymer/polyisocyanate compositions of the present invention comprise dispersions in which the polymer particles (the same being either individual particles or agglomerates of individual particles) are relatively small in size and, in the most preferred embodiment are all essentially less than 30 microns or even as small as 1 micron or less. Thus, essentially all of the product (viz. about 99 percent or more) will pass through the filters employed in the filtration test that is described in conjunction with the Examples. It is preferable that 100% of a polymer/polyisocyanate composition pass through a 150-mesh screen, more preferable that 100% of a polymer/polyisocyanate composition pass through a 325-mesh screen, and most preferable that 100% of a polymer/polyisocyanate composition pass thorugh a 700-mesh screen. This insures that the polymer/polyisocyanate products can be successfully procssed in all types of the relatively sophisticated machine systems now in use for large volume production of polyurethane products, including those employing impingement-type mixing which necessitate the use of filters that cannot tolerate any significant amount of relatively large particles. Less rigorous applications are satisfied when about 50 percent of the product passes through the filters. Some applications may also find useful products in which only about 20 percent passes through. Accordingly, the polymer/polyisocyanates of the present invention contemplate products in which at least 20 percent pass through the filters, preferably at least 50 percent, and most preferably, essentially all.

The polymer concentration of the final polymer/polyisocyanate compositions of this invention can be adjusted by the addition of additiona organic polyisocyanate to provide the polymer concentration suitable for the desired end use. In this manner, the polymer/polyisocyanate compositions can be produced at polymer concentrations of, for example, 20% and reduced to polymer concentrations as low as 4% by the addition of more organic polyisocyanate or, alternatively, the composition can be made directly with a polymer concentration of 4% by the method of this invention.

The isocyanato terminated prepolymers and the polymer/prepolymers used as stabilizers in the polymer/polyisocyanate compositions of this invention may be prepared in accordance with the teachings of U.S. Patent 3,968,089. The polymer/polyols used as stabilizers in the polymer/polyisocyanate compositions of this invention may be prepared in accordance with the teachings of U.S. Pat. No. Re. 28,715, 29,014 and 29,118.

The present invention also provides novel polyurethane products made with the novel polymer/polyisocyanate compositions and novel methods for producing such products. The novel polyurethane products are prepared by reacting (a) a polymer/polyisocyanate composition of this invention, (b) a poly(active hydrogen) organic compound, and (c) a catalyst for the reaction of (a) and (b) to produce the polyurethane product, and, when a foam is being prepared, a blowing agent and usually a foam stabilizer. The reaction and foaming operations can be performed in any suitable manner, preferably by the one-shot technique, although the prepolymer technique can be used if desired.

The poly(active hydrogen) organic compound useful for reaction with the polymer/polyisocyanate compositions of this invention include any compatible organic compound containing two or more active hydrogen atoms per molecule. The poly(active hydrogen) compounds are well known to those skilled in the polyurethane art and include the polycarboxylic organic acids, polyamino compounds, and polyhydroxy compounds, e.g., polyhydroxy polyesters, organic polyols and the like.

Substantially any of the polyols previously described as suitable for the polyoxyalkylene polyol stabilizer or the isocyanato terminated prepolymer, polymer prepolymer, polymer/polyol and modified polyol stabilizers made therefrom can be used and are preferred as the poly(active hydrogen) organic compounds in this invention. However, the poly(active hydrogen) organic compounds do not necessarily require nor possess a number average molecular weight of at least 4000. The exact polyol employed depends upon the enduse of the polyurethane product to be produced. The molecular weight or the hydroxyl number is selected properly to result in flexible or semiflexible polyurethane foams or elastomers. The polyols preferably possess a hydroxyl number of from about 50 to about 150 for semi-flexible foams, and from about 25 to about 70 for flexible foams. Such limits are not intended to be restrictive, but are merely illustrative of the large number of possible combinations of the above polyol coreactants.

The catalysts that are useful in producing polyurethanes in accordance with this invention includ: (a) tertiary amines such as bis(dimethylaminoethyl) ether, 3-dimethylamino-N,N-dimethylpropionamide, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, diethanolamine, triethanolamine, 1,4-diazabicyclo[2.2.2]-octane, pyridine oxide and the like, (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicyclaldehyde, cyclopentanone-2-carboxylate, acetylacetoneimine, bis-acetylacetonealkylenediimines, saliscyclaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, betadiketones, and 2-(N,N-dialkylamino) alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

The organotin compounds deserve particular mention as catalysts for catalyzing the polyurethane-forming reactions. These compounds include the dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, cibutyltin-bis-(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts, e.g., the organotin catalysts. Metal catalysts, or combinations of metal catalysts, may also be employed as the accelerating agents, without the use of amines. The catalysts for catalyzing the polyurethane-forming reaction are employed in small amounts, for example, from about 0.001 percent to about 5 percent, based on the combined wiehgt of the polyisocyanate and the polyester diol.

Other additives can also be used in the manufacture of the polyurethanes of this invention. For example, other fillers, such as calcium carbonate can be added for the purpose of enhancing modulus or reducing cost. The amounts of fillers used can range from 0 to 250 pph (parts per hundred parts) of polymeric materials (e.g., poly(active hydrogen) compound and polymer/polyisocyanate). Additionally, mold release agents, such as zinc stearate, can be used in amounts ranging from 2 to 4 pph based on the combined weights of polymeric materials. Additionally, reinforcing agents, such as glass powder, tiny glass bubbles, and preferably glass fibers 1/32" to ¼" long can be added. The amount of reinforcing agents ranges from 0 to 70 wt.%, preferably about 5 to 70 wt.%, based on the combined weight of the three above-mentioned reactants. Thickeners such as MgO can also be used in amounts ranging from 0 to 2 pph based on the combined weight of the three above-mentioned reactants. Any other additives such as pigments conventionally employed in polyurethane technology can be added in conventional proportions. The pph's and weight percentages given above for the additives are merely representative and amounts of additives outside of these ranges can provide acceptable results.

The distinction between polyurethane foams and elastomers is not sharply defined because all foams and most elastomers contain a gas phase. The foams in general have densities of less than 10 pounds per cubic foot and elastomers, in general, have densities above that value. Microcellular elastomers intended for energy absorbing applications, e.g., as automotive bumpers, generally are made with densities of 10 to 40 pounds per cubic foot whereas microcellular elastomers intended for other applications, e.g., bumper rub strips, bumper guards, side moldings, appliques and the like where energy absorption is not the prime consideration generaly are made with densities of 40 to 60 pounds per cubic foot. Solid, unfoamed polyurethanes usually have a density of about 72 pounds per cubic foot. The densities of the above-described polyurethanes can be increased by the addition of inert fillers such as glass fibers. Such inert fillers provide improved physical properties such as increased modulus. All of these compositions, i.e., foams, microcellular and solid, filled or unfilled, can be made by the present invention.

When the product being formed is microcellular or solid, an extender can also be added to improve the load bearing and modulus properties of the composition. Extenders are not normally used in the production of flexible foams, although they can be added, if desired. Suitable extenders include low molecular weight polyols including ethylene glycol, diethylene glycol, 1,4-butanediol and the aromatic glycols, reaction products of alkylene oxides with aromatic amines or alcohols having two active hydrogens. Suitable aromatic glycols are the reaction products of alkylene oxides with amino aryl compounds and dihydroxyaryl compounds, and preferably are the reaction products of ethylene oxide and aniline. Other suitable aromatic glycols include the ethylene oxide and propylene oxide adducts of bisphenol A and the propylene oxide adducts of aniline. Additional suitable extenders are the aromatic amines such as 4,4'-methylene bis(2-chloroaniline) and phenol-aromatic amine-aldehyde resins which are made by the reaction of a phenol-aromatic amine-aldehyde resins which in turn are made by the reaction of a phenol such as phenol or substituted phenols having at least one unsubstituted reactive position on the aromatic nucleus, an aldehyde such as formaldehyde or other aliphatic aldehydes and an aromatic amine such as aniline or other aromatic amines having at least one or two amino hydrogens and no or one nitrogen-bonded alkyl group and at least one unsubstituted position ortho or para to the amino group.

When the product being formed is a polyurethane foam product, this may be accomplished by employing a small amount of a blowing agent, such as $CO_2$ produced by water included in the reaction mixture (for example, from about 0.1 to about 5 weight percent of water, based upon total weight of the total reaction mixture, i.e., poly(active hydrogen) compound, polymer/polyisocyanates, catalysts and other additives), or through the use of blowing agents which are vaporized by the exotherm of the reaction, or by a combination of the two methods. Illustrative blowing agents include halogenated hydrocarbons such as trichloromonofluoromethane, dichlorodifluoromethane, dichlormonofluoromethane, dichloromethane, trichloromethane, 1,1-dichloro-1-fluoroethane, 1,1,2-trichloro-1,2,2,-trifluoromethane, hexafluorocyclobutane, octafluorocyclobutane, and the like. Another class of blowing agents include thermally unstable compounds which liberate gases upon heating, such as N,N'-dimethyl-N,N'-dinitrosoterephthalmide, and the like. The quantity of blowing agent employed will vary with factors such as the density desired in the foamed product. It is also within the scope of the invention to employ small amounts, e.g., about 0.01 percent to 5.0 percent by weight, based on the total reaction mixture, of a foam stabilizer such as a "hydrolyzable" polysiloxane-polyoxyalkylene block copolymer such as the block copolymers described in U.S. Pat. Nos. 2,834,748 and 2,917,480. Another useful class of foam stabilizers are the "nonhydrolyzable" polysiloxane-polyoxyalkylene block copolymers such as the block copolymers described in U.S. Pat. No. 3,505,377; U.S. Patent Application Ser. No. 888,067, filed Dec. 24, 1969, and British Patent Specification No. 1,220,471. A preferred foam stabilizer for high resilience polyurethane foam formulation is a polysiloxane composition within the scope of U.S. Pat. No. 3,741,917. These various polysiloxane-polyoxyalkylene block copolymers preferably contain from 5 to 50 weight percent of polysiloxane polymer with the remainder being polyoxyalkylene polymer.

Polyurethanes produced according to this invention are useful in the application in which conventional polyurethanes are employed such as in the manufacture of arm rests, crash pads, mattresses, automobile bumpers and carpet underlays. The flex modulus of polyurethanes made with polymer/polyisocyanate compositions of this invention is improved in those instances where the polymer portion of said compositions has a glass transition temperature, $T_G$, of about 85° C. or more. When the polymer has a $T_G$ of less than 85° C., polyurethane products having other useful properties are obtained. Changes in the $T_G$ can be brought about by changes in polymer composition.

The following examples are illustrative of the present invention and are not intended as a limitation upon the scope thereof. Unless otherwise indicated, all parts are by weight.

Definitions

As used in the Examples appearing hereinafter, the following designations, terms and abbreviations have the indicated meanings:

Calc.: calculated.
cps: centipoise.
Conc.: concentration.
Viscosity: viscosity in cps as determined at 25° C. on a Brookfield viscosimeter, unless otherwise indicated.
gm: gram.
hr: hour.
wt.: weight.
mg: milligram.
min.: minute.
sec.: second.
ft.: foot.
lbs.: pounds.
pbw: parts by weight.
% or percent: percent by weight unless otherwise specified.
ratios: are on a weight basis unless otherwise specified.
temperatures: are given in °C. unless otherwise stated.
psig: pounds per square inch gauge pressure.
pli: pounds per linear inch.
psi: pounds per square inch.
monomer: ethylenically unsaturated monomer.
Residual Monomer: unreacted monomer.
rpm: revolutions per minute.
TMSN: tetramethylsuccinonitrile, a decomposition product of VAZO-64.
Cat.: catalyst.
VAZO-64 or VAZO: 2,2'-azo-bis-isobutyronitrile.
TBPO: 50 wt. % t-butyl per-2-ethylhexoate(tert-butyl peroctoate) in dioctyl phthalate.
Numbered Examples illustrate this invention.
Lettered Examples are comparative Examples which do not illustrate the invention or are Examples illustrating the properties of ingredients used in numbered Examples.
Runs illustrate attempts to carry out the invention which were not successful for one reason or another.
G-C: gas chromatographic analysis.
hydroxyl number: calculated hydroxyl number based on total polymer content, if present and polyol content.

FNCO: free NCO content in weight percent based on weight of the polyisocyanate.
ΔNCO difference between FNCO calculated and FNCO measured.
ppm: parts by weight per million parts by weight.
Ethylenically unsaturated monomers used in the Examples are identified as follows:
A: acrylonitrile.
AM: acrylamide.
AA: acrylic acid.
MMA: methyl methacrylate.
VCl$_2$: vinylidene chloride.
S: styrene.

The polyisocyanates used in the Examples are identified as follows:
MDI: 4,4'-diphenylmethylene diisocyanate.
Liquid MDI: modified 4,4'-diphenylmethylene diisocyanate modified with carbodiimide linkages to liquefy same.
Polymeric MDI: polymeric diphenylmethylene diisocyanates having the formula

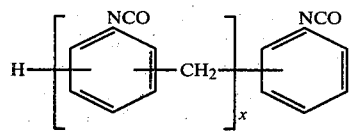

wherein x has an average value of 1.1 to 5.
TDI: a mixture of 80% 2,4-tolylene diisocyanate and 20% 2,6-tolylene diisocyanate.
Isocyanate I: a polymeric MDI having a calculated equivalent weight of about 140 and a FNCO of about 30 wt.% sold by Upjohn as Isonate-191.
Isocyanate II: a liquid MDI having a calculated equivalent weight of 144 and a FNCO of 29.2 wt.% sold by Upjohn as Isonate-143L.
Isocyanate III: a polymeric MDI having a calculated equivalent weight of about 140 and a FNCO of 30.06 wt.% sold by Upjohn as Isonate PAPI.
Isocyanate IV: a polymeric MDI having a calculated equivalent weight of about 135, a FNCO of about 31.5 wt.%, a Brookfield viscosity of 250 cps at 25° C. and sold as PAPI-135 by Upjohn.
Isocyanate V: a mixture of about 80 pbw TDI and about 20 pbw of a polymeric MDI having an equivalent weight of about 133, a FNCO of about 31.5 wt.%, a Brookfield viscosity of about 275 cps at 25° C. and sold by Mobay Chemical Corporation as Mondur E-422.
Isocyanate VI: a polymeric MDI having a calculated equivalent weight of about 140 and a FNCO of about 30.0 wt.% sold by Mobay Chemical Corporation as Mondur MR.
The polyols used in the Examples are identified as follows:
Polyol I: a polypropylene oxide diol made from propylene oxide and dipropylene glycol and having a theoretical number average molecular weight of about 2000 and a hydroxyl number of about 55.65.
Polyol II: a polypropylene oxide diol made from propylene oxide and dipropylene glycol and having a theoretical number average molecular weight of about 3000 and a hydroxyl number of about 37.69.
Polyol III: a polypropylene oxide diol made from propylene oxide and dipropylene glycol and having a theoretical number average molecular weight of about 4000 and a hydroxyl number of about 27.9.

Polyol IV: a polypropylene oxide-polyethylene oxide triol made from propylene and ethylene oxides and glycerine and having a theoretical number average molecular weight of about 4950 and a hydroxyl number of about 36.2. The alkylene oxide units are present primarily as blocks and the end units are substantially all ethylene oxide units, i.e., the ethylene oxide is used to cap the triol. Based on its total weight, this triol contains about 14 wt.% $C_2H_4O$.

Polyol V: a polypropylene oxide-polyethylene oxide triol made from propylene and ethylene oxides and glycerine and having a theoretical number average molecular weight of about 6000 and a hydroxyl number of about 28.09. The alkylene oxide units are present primarily in blocks and the end units are substantially all ethylene oxide units, i.e., the ethylene oxide is used to cap the triol. Based on its total weight, this triol contains about 14 wt.% $C_2H_4O$.

Polyol VI: a polypropylene oxide-polyethylene oxide polyol made from propylene oxide and ethylene oxide and an 80/20 blend by weight of sorbitol and glycerine, having a theoretical number average molecular weight of about 10,800 and a hydroxyl number of about 29.55. The alkylene oxide units are present primarily in blocks, and the end units are substantially all ethylene oxide units, i.e., the ethylene oxide is used to cap the polyol. The polyol contains about 8.6 wt.% ethylene oxide units based on the total polyol weight.

The prepolymers used in the Examples are identified as follows:

Prepolymer I: a prepolymer of about 60 pbw Isocyanate II and about 40 pbw Polyol V and having a FNCO of about 16.39 wt.% and a Brookfield viscosity of 1110 cps at 25° C.

Prepolymer II: a prepolymer of about 60 pbw Isocyanate I and about 40 pbw Polyol V and having a FNCO of about 17.04 wt.% and a Brookfield viscosity of 1424 cps at 25° C.

Prepolymer III: a prepolymer of about 60 pbw Isocyanate VI and about 40 pbw Polyol V and used in the preparation of IPRE-3.

The polymer/polyol used in the Examples is identified as follows:

Polymer/Polyol I: a polymer/polyol containing about 16.0 wt.% polyacrylonitrile polymerized in Polyol V and having a hydroxyl number of about 22.09 and a Brookfield viscosity of 3100 cps at 25° C.

The polymer/prepolymers used in the Examples are identified as follows:

Polymer/Prepolymer I: a polymer/prepolymer containing about 18.0 wt.% of polyacrylonitrile polymerized in Prepolymer II and having a FNCO of about 12.94 wt.% and a Brookfield viscosity of 9340 cps at 25° C.

Polymer/Prepolymer II: a polymer/prepolymer containing about 17.35 wt.% of polyacrylonitrile polymerized in Prepolymer I and having a FNCO of about 12.59 wt.% and a Brookfield viscosity of 9400 cps at 25° C. (the reaction product of comparative Example M).

Polymer/Prepolymer III: a polymer/prepolymer containing about 60 pbw of Isocyanate I and about 40 pbw Polymer/Polyol I and used in the preparation of ICPPPB-1 and ICPPPB-2.

The modified polyols used in the Examples are identified as follows:

Modified Polyol I: a polyol adduct prepared from the reaction of 0.5 mole of Polyol V and 1.0 mole of maleic anhydride. The adduct has an acid number of 7.23 mg KOH/gm and a Brookfield viscosity of 2068 cps at 25° C.

Modified Polyol II: a polyol adduct prepared from the reaction of 0.5 mole of Polyol V and 1.0 mole of maleic anhydride. The adduct has an acid number of 7.77 mg KOH/gm and a Brookfield viscosity of 2120 cps at 25° C.

Modified Polyol III: a polyol adduct prepared from the reaction of 0.5 mole of Polyol IV and 1.0 mole of maleic anhydride. The adduct has an acid number of 12.51 mg KOH/gm and a Brookfield viscosity of 1172 cps at 25° C.

Modified Polyol IV: a polyol adduct prepared from the reaction of 0.5 mole of Polyol V and 1.0 mole of maleic anyhydride. The adduct has an acid number of 13.09 mg KOH/gm and a Brookfield viscosity of 2492 cps at 25° C.

Modified Polyol V: a polyol adduct prepared from the reaction of 0.5 mole of Polyol V and 1.0 mole of succinic anhydride. The adduct has an acid number of 13.70 mg KOH/gm and a Brookfield viscosity of 2850 cps at 25° C.

Isocyanate/polyol blends used in the Examples are identified as follows:

IPOL-1: a blend of about 80 pbw Isocyanate I and about 20 pbw Polyol V having a FNCO of about 23.27 wt.%, a Brookfield viscosity of 319 cps at 25° C. and an acidity as HCl of 0.013 wt.%.

IPOL-2: a blend of about 85 pbw Isocyanate I and about 15 pbw Polyol V having a FNCO of about 23.75 wt.%, a Brookfield viscosity of 209 cps at 25° C. and an acidity as HCl of 0.016 wt.%.

IPOL-3: a blend of about 85 pbw Isocyanate I and about 15 pbw Polyol V having a FNCO of about 24.48 wt.% and a Brookfield viscosity of about 283.

IPOL-4: a blend of about 85 pbw Isocyanate I and about 15 pbw Polyol IV having a FNCO of about 24.65 wt.% and a Brookfield viscosity of about 223.

IPOL-5: a blend of about 85 pbw Isocyanate I and about 15 pbw Polyol III having a FNCO of about 24.82 wt.% and a Brookfield viscosity of about 188.

IPOL-6: a blend of about 85 pbw Isocyanate I and about 15 pbw Polyol II having a FNCO of about 24.67 wt.% and a Brookfield viscosity of about 193.

IPOL-7: a blend of about 85 pbw Isocyanate I and about 15 pbw Polyol I having a FNCO of about 24.09 wt.% and a Brookfield viscosity of about 232.

IPOL-8: a blend of about 80 pbw Isocyanate II and about 20 pbw Polyol V having a FNCO of about 22.59 wt.% and a Brookfield viscosity of 240 cps at 25° C.

IPOL-9: a blend of about 80 pbw Isocyanate III and about 20 pbw Polyol V having a FNCO of about 20.30 wt.%, a Brookfield viscosity of 1688 cps at 25° C. and an acidity as HCl of 0.186 wt.%.

IPOL-10: a blend of about 80 pbw Isocyanate II and about 20 pbw Polyol V having a FNCO of about 21.80 wt.%.

IPOL-11: a blend of about 85 pbw Isocyanate II and about 15 pbw Polyol V having a FNCO of about 23.70 wt.% and a Brookfield viscosity of 225 cps at 25° C.

IPOL-12: a blend of about 88 pbw Isocyanate II and about 12 pbw Polyol V having a FNCO of about 25.50 wt.% and a Brookfield viscosity of 105 cps at 25° C.

IPOL-13: a blend of about 80 pbw TDI and about 20 pbw Polyol V having a FNCO of about 35.30 wt.% and a Brookfield viscosity of 20 cps at 25° C.

IPOL-14: a blend of about 80 pbw of Isocyanate V and about 20 pbw Polyol V having a FNCO of about 34.55 wt.% and a Brookfield viscosity of 40 cps at 25° C.

IPOL-15: a blend of about 80 pbw Isocyanate VI and about 20 pbw Polyol V having a FNCO of about 21.30 wt.%, a Brookfield viscosity of 1500 cps at 25° C. and an acidity as HCl of 0.031 wt.%.

IPOL-16: a blend of about 80 pbw Isocyanate I and about 20 pbw Polyol V having a FNCO of about 23.28 wt.%, a Brookfield viscosity of 330 cps at 25° C. and an acidity as HCl of 0.061 wt.%.

IPOL-17: a blend of about 80 pbw Isocyanate I and about 20 pbw Polyol V having a FNCO of about 23.27 wt.%, a Brookfield viscosity of 340 cps at 25° C. and an acidity as HCl of 0.043 wt.%.

IPOL-18: a blend of about 75 pbw Isocyanate VI and about 25 pbw Polyol VI having a FNCO of about 20.05 wt.%, a Brookfield viscosity of 2475 cps at 25° C. and an acidity as HCl of 0.023 wt.%.

IPOL-19: a blend of about 80 pbw Isocyanate IV and about 20 pbw Polyol VI having a FNCO of about 26.61 wt.%, a Brookfield viscosity of 1880 cps at 25° C. and an acidity as HCl of 0.025 wt.%.

IPOL-20: a blend of about 80 pbw Isocyanate IV and about 20 pbw Polyol V having a FNCO of about 22.69 wt.%, a Brookfield viscosity of 1200 cps at 25° C. and an acidity as HCl of 0.045 wt.%.

IPOL-21: a blend of about 80 pbw Isocyanate I and about 20 pbw Polyol V having a FNCO of about 23.29 wt.% and a Brookfield viscosity of 328 cps at 25° C.

IPOL-22: a blend of about 88 pbw Isocyanate I and about 12 pbw Polyol V having a FNCO of about 25.77 wt.% and a Brookfield viscosity of 185 cps at 25° C.

IPOL-23: a blend of about 80 pbw Isocyanate I and about 20 pbw Polyol VI having a FNCO of about 23.27 wt.%, a Brookfield viscosity of 373 cps at 25° C. and an acidity as HCl of 0.016 wt.%.

IPOL-24: a blend of about 80 pbw Isocyanate I and about 20 pbw Polyol V having a FNCO of about 23.45 wt.%, a Brookfield viscosity of 317 cps at 25° C. and an acidity as HCl of 0.016 wt.%.

IPOL-25: a blend of about 80 pbw Isocyanate I and about 20 pbw Polyol VI having a FNCO of about 21.27 wt.% and a Brookfield viscosity of 530 cps at 25° C.

Isocyanate/prepolymer blends used in the Examples are identified as follows:

IPRE-1: a blend of about 30 pbw Isocyanate I and about 70 pbw Prepolymer II having a FNCO of about 20.81 wt.% and a Brookfield viscosity of 658 cps at 25° C.

IPRE-2: a blend of about 70 pbw Isocyanate I and about 30 pbw Prepolymer II having a FNCO of about 25.90 wt.% and a Brookfield viscosity of 186 cps at 25° C.

IPRE-3: a blend of about 50 pbw Isocyanate VI and about 50 pbw Prepolymer III having a FNCO of about 21.95 wt.%, a Brookfield viscosity of 1570 cps at 25° C. and an acidity as HCl of 0.040 wt.%.

Isocyanate/polymer/polyol blends used in the Examples are identified as follows:

IPB-1: a blend of about 85 pbw Isocyanate II and about 15 pbw Polymer/Polyol I having a FNCO of about 24.46 wt.% and a Brookfield viscosity of 147 cps at 25° C.

IPB-2: a blend of about 80 pbw Isocyanate II and about 20 pbw Polymer/Polyol I having a FNCO of about 22.76 wt.% and a Brookfield viscosity of 239 cps at 25° C.

IPB-3: a blend of about 88 pbw Isocyanate I and about 12 pbw Polymer/Polyol I having a FNCO of about 26.18 wt.% and a Brookfield viscosity of 163 cps at 25° C.

IPB-4: a blend of about 80 pbw Isocyanate I and about 20 pbw Polymer/Polyol I having a FNCO of about 23.37 wt.% and a Brookfield viscosity of 363 cps at 25° C.

IPB-5: a blend of about 80 pbw Isocyanate I and about 20 pbw Polymer/Polyol I having a FNCO of about 23.50 wt.% and a Brookfield viscosity of 348 cps at 25° C.

IPB-6: a blend of about 80 pbw Isocyanate I and about 20 pbw Polymer/Polyol I having a FNCO of about 23.29 wt.% and a Brookfield viscosity of 366 cps at 25° C.

IPB-7: a blend of about 80 pbw Isocyanate I and about 20 pbw Polymer/Polyol I having a FNCO of about 23.57 wt.%, a Brookfield viscosity of 377 cps at 25° C. and an acidity as HCl of 0.014 wt.%.

Isocyanate/polymer/prepolymer blends used in the Examples are identified as follows:

IPPB-1: a blend of about 75 pbw Isocyanate II and about 25 pbw Polymer/Prepolymer II having a FNCO of about 24.70 wt.% and a Brookfield viscosity of 137 cps at 25° C.

IPPB-2: a blend of about 80 pbw Isocyanate II and about 20 pbw Polymer/Prepolymer II having a FNCO of about 25.54 wt.% and a Brookfield viscosity of 111 cps at 25° C.

IPPB-3: a blend of about 88 pbw Isocyanate I and about 12 pbw Polymer/Prepolymer I having a FNCO of about 27.77 wt.%, a Brookfield viscosity of 121 cps at 25° C. and an acidity as HCl of 0.021 wt.%.

IPPB-4: a blend of about 85 pbw Isocyanate I and about 15 pbw Polymer/Prepolymer I having a FNCO of about 27.16 wt.%, a Brookfield viscosity of 123 cps at 25° C. and an acidity as HCl of 0.012 wt.%.

IPPB-5: a blend of about 94 pbw Isocyanate I and about 6 pbw Polymer/Prepolymer I having a FNCO of about 28.63 wt.%, a Brookfield viscosity of 83.5 cps at 25° C. and an acidity as HCl of 0.024 wt.%.

Isocyanate/modified polyol blends used in the Examples are identified as follows:

IMPB-1: a blend of about 85 pbw Isocyanate II and about 15 pbw Modified Polyol I having a FNCO of about 24.11 wt.%, a Brookfield viscosity of 182 cps at 25° C. and an acidity as HCl of 0.026 wt.%.

IMPB-2: a blend of about 91 pbw Isocyanate I and about 9 pbw Modified Polyol II having a FNCO of about 26.67 wt.%, a Brookfield viscosity of 140 cps at 25° C. and an acidity as HCl of 0.071 wt.%.

IMPB-3: a blend of about 88 pbw Isocyanate I and about 12 pbw Modfied Polyol II having a FNCO of about 25.48 wt.%, a Brookfield viscosity of 186 cps at 25° C. and an acidity as HCl of 0.142 wt.%.

IMPB-4: a blend of about 80 pbw Isocyanate I and about 20 pbw Modified Polyol III having a FNCO of about 23.37 wt.% and a Brookfield viscosity of 355 cps at 25° C.

IMPB-5: a blend of about 88 pbw Isocyanate I and about 12 pbw Modified Polyol IV having a FNCO of about 25.81 wt.%, a Brookfield viscosity of 217 cps at 25° C. and an acidity as HCl of 0.09 wt.%.

IMPB-6: a blend of about 94 pbw Isocyanate I and about 6 pbw Modified Polyol IV having a FNCO of about 27.67 wt.%, a Brookfield viscosity of 120 cps at 25° C. and an acidity as HCl of 0.09 wt.%.

IMPB-7: a blend of about 97 pbw Isocyanate I and about 3 pbw Modified Polyol IV having a FNCO of about 28.56 wt.%, a Brookfield viscosity of 84 cps at 25° C. and an acidity as HCl of 0.044 wt.%.

IMPB-8: a blend of about 88 pbw Isocyanate I and about 12 pbw Modified Polyol V having a FNCO of about 25.73 wt.%, a Brookfield viscosity of 206 cps at 25° C. and an acidity as HCl of 0.05 wt.%.

Isocyanate/catalyst blends used in the Examples are identified as follows:

ICB-1: a blend of about 100 pbw Isocyanate I and about 1.25 pbw VAZO-64 having a FNCO of about 29.15 wt.% and a Brookfield viscosity of 50 cps at 25° C.

ICB-2: a blend of about 100 pbw Isocyanate I and about 1.7 pbw VAZO-64 having a FNCO of about 29.16 wt.%, a Brookfield viscosity of 50 cps at 25° C. and an acidity as HCl of 0.032 wt.%.

ICB-3: a blend of about 100 pbw Isocyanate I and about 1.7 pbw VAZO-64 having a FNCO of about 29.02 wt.% and a Brookfield viscosity of 50 cps at 25° C.

ICB-4: a blend of about 100 pbw Isocyanate II and about 1.7 pbw VAZO-64 having a FNCO of about 28.39 wt.%, a Brookfield viscosity of 34 cps at 25° C. and an acidity as HCl of 0.0081 wt.%.

ICB-5: a blend of about 100 pbw Isocyanate III and about 1.5 pbw VAZO-64 having a FNCO of about 30.06 wt.%, a Brookfield viscosity of 340 cps at 25° C. and an acidity as HCl of 0.186 wt.%.

ICB-6: a blend of about 100 pbw Isocyanate I and about 1.7 pbw VAZO-64 having a FNCO of about 28.84 wt.% and a Brookfield viscosity of 57 cps at 25° C.

ICB-7: a blend of about 100 pbw Isocyanate I and about 1.0 pbw VAZO-64 having a FNCO of about 29.98 wt.% and a Brookfield viscosity of 41 cps at 25° C.

ICB-8: a blend of about 100 pbw Isocyanate I and about 1.0 pbw VAZO-64 having a FNCO of about 29.21 wt.%.

ICB-9: a blend of about 100 pbw Isocyanate I and about 1.2 pbw VAZO-64 having a FNCO of about 29.19 wt.% and a Brookfield viscosity of 55 cps at 25° C.

ICB-10: a blend of about 100 pbw Isocyanate I and about 3.27 pbw TBPO having a FNCO of about 28.76 wt.%, a Brookfield viscosity of 48 cps at 25° C. and an acidity as HCl of 0.030 wt.%.

Isocyanate/catalyst/polyol blend used in the Examples is identified as follows:

ICPB-1: a blend of about 80 pbw Isocyanate I, about 20 pbw Polyol V and about 1.5 pbw benzoyl peroxide having a FNCO of about 22.24 wt.%, a Brookfield viscosity of 382 cps at 25° C. and an acidity as HCl of 0.015 wt.%.

Isocyanate/catalyst/polymer/polyol blends used in the Examples are identified as follows:

ICPPB-1: a blend of about 80 pbw Isocyanate I, about 20 pbw Polymer/Polyol I and about 0.53 pbw VAZO-64 having a FNCO of about 23.14 wt.% and a Brookfield viscosity of 288 cps at 25° C.

ICPPB-2: a blend of about 80 pbw Isocyanate I, about 20 pbw Polymer/Polyol I and about 1.2 pbw VAZO-64 having a FNCO of about 22.74 and a Brookfield viscosity of 326 cps at 25° C.

ICPPB-3: a blend of about 80 pbw Isocyanate I, about 20 pbw Polymer/Polyol I and about 1.215 pbw VAZO-64 having a FNCO of about 23.2 wt.%.

ICPPB-4: a blend of about 80 pbw Isocyanate I, about 20 pbw Polymer/Polyol I and about 4.0 pbw TBPO having a FNCO of about 22.59 wt.%, a Brookfield viscosity of 310 cps at 25° C. and an acidity as HCl of 0.038 wt.%.

ICPPB-5: a blend of about 80 pbw Isocyanate I, about 20 pbw Polymer/Polyol I and about 3.27 pbw TBPO having a FNCO of about 22.42 wt.%, a Brookfield viscosity of 312 cps at 25° C. and an acidity as HCl of 0.039 wt.%.

Isocyanate/catalyst/polymer/prepolymer blends used in the Examples are identified as follows:

ICPPPB-1: a blend of about 30 pbw Isocyanate I, about 70 pbw Polymer/Prepolymer III and about 1.0 pbw VAZO-64 having a FNCO of about 20.91 wt.% and a Brookfield viscosity of 590 cps at 25° C.

ICPPPB-2: a blend of about 70 pbw Isocyanate I, about 30 pbw Polymer/Prepolymer III and about 1.0 pbw VAZO-64 having a FNCO of about 25.95 wt.% and a Brookfield viscosity of 155 cps at 25° C.

The properties of the products of the Examples and Runs were determined by the following tests:

Filterability of Filtration Hinderance: The most preferred compositions of this invention are essentially free of polymer particles having diameters over 30 microns. A composition meets this criteria if over 99 wt.% of the composition passes successively through a 150-mesh screen and a 700-mesh screen in the following test. A 200 gram sample of the composition being tested is diluted with 400 grams of anhydrous dioxane (or polyisocyanate as specified) to reduce viscosity effects. The diluted sample is passed through a 2.4 square inch 150-mesh screen, a 2.4 square inch 325-mesh screen and then through a 2.4 square inch 700-mesh screen. (The screens are cleaned, dried and weighed before the test.) Then the screens are washed with dioxane (or polyisocyanate) as specified) to remove any polyisocyanate, dried and weighed. The difference between the final and initial screen weights corresponds to the amount of polymer that did not pass through the screens. The 150-mesh screen has a square mesh with an average mesh opening of 105 microns and it is a "Standard Tyler" 150 square mesh screen. The 700-mesh screen is made with a Dutch twill weave having average mesh openings of 30 microns and is described in Bulletin 46267-R of the Ronningen-Petter Company of Kalamazoo, Michigan. The amounts which pass through are reported in percent, a percentage of 100% being preferred. Trace solids will generally always be present, but a value of 100% indicates that over 99 weight percent passes through the screen. It is preferable that 100% of a polymer/polyisocyanate composition pass through a 150-mesh screen, more preferably that 100% of a polymer/polyisocyanate composition pass successively through a 150-mesh screen and a 325-mesh screen, and most preferably that 100% of a polymer/polyisocyanate composition pass successively through a 150-mesh screen, 325-mesh screen and 700-mesh screen.

Centrifugable Solids: The polymer/polyisocyanate composition before and after stripping is centrifuged for about 24 hours at about 3000 rpm and 1470 radial centrifugal "g" force. At the end of this period, the tube is inverted and allowed to drain for four hours and any non-flowing cake in the bottom of the tube is weighed and expressed as a percentage of initial sample weights.

If a hard cake was formed in the top layer after centrifuging and before draining, centrifugible solids were not calculated. However, the volume percent (height) of each layer was measured. It is preferable that the centrifugible solids be as low as possible, preferably below 20%, more preferably below 10% and most preferably below 5%.

Clear Layer Before Tipping: The Polymer/polyisocyanate composition is placed in a small test tube and centrifuged for about 24 hours after which time the liquid in the test tube is observed and the height of the clear layer on the top is measured. This height is given as a percentage of the height of the liquid in the test tube. It is preferable that the clear layer before tipping be as low as possible, e.g. as close to 0 as possible.

Free monomer analysis: Samples were taken at the end of the reactions, before vacuum stripping, for determination of % unreacted monomer. The samples were diluted with methanol which reacted with the polyisocyanate and precipitated the polymer. The supernatent liquid was then analyzed by GC to determine the amount of unreacted monomer.

Free NCO: The polymer/polyisocyanate sample was reacted with excess dibutylamine and back-titrated with standard HCl reagent to determine the amount of unreacted dibutylamine.

EXAMPLES 1 THROUGH 20

Examples 1 through 20, comparative Examples A through C and Runs a through e were conducted continuously in a 550 cubic centimeter continuously stirred tank reactor fitted with baffles and an impeller generally run at 800 rpm in accordance with the reaction conditions set forth in Table IA below. The feed components were pumped to the reactor continuously after going through an inline mixer to assure complete mixing of the feed components before entering the reactor. The internal temperature of the reactor was controlled to within one degree Centigrade by applying controlled heating and cooling to the outside of the reactor. The product from the reactor flowed out through a back pressure regulator (the regulator was adjusted to give 10 pounds per square inch gauge back pressure in the reactor). Then the product flowed through a water cooled tubular heat exchanger to a product receiver. Portions of the crude product were vacuum stripped at 2 millimeters pressure and 90° C. to 100° C. for testing. Volatiles were collected during stripping using a cold trap and the amounts (wt. %) collected are listed in Table IA below. Conversions were calculated from feed rates, material balance and gas chromatographic analysis of the amount of unreacted (residual) monomers present in the crude product before stripping. A small sample was taken after stripping for electron micrograph analysis. The remaining unstripped and stripped product were then tested for the properties listed in Table IB below and the measurements for such properties are listed in Table IB.

The isocyanate/polyol blends (IPOL) used in the Examples and Runs were prepared in accordance with the following procedure. The isocyanate was filtered through a 150-mesh screen and mixed with a polyol at room temperature for one hour. An inert atmosphere was maintained over the charge during mixing. The properties of the resulting isocyanate/polyol blends are discussed hereinabove. The isocyanate/catalyst/polyol blend (ICPB) used in Example 13 was prepared by dissolving the catalyst (benzoyl peroxide) in the isocyanate by agitating the mixture for 4 hours at 40° C.±2° C. under a nitrogen atmosphere. At the end of the dissolving period, the polyol was added and mixed for one hour. The resulting isocyanate/catalyst/polyol blend was cooled to about 25° C. and filtered through a 150-mesh screen. The properties of the isocyanate/catalyst/polyol blend are described hereinabove.

Examples 1 through 20 illustrate the production of polymer/polyisocyanate compositions (utilizing high molecular weight polyols as stabilizers) having good dispersion characteristics as evidenced by the good to excellent filterability of said compositions. The viscosities and centrifugible solids of the compositions of Examples 1 through 20 were for the most part in the desirably low range.

Examples 4 and 5 demonstrate a preferred polyol (Polyol V) concentration in the isocyanate/polyol blends utilizing Isocyanate I. The preferred polyol concentration (Polyol V) is 20 wt. % after allowing for variation of 5 units in the blend.

The relatively high viscosities and solids of Examples 6 and 7 are attributable to the high total polymer content in the polymer/polyisocyanate compositions. A reduction in the polymer content in these Examples could reduce the viscosities to a more preferable range. (See Example 1.)

Polymer/polyisocyanate compositions having good dispersion characteristics were prepared in Examples 8 and 9 using a minor concentration of vinylidene chloride and methyl methacrylate respectively. Both compositions exhibited good fiterability and low viscosities and centrifugible solids.

Examples 11 and 12 used a 60/40 and 50/50 monomer ratio of acrylonitrile to styrene respectively and appeared to form solutions. By increasing the amount of acrylonitrile and decreasing the amount of styrene, an acceptable polymer/polyisocyanate dispersion can be formed. (See Example 10 in which an 80/20 ratio of acrylonitrile to styrene was used).

Benzoyl peroxide was successfully employed in Example 13 as the free-radical polymerization catalyst (replacement for VAZO-64) to prepare a stable polymer/polyisocyanate composition. However, the unstripped product of Example 13 solidified after one week upon standing.

The relatively high viscosity of Example 15 is attributable to the total polymer content in the polymer/polyisocyanate compositions. By limiting the acrylonitrile content to about 20 wt. % when utilizing Isocyanate II, the viscosities of the compositions can be reduced to a more preferable range. (See Example 14).

Examples 14, 16 and 17 demonstrate a preferred polyol (Polyol V) concentration in the isocyanate/polyol blends utilizing Isocyanate II. The preferred polyol concentration (Polyol V) is 20 wt. % after allowing for variation of 5 units in the blend.

It is noted from Examples 18 and 19 that TDI, either as an 80/20 isomeric mixture of 2,4-tolylene diisocyanate and 2,6-tolylene diisocyanate (TDI) or as a blend with polymeric MDI (Isocyanate V), may be employed in the preparation of polymer/polyisocyanate compositions exhibiting excellent dispersion characteristics including low viscosities.

The process of Example 20 was modified to include an additional processing stage (two-stage reactor) in which the product was further reacted for an additional 12 minutes in an unagitated column having an L/D ratio of 5 and a volume of 550 cubic centimeters.

Comparative Examples A and B illustrate the importance of high molecular weight polyols in the preparation of polymer/polyisocyanate compositions of this invention. As shown by the data of centrifugible solids (unstripped samples), viscosity and filterability, the higher molecular weight polyols are better stabilizers than the lower molecular weight polyols (compare Examples 1, 2 and 3 with comparative Examples A and B). Polyols having a number average molecular weight of at least 4000 are preferred.

Comparative Example C demonstrates the preparation of a polymer/polyisocyanate composition without a polyol stabilizer. The resulting product exhibited poor dispersion characteristics including a high viscosity.

Comparative Examples D through K provide filterability measurements for the polyisocyanates used in Examples 1 through 20, comparative Examples A through C and Runs a through e. The filterability of Isocyanate I (Example E) was determined using a sample size of 400 grams. The filterability of the remaining isocyanates (Examples D and F through K) was determined using a sample size of 600 grams.

The product of Run a had a very high viscosity and a very high concentration of very small polymer particles as seen in an electron micrograph. It should be noted that IPOL-9 had a high viscosity (1688 cps at 25° C.) indicating some reaction or prepolymer formation even though the blend was prepared at room temperature. Monomer conversion was also too low (57.90%) presumably because of the high acidity of Isocyanate III.

Runs b through e illustrate unsuccessful attempts to prepare stable polymer/polyisocyanate compositions. The compositions had very high viscosity and they layered out overnight (top layer was brown dispersion and bottom layer was dark isocyanate—no polymer cake noticed). It should be noted that IPOL-15, IPOL-18, IPOL-19 and IPOL-20 had high viscosity (1500–2400 cps at 25° C.) even though they were prepared at room temperature. This indicates the occurrence of a reaction or prepolymer formation. It should also be noted that Isocyanate IV and Isocyanate VI contain some amount of high functional species which are not compatible with a polyol. This non-compatibility causes the separation of high functional species of Isocyanate IV and Isocyanate VI from the product. These high functional species have higher specific gravity so they form a bottom layer as demonstrated in Runs b through e.

TABLE IA

USE OF HIGH MOLECULAR WEIGHT POLYOLS AS STABILIZERS FOR POLYMER/POLYISOCYANATE COMPOSITIONS (CONTINUOUS BENCH-SCALE UNIT)
PROCESS DATA

| EXAMPLE | 1 | 2 | 3 | 4 | 5 | 6 |
|---|---|---|---|---|---|---|
| Blend Identification | IPOL-3 | IPOL-4 | IPOL-5 | IPOL-21 | IPOL-22 | IPOL-1 |
| Reaction Temperature, °C. | 135 | 135 | 135 | 125 | 125 | 135 |
| Residence Time, min. | 11.5 | 12 | 12 | 12 | 12 | 12 |
| Catalyst | VAZO-64 | VAZO-64 | VAZO-64 | VAZO-64 | VAZO-64 | VAZO-64 |
| Catalyst Conc. in Feed, wt. % | 1.15 | 1.21 | 1.20 | 1.20 | 1.20 | 1.22 |
| Feed Stream Containing Catalyst | Monomer | Monomer | Monomer | Monomer | Monomer | Monomer |
| Monomer Content in Feed, wt. % (1) | 23.22 | 24.53 | 24.12 | 23.98 | 24.13 | 33.70 |
| Ratio of Acrylonitrile to Second Monomer wt. % | 100/0 | 100/0 | 100/0 | 100/0 | 100/0 | 100/0 |
| Second Monomer | None | None | None | None | None | None |
| Blend Feed Rate, gm/hr (2) | 2215 | 2110 | 2057 | 2092 | 2119 | 1853 |
| Monomer Feed Rate, gm/hr (3) | 670 | 686 | 654 | 660 | 674 | 942 |
| Product Weight, gm/hr | 2862 | 2754 | 2689 | 2734 | 2768 | 2747 |
| Material Balance, % | 99.20 | 98.50 | 99.19 | 99.34 | 99.10 | 98.28 |
| Stripping (Batch) Temperature, °C. | 90–100 | 90–100 | 90–100 | 90–95 | 90–95 | 90–100 |
| Residual Acrylonitrile in Unstripped Product, wt. % | 3.44 | 3.51 | 3.40 | 3.57 | 4.11 | 4.54 |
| Second Monomer in Unstripped Product, wt. % | — | — | — | — | — | — |
| TMSN in Unstripped Product, wt. % | — | 0.30 | — | 0.29 | 0.78 | — |
| Volatiles Collected During Stripping, wt. % (4) | 3.67 | 3.40 | 3.85 | 3.84 | 3.22 | 4.34 |
| Conversions, Acrylonitrile, % (5) | 84.54 | 85.17 | 85.29 | 84.44 | 82.24 | 86.26 |
| Second Monomer, % (5) | — | — | — | — | — | — |
| Combined, % (5) | 84.54 | 85.17 | 85.29 | 84.44 | 82.24 | 86.26 |
| Combined (from volatiles collected), % (6) | 83.37 | 85.41 | 83.20 | 83.15 | 85.95 | 86.64 |

| EXAMPLE | 7 | 8 | 9 | 10 | 11 | 12 |
|---|---|---|---|---|---|---|
| Blend Identification | IPOL-2 | IPOL-16 | IPOL-17 | IPOL-25 | IPOL-25 | IPOL-25 |
| Reaction Temperature, °C. | 135 | 135 | 137 | 125 | 125 | 125 |
| Residence Time, min. | 12 | 12 | 12 | 12 | 12 | 12 |
| Catalyst | VAZO-64 | VAZO-64 | VAZO-64 | VAZO-64 | VAZO-64 | VAZO-64 |
| Catalyst Conc. in Feed, wt. % | 1.26 | 1.17 | 1.15 | 1.12 | 1.23 | 1.18 |
| Feed Stream Containing Catalyst | Monomer | Isocyanate | Isocyanate | Monomer | Monomer | Monomer |
| Monomer Content in Feed, wt. % (1) | 34.86 | 19.27 | 20.23 | 22.52 | 24.92 | 23.70 |
| Ratio of Acrylonitrile to Second Monomer, wt. % | 100/0 | 80/20 | 80/20 | 80/20 | 60/40 | 50/50 |
| Second Monomer | None | Vinylidene Chloride | Methyl Methacrylate | Styrene | Styrene | Styrene |
| Blend Feed Rate, gm/hr (2) | 1809 | 2204 | 2207 | 2105 | 2100 | 2102 |
| Monomer Feed Rate, gm/hr (3) | 968 | 526 | 560 | 612 | 697 | 656 |
| Product Weight, gm/hr | 2735 | 2655 | 2735 | 2696 | 2762 | 2723 |
| Material Balance, % | 98.49 | 97.25 | 98.99 | 99.23 | 98.75 | 98.73 |
| Stripping (Batch) Temperature, °C. | 90–100 | 90–100 | 90–100 | 90–95 | 90–95 | 90–95 |
| Residual Acrylonitrile in Unstripped Product, wt. % | 4.61 | — | — | 3.00 | 4.16 | 3.16 |
| Second Monomer in Unstripped Product, wt. % | — | — | — | 0.20 | 0.61 | 1.04 |
| TMSN in Unstripped Product, wt. % | — | — | — | 0.70 | 0.44 | 0.64 |
| Volatiles Collected During Stripping, wt. % (4) | 4.71 | 5.89 | 3.67 | 2.42 | 2.94 | 2.53 |
| Conversions, Acrylonitrile, % (5) | 86.49 | — | — | 82.62 | 71.09 | 72.40 |
| Second Monomer, % (5) | — | — | — | 95.37 | 93.64 | 90.91 |
| Combined, % (5) | 86.49 | — | — | 85.17 | 80.11 | 81.65 |

TABLE IA-continued
USE OF HIGH MOLECULAR WEIGHT POLYOLS AS STABILIZERS FOR POLYMER/POLYISOCYANATE COMPOSITIONS (CONTINUOUS BENCH-SCALE UNIT)
PROCESS DATA

| | | | | | | |
|---|---|---|---|---|---|---|
| Combined (from volatiles collected), % (6) | 85.98 | 69.4 | 81.87 | 88.68 | 87.5 | 88.53 |
| EXAMPLE | 13 | 14 | 15 | 16 | 17 | 18 |
| Blend Identification | ICPB-1 | IPOL-8 | IPOL-8 | IPOL-11 | IPOL-12 | IPOL-13 |
| Reaction Temperature, °C. | 135 | 135 | 135 | 137 | 137 | 135 |
| Residence Time, min. | 12 | 12 | 12 | 12 | 12 | 12 |
| Catalyst | Benzoyl Peroxide | VAZO-64 | VAZO-64 | VAZO-64 | VAZO-64 | VAZO-64 |
| Catalyst Conc. in Feed, wt. % | 1.47 | 1.24 | 1.37 | 1.20 | 1.19 | 1.17 |
| Feed Stream Containing Catalyst | Isocyanate | Monomer | Monomer | Monomer | Monomer | Monomer |
| Monomer Content in Feed, wt. % (1) | 18.75 | 23.27 | 25.38 | 20.53 | 20.28 | 20.00 |
| Ratio of Acrylonitrile to Second Monomer, wt. % | 100/0 | 100/0 | 100/0 | 100/0 | 100/0 | 100/0 |
| Second Monomer | None | None | None | None | None | None |
| Blend Feed Rate, gm/hr (2) | 2283 | 2158 | 2084 | 2195 | 2264 | 2264 |
| Monomer Feed Rate, gm/hr (3) | 527 | 645 | 709 | 567 | 576 | 566 |
| Product Weight, gm/hr | 2777 | 2772 | 2797 | 2755 | 2841 | 2815 |
| Material Balance, % | 98.82 | 98.89 | 100.14 | 99.75 | 100.03 | 99.47 |
| Stripping (Batch) Temperature, °C. | 90–100 | 90–100 | 90–100 | 90–100 | 90–100 | 90–100 |
| Residual Acrylonitrile in Unstripped Product, wt. % | — | 2.92 | 2.32 | — | — | — |
| Second Monomer in Unstripped Product, wt. % | — | — | — | — | — | — |
| TMSN in Unstripped Product, wt. % | — | — | — | — | — | — |
| Volatiles Collected During Stripping, wt. % (4) | 4.73 | 3.72 | 3.20 | 3.25 | 4.33 | 3.02 |
| Conversions, Acrylonitrile, % (5) | — | 86.73 | 90.32 | — | — | — |
| Second Monomer, % (5) | — | — | — | — | — | — |
| Combined, % (5) | — | 86.73 | 90.32 | — | — | — |
| Combined (from volatiles collected), % (6) | 74.81 | 82.91 | 86.70 | 83.19 | 77.32 | 83.95 |
| EXAMPLE | 19 | 20 | a | b | c | d |
| Blend Identification | IPOL-14 | IPOL-10 | IPOL-9 | IPOL-15 | IPOL-18 | IPOL-19 |
| Reaction Temperature, °C. | 137 | 135 | 140 | 137 | 137 | 135 |
| Residence Time, min. | 12 | 24 | 26 | 12 | 12 | 12 |
| Catalyst | VAZO-64 | VAZO-64 | VAZO-64 | VAZO-64 | VAZO-64 | VAZO-64 |
| Catalyst Conc. in Feed, wt. % | 1.22 | 1.21 | 1.18 | 1.25 | 1.24 | 1.24 |
| Feed Stream Containing Catalyst | Monomer | Monomer | Monomer | Monomer | Monomer | Monomer |
| Monomer Content in Feed, wt. % (1) | 20.90 | 19.88 | 23.91 | 21.44 | 21.23 | 21.12 |
| Ratio of Acrylonitrile to Second Monomer wt. % | 100/0 | 100/0 | 100/0 | 100/0 | 100/0 | 100/0 |
| Second Monomer | None | None | None | None | None | None |
| Blend Feed Rate, gm/hr (2) | 2248 | 2221 | 964 | 2155 | 2151 | 2168 |
| Monomer Feed Rate, gm/hr (3) | 594 | 551 | 303 | 588 | 580 | 581 |
| Product Weight, gm/hr | 2816 | 2776 | 1298 | 2723 | 2729 | 2727 |
| Material Balance, % | 99.08 | 100.14 | 102.44 | 99.27 | 99.93 | 99.20 |
| Stripping (Batch) Temperature, °C. | 90–100 | 90–100 | 90–100 | 90–100 | 90–100 | 90–100 |
| Residual Acrylonitrile in Unstripped Product, wt. % | — | — | 5.76 | — | — | — |
| Second Monomer in Unstripped Product, wt. % | — | — | — | — | — | — |
| TMSN in Unstripped Product, wt. % | — | — | — | — | — | — |
| Volatiles Collected During Stripping, wt. % (4) | 2.74 | 2.30 | 9.62 | 3.22 | 3.49 | 3.41 |
| Conversions, Acrylonitrile, % (5) | — | — | 79.25 | — | — | — |
| Second Monomer, % (5) | — | — | — | — | — | — |
| Combined, % (5) | — | — | 79.25 | — | — | — |
| Combined (from volatiles collected), % (6) | 86.07 | 87.68 | 57.90 | 83.24 | 82.55 | 82.85 |
| EXAMPLE | e | A | B | C | D | |
| Blend Identification | IPOL-20 | IPOL-6 | IPOL-7 | Isocyanate I | Isocyanate I | |
| Reaction Temperature, °C. | 137 | 135 | 135 | 125 | — | |
| Residence Time, min. | 12 | 12 | 12 | 12 | — | |
| Catalyst | VAZO-64 | VAZO-64 | VAZO-64 | VAZO-64 | — | |
| Catalyst Conc. in Feed, wt. % | 1.19 | 1.22 | 1.24 | 1.20 | — | |
| Feed Stream Containing Catalyst | Monomer | Monomer | Monomer | Monomer | — | |
| Monomer Content in Feed, wt. % (1) | 20.40 | 24.65 | 24.94 | 23.82 | — | |
| Ratio of Acrylonitrile to Second Monomer, wt. % | 100/0 | 100/0 | 100/0 | 100/0 | — | |
| Second Monomer | None | None | None | None | — | |
| Blend Feed Rate, gm/hr (2) | 2236 | 2094 | 2016 | 2156 | — | |
| Monomer Feed Rate, gm/hr (3) | 573 | 685 | 670 | 674 | — | |
| Product Weight, gm/hr | 2781 | 2783 | 2692 | 2930 | — | |
| Material Balance, % | 99.00 | 100.14 | 100.22 | 103.53 | — | |
| Stripping (Batch) Temperature, °C. | 90–100 | 90–100 | 90–100 | 90–95 | — | |
| Residual Acrylonitrile in Unstripped Product, wt. % | — | 4.03 | 6.47 | 5.15 | — | |
| Second Monomer in Unstripped Product, wt. % | — | — | — | — | — | |
| TMSN in Unstripped Product, wt. % | — | — | — | 0.34 | — | |
| Volatiles Collected During Stripping, wt. % (4) | 3.62 | 4.05 | 4.51 | 4.52 | — | |
| Conversions, Acrylonitrile, % (5) | — | 82.77 | 72.65 | 76.44 | — | |
| Second Monomer, % (5) | — | — | — | — | — | |
| Combined, % (5) | — | 82.77 | 72.65 | 76.44 | — | |
| Combined (from volatiles collected), % (6) | 81.13 | 82.71 | 80.97 | 80.71 | — | |
| EXAMPLE | E | F | G | H | I | J | K |
| Blend Identification | Isocyanate I | Isocyanate II | Isocyanate III | TDI | Isocyanate V | Isocyanate VI | Isocyanate IV |
| Reaction Temperature, °C. | — | — | — | — | — | — | — |

TABLE IA-continued
USE OF HIGH MOLECULAR WEIGHT POLYOLS AS STABILIZERS FOR POLYMER/POLYISOCYANATE COMPOSITIONS (CONTINUOUS BENCH-SCALE UNIT)
PROCESS DATA

| | | | | | | | |
|---|---|---|---|---|---|---|---|
| Residence Time, min. | — | — | — | — | — | — | — |
| Catalyst | — | — | — | — | — | — | — |
| Catalyst Conc. in Feed, wt. % | — | — | — | — | — | — | — |
| Feed Stream Containing Catalyst | — | — | — | — | — | — | — |
| Monomer Content in Feed, wt. % (1) | — | — | — | — | — | — | — |
| Ratio of Acrylonitrile to Second Monomer, wt. % | — | — | — | — | — | — | — |
| Second Monomer | — | — | — | — | — | — | — |
| Blend Feed Rate, gm/hr (2) | — | — | — | — | — | — | — |
| Monomer Feed Rate, gm/hr (3) | — | — | — | — | — | — | — |
| Product Weight, gm/hr (3) | — | — | — | — | — | — | — |
| Material Balance, % | — | — | — | — | — | — | — |
| Stripping (Batch) Temperature, °C. | — | — | — | — | — | — | — |
| Residual Acrylonitrile in Unstripped Product, wt. % | — | — | — | — | — | — | — |
| Second Monomer in Unstripped Product, wt. %. | — | — | — | — | — | — | — |
| TMSN | — | — | — | — | — | — | — |
| Volatiles Collected During Stripping, wt. % (4) | — | — | — | — | — | — | — |
| Conversions, Acrylonitrile, % (5) | — | — | — | — | — | — | — |
| Second Monomer, % (5) | — | — | — | — | — | — | — |
| Combined, % (5) | — | — | — | — | — | — | — |
| Combined (from volatiles collected), % (6) | — | — | — | — | — | — | — |

(1) If catalyst is dissolved in monomer, monomer content in feed includes catalyst.
(2) If catalyst is dissolved in an isocyanate blend, isocyanate blend feed rate includes catalyst.
(3) If catalyst is dissolved in monomer, monomer feed rate includes catalyst.
(4) Volatiles were collected in a cold trap during stripping, weighed and expressed as a percentage of unstripped product.
(5) Conversions were calculated from feed rates, material balance and free monomer (residual) analysis of unstripped product.
(6) Calculated from volatiles collected during stripping and total monomer content in feed.

TABLE IB
USE OF HIGH MOLECULAR WEIGHT POLYOLS AS STABILIZERS FOR POLYMER/POLYISOCYANATE COMPOSITIONS (CONTINUOUS BENCH-SCALE UNIT)
PRODUCT DATA

| EXAMPLE | 1 | 2 | 3 | 4 | 5 | 6 |
|---|---|---|---|---|---|---|
| Polyacrylonitrile in Stripped Product by Calc., wt. % (7) | 19.55 | 20.83 | 20.49 | 19.97 | 19.70 | 29.71 |
| Second Polymer in Stripped Product by Calc., wt. % (7) | — | — | — | — | — | — |
| Total Polymer in Stripped Product by Calc., wt. % (7) | 19.55 | 20.83 | 20.49 | 19.97 | 19.70 | 29.71 |
| Total Polymer by Calc. (from volatiles collected), wt. % (8) | 19.10 | 20.61 | 19.83 | 19.71 | 20.35 | 29.41 |
| FNCO by Calc. (from free monomer analysis), wt. % (9) | 19.69 | 19.51 | 19.73 | 18.37 | 20.41 | 16.35 |
| FNCO by Calc. (from volatiles collected), wt. % (10) | 19.80 | 19.57 | 19.90 | 18.70 | 20.52 | 16.43 |
| FNCO measured, wt. % | 18.58 | 18.32 | 18.58 | 17.48 | 19.30 | 14.79 |
| Viscosity (Brookfield) at 25° C., cps | 1920 | 1872 | 2040 | 2156 | 2796 | 7090 |
| Centrifugible Solids, Unstripped, wt. % | 2.92 | 4.39 | 4.27 | 4.75 | 14.94 | 9.34 |
| Top Layer (Clear Layer) Before Tipping, % | 0 | 0 | 0 | 0 | 0 | 1 |
| Appearance of Top Layer | — | — | — | — | — | Liquid, Dark Brown |
| Centrifugible Solids, Stripped, wt. % | 2.28 | 2.10 | 2.34 | 1.85 | 3.56 | 2.58 |
| Top Layer (Clear Layer) Before Tipping, % | 0 | 0 | 0 | 0 | 2 | 0 |
| Appearance of Top Layer | — | — | — | — | Thin Cake | — |
| Middle Layer, % | 0 | 0 | 0 | 0 | 0 | 0 |
| Bottom Layer, % | 100 | 100 | 100 | 100 | 98 | 100 |
| Filtration Hindrance: (11) | | | | | | |
| 150-Mesh Screen, Time to See Screen, sec. | 94 | 96 | 90 | 85 | 81 | 93 |
| 150-Mesh Screen, % Through | 100 | 100 | 100 | 100 | 100 | 100 |
| 150-Mesh Screen, Solids on Screen, ppm | 161 | 114 | 125 | 63 | 58 | 129 |
| 325-Mesh Screen, Time to See Screen, sec. | 278 | 256 | 372 | 300 | 300 | 320 |
| 325-Mesh Screen, % Through | 100 | 100 | 100 | 42 | 38.5 | 100 |
| 325-Mesh Screen, Solids on Screen, ppm | 73 | 29 | 19 | 44 | 90 | 38 |
| 700-Mesh Screen, Time to See Screen, sec. | — | — | — | — | — | — |
| 700-Mesh Screen, % Through | — | — | — | — | — | — |
| 700-Mesh Screen, Solids on Screen, ppm | — | — | — | — | — | — |
| EXAMPLE | 7 | 8 | 9 | 10 | 11 | 12 |
| Polyacrylonitrile in Stripped Product by Calc., wt. % (7) | 30.85 | — | — | 14.64 | 10.61 | 8.55 |
| Second Polymer in Stripped Product by Calc., wt. % (7) | — | — | — | 4.22 | 9.32 | 10.73 |
| Total Polymer in Stripped Product by Calc., wt. % (7) | 30.85 | — | — | 18.86 | 19.93 | 19.28 |
| Total Polymer for Calc. (from volatiles collected), wt. % (8) | 30.31 | 14.22 | 17.20 | 19.43 | 21.37 | 20.04 |
| FNCO by Calc. (from free monomer analysis), wt. % (9) | 16.42 | — | — | 17.04 | 16.77 | 16.93 |
| FNCO by Calc. (from volatiles collected), wt. % (10) | 16.55 | 19.97 | 19.27 | 17.14 | 16.72 | 17.00 |
| FNCO measured, wt. % | 15.82 | 19.54 | 18.68 | 17.56 | 17.43 | 17.63 |
| Viscosity (Brookfield) at 25° C., cps | 6740 | 1250 | 1640 | 2064 | 3950 | 7100 |
| Centrifugible Solids, Unstripped, wt. % | 11.26 | 2.08 | 2.91 | 1.94 | 1.67 | 12.01 |
| Top Layer (Clear Layer) Before Tipping, % | 2 | 2 | 0 | 0 | 2 | 0 |
| Appearance of Top Layer | Liquid Dark Brown | Liquid Dark Brown | — | — | Thin Cake | — |
| Centrifugible Solids, Stripped, wt. % | 2.22 | 1.62 | 1.67 | 1.54 | 2.29 | 3.00 |
| Top Layer (Clear Layer) Before Tipping, % | 0 | 0 | 0 | 0 | 1 | 0 |

TABLE IB-continued
USE OF HIGH MOLECULAR WEIGHT POLYOLS AS STABILIZERS FOR POLYMER/POLYISOCYANATE COMPOSITIONS (CONTINUOUS BENCH-SCALE UNIT)
PRODUCT DATA

| | | | | | | |
|---|---|---|---|---|---|---|
| Appearance of Top Layer | — | Liquid | — | — | Thin Cake | — |
| Middle Layer, % | 0 | Dark Brown | 0 | 0 | 0 | 0 |
| Bottom Layer, % | 100 | 98 | 100 | 100 | 99 | 100 |
| Filtration Hindrance: (11) | | | | | | |
| 150-Mesh Screen, Time to See Screen, sec. | 102 | 85 | 80 | 124 | 625 | 550 |
| 150-Mesh Screen, % Through | 100 | 100 | 100 | 100 | 67.5 | 100 |
| 150-Mesh Screen, Solids on Screen, ppm | 162 | 52 | 35 | 65 | 259 | 210 |
| 325-Mesh Screen, Time to See Screen, sec. | 290 | 230 | 260 | 260 | 250 | 300 |
| 325-Mesh Screen, % Through | 100 | 100 | 100 | 40.5 | 11.5 | 16.5 |
| 325-Mesh Screen, Solids on Screen, ppm | 33 | 10 | 16 | 47 | 230 | 542 |
| 700-Mesh Screen, Time to See Screen, sec. | — | 1200 | 1200 | — | — | — |
| 700-Mesh Screen, % Through | — | 90.5 | 78.5 | — | — | — |
| 700-Mesh Screen, Solids on Screen, ppm | — | 101 | 78 | — | — | — |

| EXAMPLE | 13 | 14 | 15 | 16 | 17 | 18 |
|---|---|---|---|---|---|---|
| Polyacrylonitrile in Stripped Product by Calc., wt. % (7) | — | 19.69 | 22.52 | — | — | — |
| Second Polymer in Stripped Product by Calc., wt. % (7) | — | — | — | — | — | — |
| Total Polymer in Stripped Product by Calc., wt. % (7) | — | 19.69 | 22.52 | — | — | — |
| Total Polymer by Calc. (from volatiles collected), wt. % (8) | 14.74 | 18.75 | 21.49 | 16.62 | 15.43 | 16.29 |
| FNCO by Calc. (from free monomer analysis), wt. % (9) | — | 18.14 | 17.50 | — | — | — |
| FNCO by Calc. (from volatiles collected), wt. % (10) | 18.96 | 18.35 | 17.73 | 19.76 | 21.56 | 29.54 |
| FNCO measured, wt. % | 16.10 | 17.58 | 16.63 | 18.58 | 21.60 | 28.71 |
| Viscosity (Brookfield) at 25° C., cps | 2460 | 1792 | 4400 | 670 | 2312 | 97 |
| Centrifugible Solids, Unstripped, wt. % | — | 8.35 | 2.50 | 2.01 | 11.71 | 1.03 |
| Top Layer (Clear Layer) Before Tipping, % | — | 0 | 0 | 0 | 0 | 0 |
| Appearance of Top Layer | — | — | — | — | — | — |
| Centrifugible Solids, Stripped, wt. % | 2.42 | 2.97 | — | 1.2 | 9.82 | 0.42 |
| Top Layer (Clear Layer) Before Tipping, % | 0 | 0 | 2 | 0 | 0 | 0 |
| Appearance of Top Layer | — | — | Cake | — | — | — |
| Middle Layer, % | 0 | 0 | 0 | 0 | 0 | 0 |
| Bottom Layer, % | 100 | 100 | 98 | 100 | 100 | 100 |
| Filtration Hindrance: (11) | | | | | | |
| 150-Mesh Screen, Time to See Screen, sec. | 77 | 54 | 78 | 48 | 44 | 11 |
| 150-Mesh Screen, % Through | 100 | 100 | 100 | 100 | 100 | 100 |
| 150-Mesh Screen, Solids on Screen, ppm | 63 | 133 | 112 | 108 | 192 | 15 |
| 325-Mesh Screen, Time to See Screen, sec. | 222 | 254 | 380 | 250 | 180 | 28 |
| 325-Mesh Screen, % Through | 100 | 100 | 100 | 100 | 100 | 100 |
| 325-Mesh Screen, Solids on Screen, ppm | 19 | 40 | 25 | 66 | 59 | 4 |
| 700-Mesh Screen, Time to See Screen, sec. | 1200 | 1190 | 1200 | — | — | 125 |
| 700-Mesh Screen, % Through | 86 | 100 | 66.85 | — | — | 100 |
| 700-Mesh Screen, Solids on Screen, ppm | 195 | 104 | 144 | — | — | 19 |

| EXAMPLE | 19 | 20 | a | b | c | d |
|---|---|---|---|---|---|---|
| Polyacrylonitrile in Stripped Product by Calc., wt. % (7) | — | — | 19.14 | — | — | — |
| Second Polymer in Stripped Product by Calc., wt. % (7) | — | — | — | — | — | — |
| Total Polymer in Stripped Product by Calc., wt. % (7) | — | — | 19.14 | — | — | — |
| Total Polymer by Calc. (from volatiles collected), wt. % (8) | 17.41 | 16.75 | 14.64 | 16.52 | 17.11 | 17.06 |
| FNCO by Calc. (from free monomer analysis), wt. % (9) | — | — | 16.41 | — | — | — |
| FNCO by Calc. (from volatiles collected), wt. % (10) | 28.53 | 18.15 | 17.33 | 17.78 | 16.62 | 22.07 |
| FNCO measured, wt. % | 27.48 | 17.86 | 17.95 | 19.27 | 20.74 | 19.40 |
| Viscosity (Brookfield) at 25° C., cps. | 162 | 850 | 13300 | 12700 | 13600 | 16500 |
| Centrifugible Solids, Unstripped, wt. % | 0.54 | 20.71 | 2.30 | 2.19 | 2.14 | 2.51 |
| Top Layer (Clear Layer) Before Tipping, % | 0 | 0 | 0 | 0 | 0 | 0 |
| Appearance of Top Layer | — | — | — | — | — | — |
| Centrifugible Solids, Stripped, wt. % | 0.56 | 10.54 | 3.82 | 3.15 | 3.37 | 3.09 |
| Top Layer (Clear Layer) Before Tipping, % | 0 | 0 | 0 | 84 | 72 | 56 |
| Appearance of Top Layer | — | — | — | Brown Dispersion | Brown dispersion | Brown dispersion |
| Middle Layer, % | 0 | 0 | 0 | 0 | 0 | 0 |
| Bottom Layer, % | 100 | 100 | 100 | 16 | 28 | 44 |
| Filtration Hindrance: (11) | | | | | | |
| 150-Mesh Screen, Time to See Screen, sec. | 7 | 56 | 788 | 500 | 480 | 1200 |
| 150-Mesh Screen, % Through | 100 | 100 | 100 | 100 | 100 | 89.95 |
| 150-Mesh Screen, Solids on Screen, ppm | 38 | 78 | 216 | 193 | 159 | 117 |
| 325-Mesh Screen, Time to See Screen, sec. | 38 | 310 | 1200 | 1200 | 1200 | 1200 |
| 325-Mesh Screen, % Through | 100 | 100 | 16.66 | 30.5 | 28.35 | 12 |
| 325-Mesh Screen, Solids on Screen, ppm | 19 | 44 | 279 | 190 | 90 | 213 |
| 700-Mesh Screen, Time to See Screen, sec. | 166 | — | — | — | — | — |
| 700-Mesh Screen, % Through | 100 | — | — | — | — | — |
| 700-Mesh Screen, Solids on Screen, ppm | 46 | — | — | — | — | — |

| EXAMPLE | e | A | B | C | D |
|---|---|---|---|---|---|
| Polyacrylonitrile in Stripped Product by Calc., wt. % (7) | — | 20.47 | 18.66 | 18.29 | — |
| Second Polymer in Stripped Product by Calc., wt. % (7) | — | — | — | — | — |
| Total Polymer in Stripped Product by Calc., wt. % (7) | — | 20.47 | 18.66 | 18.29 | — |
| Total Polymer by Calc. (from volatiles collected), wt. % (8) | 16.15 | 20.20 | 20.10 | 19.86 | — |
| FNCO by Calc. (from free monomer analysis), wt. % (9) | — | 19.62 | 19.59 | 23.90 | — |
| FNCO by Calc. (from volatiles collected), wt. % (10) | 19.02 | 19.68 | 19.25 | 23.78 | — |

TABLE IB-continued
USE OF HIGH MOLECULAR WEIGHT POLYOLS AS STABILIZERS FOR POLYMER/POLYISOCYANATE COMPOSITIONS (CONTINUOUS BENCH-SCALE UNIT)
PRODUCT DATA

| | | | | | |
|---|---|---|---|---|---|
| FNCO measured, wt. % | 18.56 | 18.36 | 17.90 | 22.94 | — |
| Viscosity (Brookfield) at 25° C., cps. | 9660 | 1444 | 2850 | 4270 | — |
| Centrifugible Solids, Unstripped, wt. % | 1.33 | 19.16 | 22.13 | 93.35 | — |
| Top Layer (Clear Layer) Before Tipping, % | 0 | 4 | 6 | 8 | — |
| Appearance of Top Layer | — | Liquid Dark Brown | Liquid Dark Brown | Liquid Dark Brown | — |
| Centrifugible Solids, Stripped, wt. % | 1.96 | 3.08 | 3.55 | — | — |
| Top Layer (Clear Layer) Before Tipping, % | 76 | 0 | 0 | 84 | — |
| Appearance of Top Layer | Brown Dispersion | — | — | Cake | — |
| Middle Layer, % | 0 | 0 | 0 | 0 | — |
| Bottom Layer, % | 24 | 100 | 100 | 16 | — |
| Filtration Hindrance: (11) | | | | | |
| 150-Mesh Screen, Time to See Screen, sec. | 285 | 69 | 103 | 300 | — |
| 150-Mesh Screen, % Through | 100 | 100 | 100 | 38.33 | — |
| 150-Mesh Screen, Solids on Screen, ppm | 125 | 96 | 90 | 106 | — |
| 325-Mesh Screen, Time to See Screen, sec. | 1200 | 204 | 400 | 300 | — |
| 325-Mesh Screen, % Through | 87.35 | 100 | 565 | 4.0 | 100 |
| 325-Mesh Screen, Solids on Screen, ppm | 46 | 36 | 114 | 1063 | — |
| 700-Mesh Screen, Time to See Screen, sec. | — | — | — | — | — |
| 700-Mesh Screen, % Through | — | — | — | — | — |
| 700-Mesh Screen, Solids on Screen, ppm | — | — | — | — | — |

| EXAMPLE | E | F | G | H | I | J | K |
|---|---|---|---|---|---|---|---|
| Polyacrylonitrile in Stripped Product by Calc., wt. % (7) | — | — | — | — | — | — | — |
| Second Polymer in Stripped Product by Calc., wt. % (7) | — | — | — | — | — | — | — |
| Total Polymer in Stripped Product by Calc., wt. % (7) | — | — | — | — | — | — | — |
| Total Polymer by Calc. (from volatiles collected), wt. % (8) | — | — | — | — | — | — | — |
| FNCO by Calc. (from free monomer analysis), wt. % (9) | — | — | — | — | — | — | — |
| FNCO by Calc. (from volatiles collected), wt. % (10) | — | — | — | — | — | — | — |
| FNCO measured, wt. % | — | — | — | — | — | — | — |
| Viscosity (Brookfield) at 25° C., cps | — | — | — | — | — | — | — |
| Centrifugible Solids, Unstripped, wt. % | — | — | — | — | — | — | — |
| Top Layer (Clear Layer) Before Tipping, % | — | — | — | — | — | — | — |
| Appearance of Top Layer | — | — | — | — | — | — | — |
| Centrifugible Solids, Stripped, wt. % | — | — | — | — | — | — | — |
| Top Layer (Clear Layer) Before Tipping, % | — | — | — | — | — | — | — |
| Appearance of Top Layer | — | — | — | — | — | — | — |
| Middle Layer, % | — | — | — | — | — | — | — |
| Bottom Layer, % | — | — | — | — | — | — | — |
| Filtration Hindrance: (11) | | | | | | | |
| 150-Mesh Screen, Time to See Screen, sec. | 28 | 32 | 753 | 4 | 4 | 148 | 113 |
| 150-Mesh Screen, % Through | 100 | 100 | 100 | 100 | 100 | 100 | 100 |
| 150-Mesh Screen, Solids on Screen, ppm | 36 | 29 | 113 | 3 | 10 | 47 | 35 |
| 325-Mesh Screen, Time to See Screen, sec. | 277 | 140 | 1200 | 5 | 10 | 534 | 257 |
| 325-Mesh Screen, % Through | 3.83 | 100 | 14.5 | 100 | 100 | 100 | 100 |
| 325-Mesh Screen, Solids on Screen, ppm | 1057 | 15 | 507 | 2 | 5 | 7 | 7 |
| 700-Mesh Screen, Time to See Screen, Sec. | — | 668 | — | 54 | 79 | 1200 | 1200 |
| 700-Mesh Screen, % Through | — | 100 | — | 100 | 100 | 53 | 59 |
| 700-Mesh Screen, Solids on Screen, ppm | — | 39 | — | 7 | 10 | 413 | 161 |

(7) Calculated from feed rates, free monomer analysis and material balance.
(8) Calculated from free monomer content of unstripped product or in feed and volatiles collected during stripping.
(9) Calculated from measured FNCO of the isocyanate used and polymer content as calculated from feed rates, free monomer analysis and material balance.
(10) Calculated from measured FNCO of the isocyanate used and polymer content as calculated from volatiles collected during stripping.
(11) 2/1 dilution with base isocyanate.

EXAMPLES 21 AND 22

In Examples 21 and 22, comparative Examples L and M and Run f, the procedure described in regard to Examples 1 through 20 was used except that certain reaction conditions were different as provided in Table IIA below.

The prepolymers used in comparative Examples L and M were prepared in accordance with the following procedure. Required amounts of an isocyanate and a polyol were mixed under inert atmosphere at room temperature. The mixture was heated to 75° C.±5° C. and held at that temperature for one hour. The mixture was then cooled to about 25° C. and filtered through a 150-mesh screen. The properties of the prepolymers are discussed hereinabove. The isocyanate/prepolymer blends (IPRE) used in Examples 21 and 22 and Run f were prepared by filtering an isocyanate through a 150-mesh screen and then mixing the filtered isocyanate with a prepolymer at room temperature for one hour. An inert atmosphere was maintained over the charge during mixing. The properties of the isocyanate/prepolymer blends are described hereinabove.

Examples 21 and 22 illustrate the production of highly stable and highly filterable polymer/polyisocyanate compositions utilzing isocyanato-terminated prepolymers as stabilizers. The viscosities were also in the desirably low range. Compared with polymer/polyisocyanate compositions prepared by the polymerization of a polymer in a prepolymer without a stabilizer as illustrated in comparative Examples L and M, the polymer/polyisocyanate compositions of Examples 21 and 22 have significantly lower viscosity and less dilution of the FNCO content of the base isocyanate. Reduction in viscosity is achieved without any adverse effect on filterability and dispersion stability. This allows the polymer content to be increased still higher.

Also, low viscosity polymer/polyisocyanate compositions are easier to handle in the preparation of polyurethane products.

Run f illustrates an unsuccessful attempt to prepare a stable polymer/polyisocyanate composition of this invention. The composition had a high viscosity and layered out overnight (top layer was brown dispersion and bottom layer was dark isocyanate—no polymer cake noticed). It should be noted that Isocyanate VI contains some amount of high functional species which are not compatible with a polyol. This non-compatibility causes the separation of high functional species of Isocyanate VI from the product. These high functional species have higher specific gravity so they form a bottom layer as demonstrated in Run f.

The equivalent ratio of isocyanato groups to hydroxy groups (isocyanate index) of the prepolymers and isocyanate/prepolymer blends used in Examples 21 and 22, comparative Examples L and M and Run f are listed in Table A below:

TABLE A
ISOCYANATE INDEX OF PREPOLYMERS AND ISOCYANATE/PREPOLYMER BLENDS

| Example | Prepolymer and/or Isocyanate/Prepolymer Blend | Isocyanate Index |
|---|---|---|
| 21 | Prepolymer II | 15.7 |
|    | IPRE-1 | 26.9 |
| 22 | Prepolymer II | 15.7 |
|    | IPRE-2 | 76.78 |
| L  | Prepolymer II | 15.7 |
| M  | Prepolymer I | 21.0 |
| f  | Prepolymer III | 21.42 |
|    | IPRE-3 | 57.14 |

The isocyanate index of the isocyanate/prepolymer blends of this invention is a value greater than 25. The isocyanate index of the prepolymers per se can be less than 25 provided that the corresponding isocyanate/prepolymer blends have an isocyanate index greater than 25.

Comparative Examples E, F and J described hereinabove provide filterability measurements for the polyisocyanates used in Examples 21 and 22, comparative Examples L and M and Run f.

TABLE IIA
USE OF ISOCYANATO-TERMINATED PREPOLYMERS AS STABILIZERS FOR POLYMER/POLYISOCYANATE COMPOSITIONS (CONTINUOUS BENCH-SCALE UNIT)
PROCESS DATA

| EXAMPLE | 21 | 22 | L | M | f |
|---|---|---|---|---|---|
| Blend Identification | IPRE-1 | IPRE-2 | Prepolymer II | Prepolymer I | IPRE-3 |
| Reaction Temperature, °C. | 130 | 130 | 130 | 135 | 135 |
| Residence Time, min. | 12.70 | 12.90 | 12.66 | 15.0 | 12.00 |
| Catalyst | VAZO-64 | VAZO-64 | VAZO-64 | VAZO-64 | VAZO-64 |
| Catalyst Conc. in Feed, wt. % | 1.3 | 1.3 | 1.3 | 1.25 | 1.19 |
| Feed Stream Containing Catalyst | Monomer | Monomer | Monomer | Monomer | Monomer |
| Monomer Content in Feed, wt. % (1) | 22.30 | 21.98 | 21.68 | 20.11 | 20.83 |
| Ratio of Acrylonitrile to Second Monomer, wt. % | 100/0 | 100/0 | 100/0 | 100/0 | 100/0 |
| Second Monomer | None | None | None | None | None |
| Blend Feed Rate, gm/hr (2) | 2007 | 2038 | 2048 | 1756 | 2220 |
| Monomer Feed Rate, gm/hr (3) | 576 | 574 | 567 | 442 | 584 |
| Product Weight, gm/hr | 2607 | 2563 | 2603 | 2190 | 2783 |
| Material Balance, % | 100.92 | 98.12 | 99.54 | 99.64 | 99.25 |
| Stripping (Batch) Temperature, °C. | 90–95 | 90–95 | 90–95 | 90–100 | 90–100 |
| Residual Acrylonitrile in Unstripped Product, wt. % | 3.28 | 3.50 | 2.94 | 2.09 | — |
| Second Monomer in Unstripped Product, wt. % | — | — | — | — | — |
| TMSN in Unstripped Product, wt. % | 0.82 | 0.38 | 0.43 | — | — |
| Volatiles Collected During Stripping, wt. % (4) | 3.06 | 3.09 | 2.29 | 2.54 | 3.41 |
| Conversions, Acrylonitrile, % (5) | 84.22 | 83.38 | 85.67 | 88.95 | — |
| Second Monomer, % (5) | — | — | — | — | — |
| Combined, % (5) | 84.22 | 83.38 | 85.67 | 88.95 | — |
| Combined (from volatiles collected), % (6) | 85.41 | 85.05 | 88.76 | 86.54 | 82.60 |

(1), (2), (3), (4), (5) and (6) same as in Table IA.

TABLE IIB
USE OF ISOCYANATO-TERMINATED PREPOLYMERS AS STABILIZERS FOR POLYMER/POLYISOCYANATE COMPOSITIONS (CONTINUOUS BENCH-SCALE UNIT)
PRODUCT DATA

| EXAMPLE | 21 | 22 | L | M | f |
|---|---|---|---|---|---|
| Polyacrylonitrile in Stripped Product by Calc., wt. % (7) | 18.30 | 17.86 | 18.01 | 17.35 | — |
| Second Polymer in Stripped Product by Calc., wt. % (7) | — | — | — | — | — |
| Total Polymer in Stripped Product by Calc., wt. % (7) | 18.30 | 17.86 | 18.01 | 17.35 | — |
| Total Polymer by Calc. (from volatiles collected), wt. % (8) | 18.48 | 18.14 | 18.51 | 16.75 | 16.76 |
| FNCO by Calc. (from free monomer analysis), wt. % (9) | 16.75 | 20.94 | 13.76 | 13.55 | — |
| FNCO by Calc. (from volatiles collected), wt. % (10) | 16.96 | 21.20 | 13.89 | 13.64 | 18.27 |
| FNCO measured, wt. % | 16.13 | 20.02 | 12.94 | 12.59 | 18.57 |
| Viscosity (Brookfield) at 25° C., cps | 3400 | 978 | 9340 | 9400 | 8740 |
| Centrifugible Solids, Unstripped, wt. % | 2.16 | 2.76 | 2.65 | 7.06 | 1.42 |
| Top Layer (Clear Layer) Before Tipping, % | 0 | 0 | 0 | 0 | 0 |
| Appearance of Top Layer | — | — | — | — | — |
| Centrifugible Solids, Stripped, wt. % | 2.48 | 1.91 | 3.29 | 4.94 | 2.61 |
| Top Layer (Clear Layer) Before Tipping, % | 0 | 0 | 0 | 0 | 72 |
| Appearance of Top Layer | — | — | — | — | Brown Dispersion |
| Middle Layer, % | 0 | 0 | 0 | 0 | 0 |
| Bottom Layer, % | 100 | 100 | 100 | 100 | 28 |

TABLE IIB-continued

USE OF ISOCYANATO-TERMINATED PREPOLYMERS AS STABILIZERS FOR POLYMER/
POLYISOCYANATE COMPOSITIONS (CONTINUOUS BENCH-SCALE UNIT)
PRODUCT DATA

| EXAMPLE | 21 | 22 | L | M | f |
|---|---|---|---|---|---|
| Filtration Hindrance: (11) | | | | | |
| 150-Mesh Screen, Time to See Screen, sec. | 193 | 76 | 178 | 116 | 493 |
| 150-Mesh Screen, % Through | 100 | 100 | 100 | 100 | 100 |
| 150-Mesh Screen, Solids on Screen, ppm | 42 | 120 | 89 | 126 | 171 |
| 320-Mesh Screen, Time to See Screen, sec. | 300 | 110 | 600 | 539 | 1200 |
| 320-Mesh Screen, % Through | 9.83 | 7.5 | 49.83 | 100 | 59 |
| 320-Mesh Screen, Solids on Screen, ppm | 214 | 320 | 153 | 59 | 75 |
| 700-Mesh Screen, Time to See Screen, sec. | — | — | — | — | — |
| 700-Mesh Screen, % Through | — | — | — | — | — |
| 700-Mesh Screen, Solids on Screen, ppm | — | — | — | — | — |

(7), (8), (9), (10) and (11) same as in Table IB.

EXAMPLES 23 THROUGH 26

In Examples 23 through 26 and Runs g and h, the procedure described in regard to Examples 1 through 20 was used except that certain reaction conditions were different as provided in Table III A below.

The isocyanate/polymer/polyol blends (IPB) used in the Examples and Runs were prepared in accordance with the following procedure. The isocyanate was filtered through a 150-mesh screen and mixed with a polymer/polyol at room temperature for one hour. An inert atmosphere was maintained over the charge during mixing. The properties of the resulting isocyanate/polymer/polyol blends are discussed hereinabove.

Examples 23 through 26 illustrate the production of polymer/polyisocyanate compositions (utilizing polymer/polyols as stabilizers) have good dispersion characteristics as evidenced by the good to excellent filterability of said compositions. The viscosities and centrifugible solids of the compositions were for the most part in the desirably low range.

The relatively high viscosities of Examples 24 and 26 and the relatively high solids of Example 26 are attributable to the high total polymer content in the polymer/polyisocyanate compositions. Electron micrographs showed agglomeration of the polymer particles in the polymer/polyisocyanate compositions of Examples 24 and 26. By limiting the polymer content to a range from 20 wt. % to about 24 wt. % when utilizing Isocyanate II, the viscosities and solids of the compositions can be reduced to a more preferable range. (See Examples 23 and 25). The concentration of the polymer/polyol stabilizer in the polymer/polyisocyanate compositions of this invention can range from about 10 to about 30 weight percent.

The product of Run g had a very high viscosity and a very high concentration of agglomerated polymer particles as seen in an electron micrograph. This is attributable to the high total polymer content in the polymer/polyisocyanate compositions. Reducing the total polymer content to a range of from 20 wt. % to about 24 wt. % will eliminate these undesirable properties.

Run h illustrates an unsuccessful attempt to prepare a high solids polymer/polyisocyanate composition. The monomer and catayst content in the feed was set at 35.82 wt. %. The reactor plugged up and Run h was not completed.

Comparative Examples E and F described hereinabove provide filterability measurements for the polyisocyanates used in Examples 23 through 26 and Runs g and h.

TABLE IIIA

USE OF POLYMER POLYOLS AS STABILIZERS FOR POLYMER/POLYISOCYANATE COMPOSITIONS
(CONTINUOUS BENCH-SCALE UNIT)
PROCESS DATA

| EXAMPLE | 23 | 24 | 25 | 26 | g | h |
|---|---|---|---|---|---|---|
| Blend Identification | IPB-2 | IPB-2 | IPB-3 | IPB-1 | IPB-1 | IPB-1 |
| Reaction Temperature, °C. | 137 | 135 | 125 | 137 | 140 | — |
| Residence Time, min. | 12 | 12 | 12 | 12 | 12 | 12 |
| Catalyst | VAZO-64 | VAZO-64 | VAZO-64 | VAZO-64 | VAZO-64 | VAZO-64 |
| Catalyst Conc. in Feed, wt. % | 1.29 | 1.39 | 1.16 | 1.28 | 1.39 | 1.64 |
| Feed Stream Containing Catalyst | Monomer | Monomer | Monomer | Monomer | Monomer | Monomer |
| Monomer Content in Feed, wt. % (1) | 23.84 | 25.72 | 23.41 | 28.07 | 30.45 | 35.82 |
| Ratio of Acrylonitrile to Second Monomer, wt. % | 100/0 | 100/0 | 100/0 | 100/0 | 100/0 | 100/0 |
| Second Monomer | None | None | None | None | None | None |
| Blend Feed Rate, gm/hr (2) | 2080 | 2047 | 2172 | 2009 | 1960 | 1806 |
| Monomer Feed Rate, gm/hr (3) | 651 | 709 | 664 | 784 | 858 | 1008 |
| Product Weight, gm/hr | 2798 | 2728 | 2807 | 2776 | 2797 | — |
| Material Balance, % | 102.45 | 98.98 | 98.98 | 99.39 | 99.25 | — |
| Stripping (Batch) Temperature, °C. | 90–100 | 90–100 | — | 90–100 | 91–100 | 90–100 |
| Residual Acrylonitrile in Unstripped Product, wt. % | 2.61 | 2.55 | 3.94 | 3.02 | 3.29 | — |
| Second Monomer in Unstripped Product, wt. % | — | — | — | — | — | — |
| TMSN in Unstripped Product, wt. % | — | — | 0.26 | — | — | — |
| Volatiles Collected During Stripping, wt. % (4) | 3.21 | 3.59 | 3.36 | 3.64 | 3.67 | — |
| Conversions, Acrylonitrile, % (5) | 88.14 | 89.63 | 82.47 | 88.79 | 88.76 | — |
| Second Monomer, % (5) | — | — | — | — | — | — |
| Combined, % (5) | 88.14 | 89.63 | 82.47 | 88.79 | 88.76 | — |
| Combined (from volatiles collected), % (6) | 84.85 | 85.20 | 85.64 | 86.40 | 87.40 | — |

(1), (2), (3), (4), (5) and (6) same as in Table IA.

TABLE IIIB

USE OF POLYMER POLYOLS AS STABILIZERS FOR POLYMER/POLYISOCYANATE COMPOSITIONS
(CONTINUOUS BENCH-SCALE UNIT)
PRODUCT DATA

| EXAMPLE | 23 | 24 | 25 | 26 | g | h |
|---|---|---|---|---|---|---|
| New Polyacrylonitrile in Stripped Product by Calc., wt. % (7) | 20.69 | 22.70 | 19.11 | 24.85 | 27.05 | — |
| Polyacrylonitrile from Feed by Calc., wt. % of Stripped Product (7) | 2.54 | 2.47 | 1.50 | 1.80 | 1.75 | — |
| Total Polymer in Stripped Product by Calc., wt. % (7) | 23.23 | 25.17 | 20.61 | 26.65 | 28.80 | — |
| Total Polymer by Calc. (from volatiles collected), wt. % (8) | 21.14 | 23.92 | 22.25 | 25.79 | 28.19 | — |
| FNCO by Calc. (from free monomer analysis), wt. % (9) | 18.05 | 17.59 | 20.87 | 18.38 | 17.84 | — |
| FNCO by Calc. (from volatiles collected), wt. % (10) | 18.53 | 17.88 | 20.74 | 18.59 | 17.99 | — |
| FNCO measured, wt. % | 17.31 | 16.47 | 19.92 | 17.01 | 16.56 | — |
| Viscosity (Brookfield) at 25° C. cps | 1520 | 4940 | 2150 | 4920 | 10300 | — |
| Centrifugible Solids, Unstripped, wt. % | 5.46 | 6.12 | — | 14.26 | 28.30 | — |
| Top Layer (Clear Layer) Before Tipping, % | 0 | 0 | 2.5 | 0 | 0 | — |
| Appearance of Top Layer | — | — | Cake | — | — | — |
| Centrifugible Solids, Stripped, wt. % | 2.13 | — | — | — | — | — |
| Top Layer (Clear Layer) Before Tipping, % | 0 | 2 | 5 | 2 | 2 | — |
| Appearance of Top Layer | — | Cake | Cake | Cake | Cake | — |
| Middle Layer, % | — | — | 0 | — | — | — |
| Bottom Layer, % | 100 | 98 | 95 | 98 | 98 | — |
| Filtration Hinderance: (11) | | | | | | |
| 150-Mesh Screen, Time to See Screen, sec. | 53 | 64 | 64 | 67 | 56 | — |
| , % Through | 100 | 100 | 100 | 100 | 100 | |
| , Solids on Screen, ppm | 69 | 52 | 125 | 56 | 152 | — |
| 325-Mesh Screen, Time to See Screen, sec. | 230 | 340 | 202 | 180 | 225 | — |
| , % Through | 100 | 100 | 100 | 100 | 100 | — |
| , Solids on Screen, ppm | 37 | 65 | 33 | 13 | 28 | — |
| 700-Mesh Screen, Time to See Screen, sec. | 1180 | 1200 | — | — | 1200 | — |
| , % Through | 100 | 88 | — | — | 90.5 | — |
| , Solids on Screen, ppm | 130 | 314 | — | — | 249 | — |

(7), (8), (9), (10) and (11) same as in Table IB.

EXAMPLES 27 THROUGH 33

In Examples 27 through 33, the procedure described in regard to Examples 1 through 20 was used except that certain reaction conditions were different as provided in Table IV A below.

The polymer/prepolymers used in the isocyanate/polymer/prepolymer blends (IPPB) of Examples 27 through 31 and the isocyanate/catalyst/polymer/prepolymer blends (ICPPPB) of Examples 32 and 33 were prepared in accordance with the following procedure. Required amounts of an isocyanate and a polymer/polyol were mixed under inert atmosphere at room temperature. The mixture was heated to 75° C.±5° C. and held at that temperature for one hour. The mixture was then cooled to about 25° C. and filtered through a 150-mesh screen. The properties of the polymer/prepolymers are discussed hereinabove. The isocyanate/polymer/prepolymer blends (IPPB) used in Examples 27 through 31 were prepared by filtering an isocyanate through a 150-mesh screen and then mixing the filtered isocyanate with a polymer/prepolymer at room temperature for one hour. An inert atmosphere was maintained over the charge during mixing. The properties of the isocyanate/polymer/prepolymer blends are described hereinabove. The isocyanate/catalyst/polymer/prepolymer blends (ICPPPB) used in Examples 32 and 33 were prepared by mixing an isocyanate with a polymer/prepolymer and heating the mixture to 40° C.±2° C. under inert atmosphere. A catalyst was then added and the resulting charge was mixed until the catalyst was dissolved. The isocyanate/catalyst/polymer/prepolymer blend was cooled to about 25° C. and filtered through a 150-mesh screen. The properties of the isocyanate/catalyst/polymer/prepolymer blends are described hereinabove.

Examples 27 through 33 illustrate the production of polymer/polyisocyanate compositions (utilizing polymer/prepolymers as stabilizers) having good dispersion characteristics as evidenced by the good to excellent filterability of said compositions. The viscosities and centrifugible solids of the compositions of Examples 27 through 33 were for the most part in the desirably low range. Compared with polymer/polyisocyanate compositions prepared by the polymerization of a polymer in a prepolymer without a stabilizer as illustrated in comparative Examples L and M (Table II A, B), the polymer/polyisocyanate compositions of Examples 27 through 33 have significantly lower viscosity and less dilution of the FNCO content of the base isocyanate. As an illustrative comparison, the polymer/polyisocyanate composition of Example 27 has a significantly lower viscosity than the polymer/polyisocyanate composition of comparative Example M (the parent polymer/prepolymer used as a stabilizer in Example 27). This can be explained on the basis of polymer particle size. Electron micrographs showed the parent polymer/prepolymer of comparative Example M to have extremely small particle size in comparison with the derived polymer/polyisocyanate composition of Example 27. The concentration of the polymer/prepolymer stabilizer in the polymer/polyisocyanate compositions of this invention can range from about 5 to about 30 weight percent, preferably 10 to 25 weight percent.

The equivalent ratio of isocyanato groups to hydroxy groups (isocyanate index) of the polymer/prepolymers, the isocyanate/polymer/prepolymer blends used in Examples 27 through 31 and the isocyanate/catalyst/polymer/prepolymer blends used in Examples 32 and 33 are listed in Table B below:

TABLE B

ISOCYANATE INDEX OF POLYMER/PREPOLYMERS, ISOCYANATE/POLYMER/PREPOLYMER BLENDS AND ISOCYANATE/CATALYST/POLYMER/PREPOLYMER BLENDS

| Example | Polymer/Prepolymer and Isocyanate/Polymer/Prepolymer Blend or Isocyanate/Catalyst/Polymer/Prepolymer Blend | Isocyanate Index |
|---|---|---|
| 27 | Polymer/Prepolymer II | 21.0 |
|    | IPPB-1 | 147.97 |
| 28 | Polymer/Prepolymer II | 21.0 |
|    | IPPB-2 | 190.5 |
| 29 | Polymer/Prepolymer I | 15.7 |
|    | IPPB-3 | 250.8 |
| 30 | Polymer/Prepolymer I | 15.7 |
|    | IPPB-4 | 196.6 |
| 31 | Polymer/Prepolymer I | 15.7 |
|    | IPPB-5 | 515.8 |
| 32 | Polymer/Prepolymer III | 20.13 |
|    | ICPPPB-1 | 32.28 |
| 33 | Polymer/Prepolymer III | 20.13 |
|    | ICPPPB-2 | 91.4 |

The isocyanate index of the isocyanate/polymer/prepolymer blends and isocyanate/catalyst/polymer/prepolymer blends of this invention is a value greater than 25. The isocyanate index of the polymer/prepolymers per se can be less than 25 provided that the corresponding isocyanate/polymer/prepolymer blends and isocyanate/catalyst/polymer/prepolymer blends have an isocyanate index greater than 25.

Comparative Examples E and F described hereinabove provide filterability measurements for the polyisocyanates used in Examples 27 through 33.

TABLE IV A

USE OF POLYMER PREPOLYMERS AS STABILIZERS FOR POLYMER/POLYISOCYANATE COMPOSITIONS (CONTINUOUS BENCH-SCALE UNIT) PROCESS DATA

| EXAMPLE | 27 | 28 | 29 | 30 | 31 | 32 | 33 |
|---|---|---|---|---|---|---|---|
| Blend Identification | IPPB-1 | IPPB-2 | IPPB-3 | IPPB-4 | IPPB-5 | ICPPPB-1 | ICPPPB-2 |
| Reaction Temperature, °C. | 135 | 135 | 125 | 125 | 125 | 125 | 125 |
| Residence Time, min. | 11.5 | 12 | 12 | 12 | 12 | 12 | 12 |
| Catalyst | VAZO-64 | VAZO-64 | VAZO-64 | VAZO-64 | VAZO-64 | VAZO-64 | VAZO-64 |
| Catalyst Conc. in Feed, wt. % | 1.14 | 1.23 | 1.2 | 1.2 | 1.2 | 1.17 | 1.16 |
| Feed Stream Containing Catalyst | Monomer | Monomer | Monomer | Monomer | Monomer | Monomer & Isocyanate | Monomer & Isocyanate |
| Monomer Content in Feed, wt. % (1) | 18.22 | 19.73 | 24.93 | 24.71 | 24.70 | 24.52 | 23.47 |
| Ratio of Acrylonitrile to Second Monomer, wt. % | 100/0 | 100/0 | 100/0 | 100/0 | 100/0 | 100/0 | 100/0 |
| Second Monomer | None | None | None | None | None | None | None |
| Blend Feed Rate, gm/hr (2) | 2352 | 2262 | 2042 | 2105 | 2094 | 2121 | 2149 |
| Monomer Feed Rate, gm/hr (3) | 524 | 556 | 678 | 691 | 687 | 689 | 659 |
| Product Weight, gm/hr | 2877 | 2791 | 2700 | 2761 | 2733 | 2788 | 2795 |
| Material Balance, % | 100.03 | 99.04 | 99.26 | 98.75 | 98.27 | 99.22 | 99.54 |
| Stripping (Batch) Temperature, °C. | 90–100 | 90–100 | 90–95 | 90–95 | 90–95 | — | — |
| Residual Acrylonitrile in Unstripped Product, wt. % | 2.28 | 3.39 | 3.84 | 3.80 | 4.42 | 2.61 | 3.19 |
| Second Monomer in Unstripped Product, wt. % | — | — | — | — | — | — | — |
| TMSN in Unstripped Product, wt. % | — | — | 0.34 | 0.52 | 0.52 | 0.24 | 0.18 |
| Volatiles Collected During Stripping, wt. % (4) | 3.18 | 3.96 | 3.32 | 3.00 | 3.85 | 2.05 | 3.06 |
| Conversions, Acrylonitrile, % (5) | 86.65 | 81.85 | 83.91 | 84.02 | 81.50 | 89.26 | 86.23 |
| Second Monomer, % (5) | — | — | — | — | — | — | — |
| Combined, % (5) | 86.65 | 81.85 | 83.91 | 84.02 | 81.50 | 89.26 | 86.23 |
| Combined (from volatiles collected), % (6) | 81.33 | 78.59 | 85.98 | 87.27 | 83.60 | 91.63 | 86.95 |

(1), (2), (3), (4), (5) and (6) same as in Table IA.

TABLE IV B

USE OF POLYMER PREPOLYMERS AS STABILIZERS FOR POLYMER/POLYISOCYANATE COMPOSITIONS (CONTINUOUS BENCH-SCALE UNIT) PRODUCT DATA

| EXAMPLE | 27 | 28 | 29 | 30 | 31 | 32 | 33 |
|---|---|---|---|---|---|---|---|
| New Polyacrylonitrile in Stripped Product by Calc., wt. % (7) | 15.32 | 15.87 | 20.68 | 20.53 | 20.02 | 22.09 | 20.55 |
| Polyacrylonitrile from Feed by Calc., wt. % of Stripped Product (7) | 3.67 | 2.92 | 1.68 | 2.11 | 0.85 | 3.36 | 1.47 |
| Total Polymer in Stripped Product by Calc., wt. % (7) | 18.99 | 18.79 | 22.36 | 22.64 | 20.87 | 25.45 | 22.02 |
| Total Polymer by Calc. (from volatiles collected), wt. % (8) | 17.85 | 17.94 | 22.75 | 23.29 | 21.24 | 26.29 | 22.58 |
| FNCO by Calc. (from free monomer analysis), wt. % (9) | 20.91 | 21.49 | 21.69 | 21.27 | 22.56 | 16.09 | 20.52 |
| FNCO by Calc. (from volatiles collected), wt. % (10) | 21.16 | 21.67 | 21.92 | 21.62 | 22.79 | 16.11 | 20.49 |
| FNCO measured, wt. % | 20.06 | 20.92 | 20.66 | 20.22 | 21.71 | 15.35 | 19.61 |
| Acidity as HCl, wt. % | — | — | 0.018 | 0.011 | 0.011 | — | — |
| Viscosity (Brookfield) at 25° C., cps | 986 | 1900 | 4520 | 2520 | 4100 | 6400 | 2550 |
| Centrifugible Solids, Unstripped, wt. % | 11.04 | — | — | — | — | 3.60 | — |
| Top Layer (Clear Layer) Before Tipping, % | 0 | 4 | 82 | 88 | 72 | 0 | 1.2 |
| Appearance of Top Layer | — | Cake | Cake | Cake | Cake | — | Cake |

TABLE IV B-continued
USE OF POLYMER PREPOLYMERS AS STABILIZERS FOR POLYMER/POLYISOCYANATE COMPOSITIONS
(CONTINUOUS BENCH-SCALE UNIT)
PRODUCT DATA

| EXAMPLE | 27 | 28 | 29 | 30 | 31 | 32 | 33 |
|---|---|---|---|---|---|---|---|
| Centrifugible Solids, Stripped, wt. % | — | — | — | — | — | 2.09 | — |
| Top Layer (Clear Layer) Before Tipping, % | 4 | 92 | 86 | 14 | 84 | 0 | 3.1 |
| Appearance of Top Layer | Cake | Soft Cake | Cake | Cake | Cake | — | Cake |
| Middle Layer, % | — | 0 | 0 | 0 | 0 | — | — |
| Bottom Layer, % | 96 | 8 | 14 | 86 | 16 | 100 | 96.9 |
| Filtration Hinderance: (11) | | | | | | | |
| 150-Mesh Screen, Time to See Screen, sec. | 68 | 69 | 74 | 76 | 79 | 112 | 66 |
| , % Through | 100 | 100 | 100 | 100 | 100 | 100 | 100 |
| , Solids on Screen, ppm | 105 | 83 | 57 | 77 | 68 | 69 | 57 |
| 325-Mesh Screen, Time to See Screen, sec | 276 | 172 | 200 | 210 | 200 | 253 | 214 |
| , % Through | 100 | 100 | 18 | 100 | 9 | 100 | 100 |
| , Solids on Screen, ppm | 20 | 35 | 833 | 30 | 861 | 14 | 14 |
| 700-Mesh Screen, Time to See Screen, sec. | — | — | — | — | — | — | — |
| , % Through | — | — | — | — | — | — | — |
| , Solids on Screen, ppm | — | — | — | — | — | — | — |

(7), (8), (9), (10) and (11) same as in Table IB.

EXAMPLES 34 THROUGH 39

In Examples 34 through 39 and Run 1, the procedure described in regard to Examples 1 through 20 was used except that certain reaction conditions were different as provided in Table V A below.

The isocyanate/modified polyol blends (IMPB) used in the Examples and Run were prepared in accordance with the following procedure. The isocyanate was filtered through a 150-mesh screen and mixed with a modified polyol at room temperature for one hour. An inert atmosphere was maintained over the charge during mixing. The properties of the resulting isocyanate/modified polyol blends are discussed hereinabove.

Examples 34 through 39, illustrate the production of polymer/polyisocyanate compositions (utilizing modified polyols as stabilizers) having good dispersion characteristics as evidenced by the good to excellent filterability of said compositions. The viscosities and centrifugible solids of the compositions were for the most part in the desirably low range.

The relatively high viscosity and solids of Example 35 are attributable to the high total polymer content in the polymer/polyisocyanate compositions. A reduction in the polymer content in this Example could reduce the viscosity and solids to a more preferable range. (See Examples 34, 36 and 39).

The high percentage for top layer before tipping in the stripped product of Example 38 is the result of a very low concentration of modified polyol stabilizer in the polymer/polyisocyanate compositions. The concentration of the modified polyol stabilizer in the polymer/polyisocyanate compositions of this invention can range from about 5 to about 30 weight percent, preferably from about 10 to about 25 weight percent. Electron micrographs showed agglomeration of the polymer particles in the polymer/polyisocyanate compositions of Examples 37 and 38 and showed small polymer particles in the polymer/polyisocyanate composition of Example 36. It is noted that a higher concentration of modified polyol stabilizer in the polymer/polyisocyanate compositions reduces agglomeration of the polymer particles and results in smaller polymer particle size because of a greater amount of grafted species.

The product of Run i had very high viscosity and solids. An electron micrograph showed agglomeration of the polymer particles in the polymer/polyisocyanate composition of Run i. This is due to the high total polymer content in the polymer/polyisocyanate compositions. Reducing the total polymer content will eliminate these undesirable properties (See Examples 34, 36 and 39). Increasing the concentration of modified polyol stabilizer in the polymer/polyisocyanate composition of Run i will reduce agglomeration of the polymer particles and result in smaller particle size because of a greater amount of grafted species. (See Examples 34, 36 and 39).

Comparative Examples D, E and F described hereinabove provide filterability measurements for the polyisocyanates used in Examples 34 through 39 and Run i. The filterability of Isocyanate I used in Example 35 and Run i is provided in comparative Example D. The filterability of Isocyanate I used in Examples 36 through 39 is provided in comparative Example E.

TABLE V A
USE OF MODIFIED POLYOLS AS STABILIZERS FOR POLYMER/POLYISOCYANATE COMPOSITIONS
(CONTINUOUS BENCH-SCALE UNIT)
PROCESS DATA

| EXAMPLE | 34 | 35 | 36 | 37 | 38 | 39 | i |
|---|---|---|---|---|---|---|---|
| Blend Identification | IMPB-1 | IMPB-3 | IMPB-5 | IMPB-6 | IMPB-7 | IMPB-8 | IMPB-2 |
| Reaction Temperature, °C. | 135 | 135 | 125 | 125 | 125 | 125 | 135 |
| Residence Time, min. | 12 | 11.5 | 12 | 11.5 | 12 | 12 | 11.4 |
| Catalyst | VAZO-64 | VAZO-64 | VAZO-64 | VAZO-64 | VAZO-64 | VAZO-64 | VAZO-64 |
| Catalyst Conc. in Feed, wt. % | 1.20 | 1.20 | 1.20 | 1.20 | 1.20 | 1.20 | 1.19 |
| Feed Stream Containing Catalyst | Monomer | Monomer | Monomer | Monomer | Monomer | Monomer | Monomer |
| Monomer Content in Feed, wt. % (1) | 26.14 | 32.16 | 24.28 | 23.70 | 24.33 | 24.62 | 32.02 |
| Ratio of Acrylonitrile to Second Monomer, wt. % | 100/0 | 100/0 | 100/0 | 100/0 | 100/0 | 100/0 | 100/0 |
| Second Monomer | None | None | None | None | None | None | None |
| Blend Feed Rate, gm/hr (2) | 2102 | 1953 | 2036 | 2179 | 2127 | 2082 | 1974 |
| Monomer Feed Rate, gm/hr (3) | 744 | 926 | 653 | 677 | 684 | 680 | 930 |
| Product Weight, gm/hr | 2737 | 2879 | 2656 | 2875 | 2847 | 2744 | 2858 |

TABLE V A-continued

USE OF MODIFIED POLYOLS AS STABILIZERS FOR POLYMER/POLYISOCYANATE COMPOSITIONS
(CONTINUOUS BENCH-SCALE UNIT)
PROCESS DATA

| EXAMPLE | 34 | 35 | 36 | 37 | 38 | 39 | i |
|---|---|---|---|---|---|---|---|
| Material Balance, % | 96.17 | 98.61 | 98.77 | 100.66 | 101.28 | 99.35 | 98.41 |
| Stripping (Batch) Temperature, °C. | 90–100 | 90–100 | 90–95 | 90–95 | 90–95 | 90–95 | 90–100 |
| Residual Acrylonitrile in Unstripped Product, wt. % | 2.85 | 5.06 | 2.75 | 3.95 | 4.73 | 3.80 | 7.76 |
| Second Monomer in Unstripped Product, wt. % | — | — | — | — | — | — | — |
| TMSN in Unstripped Product, wt. % | — | — | 0.20 | 0.19 | 0.52 | 0.57 | — |
| Volatiles Collected During Stripping, wt. % (4) | 4.14 | 4.66 | 2.83 | 4.16 | 4.64 | 3.65 | 7.68 |
| Conversions, Acrylonitrile, % (5) | 89.01 | 83.89 | 88.23 | 82.35 | 79.28 | 83.87 | 75.23 |
| Second Monomer, % (5) | — | — | — | — | — | — | — |
| Combined, % (5) | 89.01 | 83.89 | 88.23 | 82.35 | 79.28 | 83.87 | 75.23 |
| Combined (from volatiles collected), % (6) | 83.42 | 84.96 | 87.74 | 81.53 | 79.93 | 84.40 | 72.78 |

(1), (2), (3), (4), (5) and (6) same as in Table IA.

TABLE V B

USE OF MODIFIED POLYOLS AS STABILIZERS FOR POLYMER/POLYISOCYANATE COMPOSITIONS
(CONTINUOUS BENCH-SCALE UNIT)
PRODUCT DATA

| EXAMPLE | 34 | 35 | 36 | 37 | 38 | 39 | i |
|---|---|---|---|---|---|---|---|
| Polyacrylonitrile in Stripped Product by Calc., wt. % (7) | 23.11 | 27.69 | 20.94 | 19.33 | 19.28 | 20.42 | 25.44 |
| Second Polymer in Stripped Product by Calc., wt. % (7) | — | — | — | — | — | — | — |
| Total Polymer in Stripped Product by Calc., wt. % (7) | 23.11 | 27.69 | 20.94 | 19.33 | 19.28 | 20.42 | 25.44 |
| Total Polymer by Calc. (from volatiles collected), wt. % (8) | 21.73 | 29.61 | 20.84 | 19.16 | 19.38 | 20.50 | 25.78 |
| FNCO by Calc. (from free monomer analysis), wt. % (9) | 18.54 | 18.42 | 20.10 | 21.99 | 22.72 | 20.18 | 19.88 |
| FNCO by Calc. (from volatiles collected), wt. % (10) | 18.87 | 18.44 | 20.43 | 22.37 | 23.02 | 20.45 | 19.79 |
| FNCO measured, wt. % | 18.01 | 17.10 | 19.50 | 21.52 | 22.23 | 19.55 | 18.26 |
| Acidity as HCl, wt. % | Nil | 0.049 | 0.018 | 0.016 | 0.015 | 0.011 | 0.046 |
| Viscosity (Brookfield) at 25° C., cps | 1740 | 5500 | 1170 | 1328 | 1432 | 1116 | 12750 |
| Centrifugible Solids, Unstripped, wt. % | 1.93 | 19.20 | 3.31 | — | — | 3.81 | 80.95 |
| Top Layer (Clear Layer) Before Tipping, % | 0 | 4 | 0 | 4 | 34 | 0 | 18 |
| Appearance of Top Layer | — | Liquid, Dark Brown | — | Cake | Cake | — | Liquid, Dark Brown |
| Centrifugible Solids, Stripped, wt. % | 3.28 | 3.34 | 1.19 | — | — | 4.52 | — |
| Top Layer (Clear Layer) Before Tipping, % | 0 | 0 | 0 | 12 | 76 | — | 92 |
| Appearance of Top Layer | — | — | — | Cake | Cake | — | Cake |
| Middle Layer, % | 0 | 0 | 0 | 0 | — | — | — |
| Bottom Layer, % | 100 | 100 | 100 | 88 | 24 | 1-0 | 8 |
| Filtration Hinderance: (11) | | | | | | | |
| 150-Mesh Screen, Time to See Screen, sec. | 60 | 114 | 74 | 76 | 62 | 83 | 160 |
| , % Through | 100 | 100 | 100 | 100 | 100 | 100 | 100 |
| , Solids on Screen, ppm | 132 | 105 | 47 | 48 | 65 | 135 | 389 |
| 325-Mesh Screen, Time to See Screen, sec. | 275 | 600 | 300 | 300 | 300 | 205 | 100 |
| , % Through | 100 | 59 | 56.83 | 60.33 | 27.5 | 100 | 3 |
| , Solids on Screen, ppm | 51 | 81 | 48 | 48 | 98 | 25 | 1200 |
| 700-Mesh Screen, Time to See Screen, sec. | — | — | — | — | — | — | — |
| , % Through | — | — | — | — | — | — | — |
| , Solids on Screen, ppm | — | — | — | — | — | — | — |

(7), (8), (9), (10) and (11) same as in Table IB.

EXAMPLE 40

In Example 40 and comparative Examples N through CC, the procedure described in regard to Examples 1 through 20 was used except that certain reaction conditions were different as provided in Table VI A below.

The isocyanate/catalyst blends (ICB) used in the comparative Examples were prepared in accordance with the following procedure. A catalyst was dissolved in an isocyanate by agitating the isocyanate-catalyst mixture for 4 hours at 40° C.±2° C. An inert atmosphere of nitrogen was maintained over the charge. The resulting isocyanate/catalyst blend was then cooled to about 25° C. and filtered through a 150-mesh screen. The properties of the isocyanate/catalyst blends are discussed hereinabove. The isocyanate/catalyst-/polymer/polyol blend (ICPPB) used in Example 40 was prepared by dissolving a catalyst in an isocyanate by agitating the isocyanate-catalyst mixture for 4 hours at 40° C.±2° C. under nitrogen atmosphere. At the end of the dissolving period, a polymer/polyol was added and mixed for one hour. The resulting isocyanate/-catalyst/polymer/polyol blend was then cooled to about 25° C. and filtered through a 150-mesh screen. The properties of the isocyanate/catalyst/polymer/-polyol blend are discussed hereinabove.

Example 40 illustrates the production of a highly stable polymer/polyisocyanate composition by the in situ polymerization of acrylonitrile and a very small amount of acrylic acid and acrylamide in a blend of Ioscyanate I and Polymer/Polyol I (stabilizer). The polymer/polyisocyanate composition has good dispersion characteristics as evidenced by the good filterability. The relatively high viscosity of Example 40 is attributable to the high total polymer content in the polymer/polyisocyanate composition. By reducing the polymer content to a lower concentration when utilizing Isocyanate I, the viscosity of the composition can be reduced to a more preferable range.

Comparative Examples N through CC illustrate the production of stable polymer/polyisocyanate compositions by the in situ polymerization of acrylonitrile and a very small amount of acrylic acid and/or acrylamide in Isocyanate I, Isocyanate II or Isocyanate III without a stabilizer. As shown by the data of centrifugible solids (unstripped samples), top layer before tripping (unstripped samples), appearance of top layer (unstripped and stripped samples) and for the most part filterability, the polymer/polyisocyanate composition of Example 40 is more stable and of higher quality in comparison with polymer/polyisocyanate compositions containing no stabilizer (comparative Examples N through CC).

The process of comparative Example CC was modified to include an additional processing stage (two-stage reactor) in which the product was further reacted for an additional 12 minutes in an unagitated column having an L/D ratio of 5 and a volume of 550 cubic centimeters.

Comparative Examples S and AA illustrate unsuccessful attempts to prepare high solids polymer/polyisocyanate compositions. The monomer and catalyst content in the feed was set at 42.09 wt. % in comparative Example S and 30–30.5 wt. % in comparative Example AA. In both examples, the reactor plugged up and the run was not completed.

The back pressure regulator plugged up in comparative Example Z. The second line-out sample was stripped and tested for the properties listed in Table VI B below and the measurements for such properties are listed in Table VI B.

Comparative Examples D, E, F and G described hereinabove provide filterability measurements for the polyisocyanates used in Example 40 and comparative Examples N through CC. The filterability of Isocyanate I used in comparative Examples N through S and CC is provided in comparative Example D. The filterability of Isocyanate I used in Example 40 and comparative Examples X through BB is provided in comparative Example E.

TABLE VI A

USE OF ACRYLIC ACID AND/OR ACRYLAMIDE FOR IMPROVED POLYMER/POLYISOCYANATE COMPOSITIONS
(CONTINUOUS BENCH-SCALE UNIT)
PROCESS DATA

| EXAMPLE | 40 | N | O | P | Q | R |
|---|---|---|---|---|---|---|
| Blend Identification | ICPPB-2 | ICB-1 | ICB-2 | ICB-2 | ICB-3 | ICB-3 |
| Reaction Temperature, °C. | 125 | 135 | 135 | 135 | 138 | 138 |
| Residence Time, min. | 12 | 12 | 12 | 12 | 12 | 12 |
| Catalyst | VAZO-64 | VAZO-64 | VAZO-64 | VAZO-64 | VAZO-64 | VAZO-64 |
| Catalyst Conc. in Feed, wt. % | 0.81 | 0.92 | 1.20 | 1.12 | 1.13 | 1.08 |
| Feed Stream Containing Catalyst | Isocyanate | Isocyanate | Isocyanate | Isocyanate | Isocyanate | Isocyanate |
| Monomer Content in Feed, wt. % (1) | 31.18 | 25.4 | 28.26 | 32.96 | 32.10 | 35.28 |
| Ratio of Acrylonitrile to Second Monomer/Third Monomer, wt. % | 94/2/4 | 96/0/4 | 94/6/0 | 94/6/0 | 94/2/4 | 94/2/4 |
| Second Monomer | Acrylic Acid | None | Acrylic Acid | Acrylic Acid | Acrylic Acid | Acrylic Acid |
| Third Monomer | Acrylamide | Acrylamide | None | None | Acrylamide | Acrylamide/ |
| Blend Feed Rate, gm/hr (2) | 1898 | 2047 | 1977 | 1865 | 1882 | 1783 |
| Monomer Feed Rate, gm/hr (3) | 860 | 697 | 779 | 917 | 890 | 972 |
| Product Weight, gm/hr | 2748 | 2800 | 2722 | 2805 | 2736 | 2721 |
| Material Balance, % | 99.64 | 102.04 | 98.77 | 100.83 | 98.70 | 98.76 |
| Stripping (Batch) Temperature, °C. | 99–95 | 90–100 | 90–100 | 90–100 | 90–100 | 90–100 |
| Residual Acrylonitrile in Unstripped Product, wt. % | 4.18 | 7.73 | 10.03 | 13.36 | 8.69 | 4.88 |
| Second Monomer in Unstripped Product, wt. % | — | 0 | — | — | — | — |
| Third Monomer in Unstripped Product, wt. % | — | 0.1 | — | — | 0.06 | 0.01 |
| TMSN in Unstripped Product, wt. % | 0.29 | — | — | — | — | — |
| Volatiles Collected During Stripping, wt. % (4) | 4.38 | 5.35 | 6.84 | 7.88 | 6.71 | 5.63 |
| Conversions, Acrylonitrile, % (5) | 85.79 | 67.65 | 62.71 | 56.52 | 71.58 | 85.47 |
| Second Monomer, % (assumed) (5) | 100 | — | 100 | 100 | 100 | 100 |
| Third Monomer, % (assumed) (5) | 100 | 100 | — | — | 100 | 100 |
| Combined, % (5) | 86.64 | 68.95 | 64.95 | 59.13 | 73.28 | 86.33 |
| Combined (from volatiles collected), % (6) | 86.07 | 78.94 | 75.80 | 76.09 | 79.10 | 84.07 |

| EXAMPLE | S | T | U | V | W | X |
|---|---|---|---|---|---|---|
| Blend Identification | ICB-3 | ICB-4 | ICB-4 | ICB% | ICB-5 | ICB-7 |
| Reaction Temperature, °C. | 138 | 135 | 135 | 135 | 128 | 125 |
| Residence Time, min. | 12 | 12 | 12 | 11.5 | 11.4 | 11 |
| Catalyst | VAZO-64 | VAZO-64 | VAZO-64 | VAZO-64 | VAZO-64 | VAZO-64 |
| Catalyst Conc. in Feed, wt. % | 0.97 | 1.32 | 1.26 | 1.13 | 0.99 | 0.75 |
| Feed Stream Containing Catalyst | Isocyanate | Isocyanate | Isocyanate | Isocyanate | Isocyanate | Isocyanate |
| Monomer Content in Feed, wt. % (1) | 42.09 | 20.67 | 24.55 | 23.71 | 32.96 | 24.51 |
| Ratio of Acrylonitrile to Second Monomer/Third Monomer, wt. % | 94/2/4 | 94/2/4 | 92/2/4 | 92/2/4 | 92/2/4 | 92/6/0 |
| Second Monomer | Acrylic Acid | Acrylic Acid | Acrylic Acid | Acrylic Acid | Acrylic Acid | Acrylic Acid |
| Third Monomer | Acrylamide | Acrylamide | Acrylamide | Acrylamide | Acrylamide | Acrylamide |
| Blend Feed Rate, gm/hr (2) | 1622 | 2256 | 2177 | 2024 | 1792 | 2208 |
| Monomer Feed Rate, gm/hr (3) | 1179 | 588 | 689 | 629 | 881 | 717 |
| Product Weight, gm/hr | 2726 | 2816 | 2772 | 2635 | 2652 | 2888 |
| Material Balance, % | 97.32 | 99.01 | 98.79 | 99.32 | 99.21 | 98.74 |
| Stripping (Batch) Temperature, °C. | 90–100 | 90–100 | 90–100 | 90–100 | 90–100 | 90–92 |
| Residual Acrylonitrile in Unstripped Product, wt. % | — | 2.39 | 6.80 | 17.31 | 26.77 | 4.99 |
| Second Monomer in Unstripped Product, wt. % | — | — | — | — | — | 0.1 |
| Third Monomer in Unstripped Product, | — | — | — | 0.027 | — | — |

TABLE VI A-continued
USE OF ACRYLIC ACID AND/OR ACRYLAMIDE FOR IMPROVED POLYMER/POLYISOCYANATE COMPOSITIONS
(CONTINUOUS BENCH-SCALE UNIT)
PROCESS DATA

| wt. % | | | | | | |
|---|---|---|---|---|---|---|
| TMSN in Unstripped Product, wt. % | — | — | — | — | — | 0.14 |
| Volatiles Collected During Stripping, wt. % (4) | — | 5.82 | 8.78 | 15.02 | 20.43 | 5.34 |
| Conversions, Acrylonitrile, % (5) | — | 87.82 | 70.90 | 22.86 | 14.27 | 78.62 |
| Second Monomer, % (assumed) (5) | — | 100 | 100 | 100 | 100 | 100 |
| Third Monomer, % (assumed) (5) | — | 100 | 100 | 100 | 100 | — |
| Combined, % (5) | — | 88.55 | 72.64 | 27.48 | 100 | 79.90 |
| Combined (from volatiles collected), % (6) | — | 71.84 | 64.29 | 35.45 | 38.37 | 78.39 |

| EXAMPLE | Y | Z | AA | BB | CC (12) |
|---|---|---|---|---|---|
| Blend Identification | ICB-8 | ICB-8 | ICB-9 | ICB-9 | ICB-6 |
| Reaction Temperature, °C. | 125 | 125 | 125 | 125 | 135 |
| Residence Time, min. | 12 | 12 | 12 | 12 | 24 |
| Catalyst | VAZO-64 | VAZO-64 | VAZO-64 | VAZO-64 | VAZO-64 |
| Catalyst Conc. in Feed, wt. % | 0.75 | 0.69 | 0.70 | 0.81 | 1.1 |
| Feed Stream Containing Catalyst | Isocyanate | Isocyanate | Isocyanate | Isocyanate | Isocyanate |
| Monomer Content in Feed, wt. % (1) | 24.09 | 30.64 | 30–30.5 | 31.38 | 33.72 |
| Ratio of Acrylonitrile to Second Monomer/Third Monomer, wt. % | 94/1/5 | 94/1/5 | 94/1/5 | 94/2/4 | 94/2/4 |
| Second Monomer | Acrylic Acid | Acrylic Acid | Acrylic Acid | Acrylic Acid | Acrylic Acid |
| Third Monomer | Acrylamide | Acrylamide | Acrylamide | Acrylamide | Acrylamide |
| Blend Feed Rate, gm/hr (2) | 2108 | 1935 | — | 1841 | 1818 |
| Monomer Feed Rate, gm/hr (3) | 669 | 855 | — | 842 | 925 |
| Product Weight, gm/hr | 2754 | 2766 | — | 2673 | 2714 |
| Material Balance, % | 99.17 | 99.14 | — | 99.63 | 98.94 |
| Stripping (Batch) Temperature, °C. | 90–92 | 90–91 | — | 90 | 90–100 |
| Residual Acrylonitrile in Unstripped Product, wt. % | 4.34 | 5.21 | — | 3.86 | — |
| Second Monomer in Unstripped Product, wt. % | 0.1 | 0.1 | — | — | — |
| Third Monomer in Unstripped Product, wt. % | 0 | 0 | — | — | — |
| TMSN in Unstripped Product, wt. % | 0.19 | 0.20 | — | 0.30 | — |
| Volatiles Collected During Stripping, wt. % (4) | 4.24 | 5.11 | — | 5.60 | 4.76 |
| Conversions, Acrylonitrile, % (5) | 80.99 | 82.07 | — | 86.96 | — |
| Second Monomer, % (assumed) (5) | 100 | 100 | — | 100 | — |
| Third Monomer, % (assumed) (5) | 100 | 100 | — | 100 | — |
| Combined, % (5) | 82.13 | 83.14 | — | 87.74 | — |
| Combined (from volatiles collected), % (6) | 82.39 | 83.32 | — | 82.14 | 86.13 |

(1), (2), (3), (4), (5) and (6) same as in Table IA.
(5) Since conversions of AA and AM were assumed, calculated combined conversion was slightly higher than actual values.
(12) Two-stage run made in continuous bench-scale unit.

TABLE VI B
USE OF ACRYLIC ACID AND/OR ACRYLAMIDE FOR IMPROVED POLYMER/POLYISOCYANATE COMPOSITIONS
(CONTINUOUS BENCH-SCALE UNIT)
PRODUCT DATA

| EXAMPLE | 40 | N | O | P | Q | R |
|---|---|---|---|---|---|---|
| Polyacrylonitrile in Stripped Product by Calc., wt. % (7) | 26.25 | 17.91 | 18.74 | 20.51 | 23.93 | 30.12 |
| Second Polymer in Stripped Product by Calc., wt. % (7) | 0.65 | 0 | 1.91 | 2.31 | 0.71 | 0.75 |
| Third Polymer in Stripped Product by Calc., wt. % (7) | 1.30 | 1.10 | 0 | 0 | 1.42 | 1.50 |
| Total Polymer in Stripped Product by Calc., wt. % (7) | 30.42 | 19.01 | 20.65 | 22.82 | 26.06 | 32.37 |
| Total Polymer by Calc. (from volatiles collected), wt. % (8) | 30.55 | 21.18 | 22.99 | 27.22 | 27.22 | 31.48 |
| FNCO by Calc. (from free monomer analysis), wt. % (9) | 16.32 | 23.61 | 23.14 | 22.50 | 21.46 | 19.62 |
| FNCO by Calc. (from volatiles collected), wt. % (10) | 16.30 | 22.98 | 22.46 | 21.22 | 21.12 | 19.88 |
| FNCO measured, wt. % | 14.59 | 21.28 | 22.67 | 19.99 | 19.19 | 17.70 |
| Viscosity (Brookfield) at 25° C., cps | 7250 | 1788 | 560 | 4800 | 1576 | 2820 |
| Centrifugible Solids, Unstripped, wt. % | 3.40 | 64.39 | 49.26 | 52.39 | 35.40 | 27.50 |
| Top Layer (Clear Layer) Before Tipping, % | 0 | 38 | 54 | 50 | 10 | 6 |
| Appearance of Top Layer | — | Liquid, Dark Brown | Liquid, Dark Brown | Liquid, Dark Brown | Liquid, Dark Brown | Liquid, Dark Brown |
| Centrifugible Solids, Stripped, wt. % | 2.69 | — | — | — | — | — |
| Top Layer (Clear Layer) Before Tipping, % | 0 | 68 | 6 | 4 | 2 | 2 |
| Appearance of Top Layer | No Cake | Cake | Cake | Cake | Cake | Cake |
| Middle Layer, % | 0 | 0 | 82 | 88 | 0 | 0 |
| Bottom Layer, % | 100 | 32 | 12 | 8 | 98 | 98 |
| Filtration Hinderance: (11) | | | | | | |
| 150-Mesh Screen, Time to See Screen, sec. | 90 | 64 | 66 | 92 | 60 | 71 |
| , % Through | 100 | 100 | 100 | 5.83 | 100 | 100 |
| , Solids on Screen, ppm | 82 | 131 | 62 | 3576 | 153 | 136 |
| 325-Mesh Screen, Time to See Screen, sec. | 600 | 300 | 300 | 50 | 300 | 300 |
| , % Through | 68.85 | 71.33 | 68 | 2.5 | 76.5 | 63 |
| , Solids on Screen, ppm | 36 | 51 | 85 | 11680 | 65 | 66 |

TABLE VI B-continued
USE OF ACRYLIC ACID AND/OR ACRYLAMIDE FOR IMPROVED POLYMER/POLYISOCYANATE COMPOSITIONS
(CONTINUOUS BENCH-SCALE UNIT)
PRODUCT DATA

| | | | | | | |
|---|---|---|---|---|---|---|
| 700-Mesh Screen, Time to See Screen, sec. | — | — | — | — | — | — |
| , % Through | — | — | — | — | — | — |
| , Solids on Screen, ppm | — | — | — | — | — | — |

| EXAMPLE | S | T | U | V | W | X |
|---|---|---|---|---|---|---|
| Polyacrylonitrile in Stripped Product by Calc., wt. % (7) | — | 17.48 | 17.54 | 6.15 | 6.02 | 19.06 |
| Second Polymer in Stripped Product by Calc., wt. % (7) | — | 0.42 | 0.53 | 0.57 | 0.90 | 1.55 |
| Third Polymer in Stripped Product by Calc., wt. % (7) | — | 0.84 | 1.06 | 1.14 | 1.80 | 0 |
| Total Polymer in Stripped Product by Calc., wt. % (7) | — | 18.74 | 19.13 | 7.86 | 8.72 | 20.61 |
| Total Polymer by Calc. (from volatiles collected), wt. % (8) | — | 15.77 | 17.33 | 9.70 | 15.98 | 20.46 |
| FNCO by Calc. (from free monomer analysis), wt. % (9) | — | 23.07 | 22.96 | 27.69 | 27.44 | 23.80 |
| FNCO by Calc. (from volatiles collected), wt. % (10) | — | 23.91 | 23.47 | 27.14 | 25.25 | 23.85 |
| FNCO measured, wt. % | — | 22.95 | 21.88 | 25.56 | 23.65 | 22.97 |
| Viscosity (Brookfield) at 25° C., cps | — | 252 | 268 | 3950 | 47450 | 1692 |
| Centrifugible Solids, Unstripped, wt. % | — | 61.77 | 85.86 | 11.99 | 16.57 | 21.30 |
| Top Layer (Clear Layer) Before Tipping, % | — | 38 | 32 | 0 | 0 | 46 |
| Appearance of Top Layer | — | Liquid, Light Yellow | Liquid, Light Yellow | — | — | Liquid, Dark Brown |
| Centrifugible Solids, Stripped, wt. % | — | — | — | 2.62 | 5.10 | — |
| Top Layer (Clear Layer) Before Tipping, % | — | 46 | 32 | 0 | 0 | 2.1 |
| Appearance of Top Layer | — | Cake | Cake | — | — | Hard Cake |
| Middle Layer, % | — | 0 | 60 | — | 0 | 91.5 |
| Bottom Layer, % | — | 54 | 8 | 100 | 100 | 6.4 |
| Filtration Hinderance: (11) | | | | | | |
| 150-Mesh Screen, Time to See Screen, sec. | — | 36 | 60 | 776 | 950 | 40 |
| , % Through | — | 100 | 5 | 100 | 100 | 100 |
| , Solids on Screen, ppm | — | 92 | 1370 | 365 | 111 | 18 |
| 325-Mesh Screen, Time to See Screen, sec. | — | 100 | 100 | 578 | 950 | 1200 |
| , % Through | — | 0.35 | 0.15 | 16.66 | 17.5 | 84.5 |
| , Solids on Screen, ppm | — | 105,333 | 30,233 | 315 | 326 | 53 |
| 700-Mesh Screen, Time to See Screen, sec. | — | — | — | — | — | — |
| , % Through | — | — | — | — | — | — |
| , Solids on Screen, ppm | — | — | — | — | — | — |

| EXAMPLE | Y | Z | AA | BB | CC (12) |
|---|---|---|---|---|---|
| Polyacrylonitrile in Stripped Product by Calc., wt. % (7) | 19.17 | 24.94 | — | 26.71 | — |
| Second Polymer in Stripped Product by Calc., wt. % (7) | 0.25 | 0.32 | — | 0.65 | — |
| Third Polymer in Stripped Product by Calc., wt. % (7) | 1.26 | 1.62 | — | 1.30 | — |
| Total Polymer in Stripped Product by Calc., wt. % (7) | 20.68 | 26.88 | — | 28.66 | — |
| Total Polymer by Calc. (from volatiles collected), wt. % (8) | 20.73 | 26.90 | — | 27.28 | 31.03 |
| FNCO by Calc. (from free monomer analysis), wt. % (9) | 23.17 | 21.36 | — | 20.82 | — |
| FNCO by Calc. (from volatiles collected), wt. % (10) | 23.15 | 21.35 | — | 21.23 | 19.89 |
| FNCO measured, wt. % | 22.22 | 21.89 | — | 19.44 | 17.95 |
| Viscosity (Brookfield) at 25° C., cps | 287 | 670 | — | 2120 | 1603 |
| Centrifugible Solids, Unstripped, wt. % | 10.50 | 31.87 | — | 35.74 | 23.86 |
| Top Layer (Clear Layer) Before Tipping, % | 22 | 34 | — | 8.9 | 0 |
| Appearance of Top Layer | Liquid, Dark Brown | Liquid, Dark Brown | — | Liquid, Dark Brown | — |
| Centrifugible Solids, Stripped, wt. % | — | — | — | — | 5.34 |
| Top Layer (Clear Layer) Before Tipping, % | 6.2 | 7.7 | — | 3.8 | 0 |
| Appearance of Top Layer | Hard Cake | Hard Cake | — | Hard Cake | — |
| Middle Layer, % | 0 | 0 | — | 88.7 | 0 |
| Bottom Layer, % | 93.8 | 92.3 | — | 7.5 | 100 |
| Filtration Hinderance: (11) | | | | | |
| 150-Mesh Screen, Time to See Screen, sec. | 60 | 44 | — | 49 | 75 |
| , % Through | 100 | 100 | — | 100 | 100 |
| , Solids on Screen, ppm | 19 | 17 | — | 65 | 118 |
| 325-Mesh Screen, Time to See Screen, sec. | 1200 | 815 | — | 400 | 600 |
| , % Through | 18 | 45.16 | — | 88 | 82.5 |
| , Solids on Screen, ppm | 219 | 69 | — | 23 | 73 |
| 700-Mesh Screen, Time to See Screen, sec. | — | — | — | — | — |
| , % Through | — | — | — | — | — |
| , Solids on Screen, ppm | — | — | — | — | — |

(7), (8), (9), (10), (11) same as in Table IB.
(12) Two-stage run made in continuous bench-scale unit.

EXAMPLES 41 THROUGH 43

In Examples 41 through 43, comparative Example EE and Runs j through m, the procedure described in regard to Examples 1 through 20 was used except that certain reaction conditions were different as provided in Table VII A below. A process study was carried out to determine the effect of different process technologies on the size and distribution of polymer particles in high solids polymer/polyisocyanate compositions.

The isocyanate/polyol blend (IPOL) used in Example 41, the isocyanate/catalyst/polymer/polyol blend (ICPPB) used in Example 42, the isocyanate/modified polyol blend (IMPB) used in Example 43 and Run j, the isocyanate/polymer/polyol blend (IPB) used in Runs k, l and m, and the isocyanate/catalyst blend (ICB) used in comparative Example EE were prepared in accordance with the procedures described hereinabove.

Examples 41 through 43 illustrate the production of high solids polymer/polyisocyanate compositions having good dispersion characteristics as evidenced by the good filterability of the compositions. The centrifugible solids were also in the desirably low range. The relatively high viscosities of these compositions are the result of the high total polymer content in the polymer/polyisocyanate composition. By reducing the polymer content to a lower concentration when utilizing Isocyanate I, the viscosity of the compositions can be reduced to a more preferably range. The product of Example 41 had an unusually high viscosity because the preparation of this product immediately followed the preparation of a high viscosity product (Run j). Example 41 was repeated and the product had a viscosity of 7090 cps instead of 9800 cps at 25° C.

The relatively high viscosities of Runs j and m and the high viscosity and solids of Run k are likewise attributable to the high total polyme content in the polymer/polyisocyanate compositions. Run 1 illustrates an unsuccessful attempt to prepare a high solids polymer/polyisocyanate composition. The monomer and catalyst content in the feed was set at 43.97 weight percent. The reactor plugged up and Run 1 was not completed.

Comparative Example EE illustrates the production of stable polymer/polyisocyanate composition by the in situ polymerization of acrylonitrile and a very small amount of acrylic acid and acrylamide in Isocyanate I without a stabilizer. Example 42 illustrates the production of a highly stable polymer/polyisocyanate composition by the in situ polymerization of acrylonitrile and a very small amount of acrylic acid and acrylamide in a blend of Isocyanate I and Polymer/Polyol I (stabilizer). As shown by the data of centrifugible solids (unstripped samples), top layer before tipping (unstripped and stripped samples) and appearance of top layer (unstripped and stripped samples), the polymer/polyisocyanate composition of Example 42 is more stable than the polymer/polyisocyanate composition of comparative Example EE.

Electron micrographs showed that the use of modified polyol stabilizers is the most effective in controlling size and distribution of polymer particles. However, any of these process technologies can be successfully employed by varying the concentration of the stabilizer in the polymer/polyisocyanate compositions.

Comparative Example E described hereinabove provides the filterability measurements for the polyisocyanate used in Examples 41 through 43, comparative Example EE and Runs j through m.

TABLE VII A

EFFECT OF PROCESS TECHNOLOGIES ON SIZE AND DISTRIBUTION OF POLYMER PARTICLES IN HIGH SOLIDS POLYMER/POLYISOCYANATE COMPOSITIONS (CONTINUOUS BENCH SCALE UNIT)

PROCESS DATA

| EXAMPLE | 41 | 42 | 43 | j | k | l | m | EE |
|---|---|---|---|---|---|---|---|---|
| Blend Identification | IPOL-24 | ICPPB-2 | IMPB-4 | IPOL-23 | IPB-7 | IPB-7 | IPB-7 | ICB-9 |
| Reaction Temperature, °C. | 135 | 125 | 135 | 135 | 135 | 135 | 135 | 125 |
| Residence Time, min. | 12 | 12 | 12 | 12 | 18 | 18 | 18 | 12 |
| Catalyst | VAZO-64 | VAZO-64 | VAZO-64 | VAZO-64 | VAZO-64 | VAZO-64 | VAZO-64 | VAZO-64 |
| Catalyst Conc. in Feed, wt.% | 1.2 | 0.81 | 1.2 | 1.2 | 1.43 | 1.63 | 1.3 | 0.81 |
| Feed Stream Containing Catalyst | Monomer | Isocyanate | Monomer | Monomer | Monomer | Monomer | Monomer | Isocyanate |
| Monomer Content in Feed, wt.% (1) | 33.54 | 31.18 | 33.88 | 34.11 | 38.36 | 43.97 | 34.80 | 31.38 |
| Ration of Acrylonitrile to Second Monomer/Third Monomer, wt.% | 100/0/0 | 94/2/4 | 100/0/0 | 100/0/0 | 100/0/0 | 100/0/0 | 100/0/0 | 94/2/4 |
| Second Monomer | None | Acrylic Acid | None | None | None | None | None | Acrylic Acid |
| Third Monomer | None | Acrylamide | None | None | None | None | None | Acrylamide |
| Blend Feed Rate, gm/hr (2) | 1886 | 1898 | 1836 | 1827 | 1131 | 1064 | 1229 | 1841 |
| Monomer Feed Rate, gm/hr (3) | 952 | 860 | 941 | 946 | 704 | 835 | 656 | 842 |
| Product Weight, gm/hr | 2782 | 2748 | 2742 | 2790 | 1848 | 1833 | 1820 | 2673 |
| Material Balance, % | 98.03 | 99.64 | 98.74 | 100.61 | 100.71 | 96.52 | 96.55 | 99.63 |
| Stripping (Batch) Temperature, °C. | 90–95 | 90–95 | 90–95 | 90–95 | 90–95 | 90–95 | 90–95 | 90 |
| Residual Acrylonitrile in Unstripped Product, wt.% | 4.97 | 4.18 | 4.99 | 5.22 | 6.51 | — | 4.64 | 3.86 |
| TSMN in Unstripped Product, wt.% | 0.35 | 0.29 | 0.65 | 0.61 | 0.37 | — | 0.33 | 0.30 |
| Volatiles Collected During Stripping, wt.% (4) | 4.46 | 4.38 | 5.20 | 4.20 | 5.16 | — | 4.28 | 5.60 |
| Conversions, Acrylonitrile, % (5) | 84.93 | 85.79 | 84.91 | 84.03 | 82.29 | — | 86.63 | 86.96 |
| Combined, % (5) | 84.93 | 86.64 | 84.90 | 84.03 | 82.29 | — | 86.63 | 87.74 |
| Combined (from volatiles collected), % (6) | 83.09 | 86.07 | 84.07 | 87.22 | 86.02 | — | 87.22 | 82.14 |

(1), (2), (3), (4), (5) and (6) same as in Table IA.

TABLE VII B

EFFECT OF PROCESS TECHNOLOGIES ON SIZE AND DISTRIBUTION OF POLYMER PARTICLES IN HIGH SOLIDS POLYMER/POLYISOCYANATE COMPOSITIONS
(CONTINUOUS BENCH-SCALE UNIT)
PRODUCT DATA

| EXAMPLE | 41 | 42 | 43 | j | k | l | m | EE |
|---|---|---|---|---|---|---|---|---|
| New Polyacrylonitrile in Stripped Product by Calc. wt. % (7) | 28.89 | 26.25 | 29.21 | 29.20 | 32.54 | — | 30.41 | 26.71 |
| Polyacrylonitrile from Feed by Calc., wt. % of Stripped Product (7) | 0 | 2.22 | 0 | 0 | 2.06 | — | 2.14 | 0 |
| Total Polymer in Stripped Product by Calc., wt. % (7) | 28.89 | 30.42 | 29.21 | 29.20 | 34.60 | — | 32.55 | 28.66 |
| Total Polymer by Calc. (from volatiles collected), wt. % (8) | 29.17 | 30.55 | 28.95 | 29.94 | 35.53 | — | 32.70 | 27.28 |
| FNCO by Calc. (from free monomer analysis), wt. % (9) | 16.39 | 16.32 | 16.27 | 16.20 | 15.56 | — | 16.10 | 20.82 |
| FNCO by Calc. (from volatiles collected), wt. % (10) | 16.60 | 16.30 | 16.60 | 16.30 | 15.67 | — | 15.86 | 21.23 |
| FNCO measured, wt. % | 15.14 | 14.59 | 15.38 | 14.42 | 13.92 | — | 14.64 | 19.44 |
| Acidity as HCl, wt. % | 0.010 | — | 0.011 | 0.011 | — | — | — | — |
| Viscosity (Brookfield) at 25° C., cps | 9800 | 7250 | 8080 | 12400 | 988000 | — | 15800 | 2120 |
| Centrifugible Solids, Unstripped, wt. % | 9.48 | 3.40 | 8.83 | 8.04 | 85.42 | — | 6.65 | 35.74 |
| Top Layer (Clear Layer) Before Tipping, % | 0 | 0 | 0 | 0 | 0 | — | 0 | 8.9 |
| Appearance of Top Layer | — | — | — | — | — | — | — | Liquid Dark Brown |
| Centrifugible Solids, Stripped, wt. % | 4.0 | 2.69 | 3.29 | 4.85 | — | — | 3.93 | — |
| Top Layer (Clear Layer) Before Tipping, % | 0 | 0 | 0 | 0 | — | — | 0 | 3.8 |
| Appearance of Top Layer | — | — | — | — | — | — | — | Hard Cake |
| Middle Layer, % | 0 | 0 | 0 | 0 | — | — | 0 | 88.7 |
| Bottom Layer, % | 100 | 100 | 100 | 100 | — | — | 100 | 7.5 |
| Filtration Hinderance (11) | | | | | | | | |
| 150-Mesh Screen, Time to See Screen, sec. | 144 | 90 | 147 | 187 | — | — | 160 | 49 |
| , % Through | 100 | 100 | 100 | 100 | — | — | 100 | 100 |
| , Solids on Screen, ppm | 143 | 82 | 124 | 165 | — | — | 187 | 65 |
| 325-Mesh Screen, Time to See Screen, sec. | 300 | 600 | 240 | 300 | — | — | 131 | 400 |
| , % Through | 38.5 | 68.85 | 26.5 | 40.05 | — | — | 9.5 | 88 |
| , Solids on Screen, ppm | 200 | 36 | 166 | 106 | — | — | 605 | 23 |
| 700-Mesh Screen, Time to See Screen, sec. | — | — | — | — | — | — | — | — |
| , % Through | — | — | — | — | — | — | — | — |
| , Solids on Screen, ppm | — | — | — | — | — | — | — | — |

(7), (8), (9), (10) and (11) same as in Table IB.

EXAMPLES 44 THROUGH 53

In Examples 44 through 53 and Runs n through r, the procedure described in regard to Examples 1 through 20 was used except that certain reaction conditions were different as provided in Table VIII A below. A process study was carried out to study the effects of reaction temperature and catalyst concentration in the preparation of polymer/polyisocyanate compositions.

The isocyanate/polyol/polyol blends (IPB) and isocyanate/catalyst/polymer/polyol blends (ICPPB) used in these Examples and Runs were prepared in accordance with the procedures described hereinabove.

The effects of reaction temperature were studied over the range of 120° C. to 140° C. using a high concentration (1.4 weight percent) and a low concentration (0.6 weight percent) of VAZO-64 catalyst. As shown by the data of Run n, a reaction temperature of 120° C. was too low. Similarly, the catalyst concentrations over the range of 0.6 to 0.78 weight percent were too low for the reaction. (see Runs o, p, and q). The product had extremely high viscosity (112,000 cps at 25° C.) when a catalyst concentration of 0.82 weight percent was used. (See Run r). Thus, as illustrated by Examples 44 through 53 in which highly stable polymer/polyisocyanate compositions were prepared having viscosities in the desirably low range, the working range of reaction temperature was from 123° C. to 140° C. and the working range of catalyst concentration was from 0.87 to 1.4 weight percent.

Run n illustrates an unsuccessful attempt to prepare a stable polymer/polyisocyanate composition because the reaction temperature was too low (120° C). The reactor plugged up and Run n was not completed.

Runs o, p, and q illustrate unsuccessful attempts to prepare stable polymer/polyisocyanate compositions because the catalyst concentration was too low (0.78 wt.%, 0.72 wt.% and 0.60 wt.% respectively). The reactor plugged up and the runs were not completed.

Comparative Example E described hereinabove provides the filterability measurements for the polyisocyanate used in Examples 44 through 53 and Runs n through r.

TABLE VIII A

EFFECT OF REACTION TEMPERATURE AND CATALYST CONCENTRATION IN PREPARATION OF POLYMER/POLYISOCYANATE COMPOSITIONS
(CONTINUOUS BENCH-SCALE UNIT)
PROCESS DATA

| EXAMPLE | 44 | 45 | 46 | 47 | 48 | 49 | 50 | 51 |
|---|---|---|---|---|---|---|---|---|
| Blend Identification | IPB-6 | IPB-6 | IPB-3 | ICPPB-2 | ICPPB-2 | IPB-4 | IPB-4 | ICPPB-3 |
| Reaction Temperature, °C. | 140 | 140 | 135 | 132 | 128 | 125 | 125 | 125 |
| Residence Time, min. | 12 | 12 | 11.4 | 12 | 12 | 12.5 | 12 | 12 |
| Catalyst | VAZO-64 | VAZO-64 | VAZO-64 | VAZO-64 | VAZO-64 | VAZO-64 | VAZO-64 | VAZO-64 |
| Catalyst Conc. in Feed, wt. % | 1.36 | 0.92 | 1.14 | 1.15 | 1.13 | 1.4 | 0.97 | 0.92 |
| Feed Stream Containing Catalyst | Monomer | Monomer | Isocyanate | Monomer | Isocyanate | Monomer | Monomer | Monomer |
| Monomer Content in Feed, wt. % (1) | 23.71 | 24.35 | 22.75 | 24.15 | 23.80 | 24.61 | 23.26 | 23.37 |
| Ratio of Acrylonitrile to | 100/0 | 100/0 | 100/0 | 100/0 | 100/0 | 100/0 | 100/0 | 100/0 |

TABLE VIII A-continued
EFFECT OF REACTION TEMPERATURE AND CATALYST CONCENTRATION IN PREPARATION OF POLYMER/POLYISOCYANATE COMPOSITIONS
(CONTINUOUS BENCH-SCALE UNIT)
PROCESS DATA

| Second Monomer, wt. % | | | | | | | | |
|---|---|---|---|---|---|---|---|---|
| Second Monomer | None | None | None | None | None | None | None | None |
| Blend Feed Rate, gm/hr (2) | 2156 | 2112 | 2241 | 2148 | 2120 | 1991 | 2164 | 2157 |
| Monomer Feed Rate, gm/hr (3) | 670 | 680 | 660 | 684 | 662 | 650 | 656 | 658 |
| Product Weight, gm/hr | 2784 | 2798 | 2888 | 2840 | 2794 | 2630 | 2790 | 2801 |
| Material Balance, % | 98.51 | 100.21 | 99.55 | 100.28 | 100.36 | 99.58 | 98.94 | 99.50 |
| Stripping (Batch) Temperature, °C. | 90–95 | 90–95 | 90–95 | 90–95 | 90–95 | 90–95 | 90–95 | 90–95 |
| Residual Acrylonitrile in Unstripped Product, wt. % | 3.52 | 3.88 | 3.42 | 3.50 | 3.52 | 2.91 | 2.17 | 3.94 |
| Second Monomer in Un-stripped Product wt. % | — | — | — | — | — | — | — | — |
| TMSN in Unstripped Product, wt. % | 0.27 | 0.27 | 0.28 | 0.50 | 0.32 | 0.22 | 0.12 | 0.39 |
| Volatiles Collected During Stripping, wt. % (4) | 3.70 | 4.22 | 3.44 | 2.73 | 2.97 | 2.47 | 3.18 | 3.21 |
| Conversions, Acrylonitrile, % (5) | 84.17 | 83.41 | 85.03 | 84.74 | 85.14 | 87.51 | 88.44 | 83.23 |
| Second Monomer, % (5) | — | — | — | — | — | — | — | — |
| Combined, % (5) | 84.17 | 83.41 | 85.03 | 84.74 | 85.14 | 87.51 | 88.44 | 83.23 |
| Combined (from volatiles collected), % (6) | 83.44 | 81.22 | 84.89 | 88.13 | 87.53 | 89.35 | 85.73 | 86.26 |

| EXAMPLE | 52 | 53 | n | o | p | q | r |
|---|---|---|---|---|---|---|---|
| Blend Identification | IPB-4 | ICPPB-2 | IPB-6 | IPB-6 | IPB-6 | IPB-5 | IPB-5 |
| Reaction Temperature, °C. | 125 | 123 | 120 | 128–133 | 128–135 | 125 | 128–135 |
| Residence Time, min. | 12 | 12 | 12 | 12 | 13 | 12 | 12 |
| Catalyst | VAZO-64 | VAZO-64 | VAZO-64 | VAZO-64 | VAZO-64 | VAZO-64 | VAZO-64 |
| Catalyst Conc. in Feed, wt. % | 0.87 | 1.12 | 1.12 | 0.78 | 0.72 | 0.60 | 0.82 |
| Feed Stream Containing Catalyst | Monomer | Isocyanate | Isocyanate | Isocyanate | Monomer | Isocyanate | Monomer |
| Monomer Content in Feed, wt. % (1) | 23.09 | 23.89 | 23.83 | 23.53 | 24.32 | 23.0 | 24.48 |
| Ratio of Acrylonitrile to Second Monomer, wt. % | 100/0 | 100/0 | 100/0 | 100/0 | 100/0 | 100/0 | 100/0 |
| Second Monomer | None | None | None | None | None | None | None |
| Blend Feed Rate, gm/hr (2) | 2172 | 2122 | 2148 | 2138 | 2072 | 2125 | 2058 |
| Monomer Feed Rate, gm/hr (3) | 652 | 669 | 672 | 658 | 666 | 635 | 667 |
| Product Weight, gm/hr | 2812 | 2767 | — | 2780 | 2518 | — | 2696 |
| Material Balance, % | 99.57 | 99.14 | — | 99.43 | 91.96 | — | 98.94 |
| Stripping (Batch Temperature, °C. | 90–95 | 90–95 | — | 90–95 | 90–95 | — | 90–95 |
| Residual Acrylonitrile in Unstripped Product, wt. % | 2.72 | 3.68 | — | — | — | — | 4.52 |
| Second Monomer in Un-stripped Product wt. % | — | — | — | — | — | — | — |
| TMSN in Unstripped Product, wt. % | 0.35 | 0.40 | — | — | — | — | 0.43 |
| Volatiles Collected During Stripping, wt. % (4) | 3.37 | 3.60 | — | — | — | — | 4.11 |
| Conversions, Acrylonitrile, % (5) | 87.81 | 84.78 | — | — | — | — | 81.10 |
| Second Monomer, % (5) | — | — | — | — | — | — | — |
| Combined, % (5) | 87.81 | 84.78 | — | — | — | — | 81.10 |
| Combined (from volatiles collected), % (6) | 84.83 | 84.93 | — | — | — | — | 82.63 |

(1), (2), (3), (4), (5) and (6) same as in Table IA.

TABLE VIII B
EFFECT OF REACTION TEMPERATURE AND CATALYST CONCENTRATION IN PREPARATION OF POLYMER/POLYISOCYANATE COMPOSITIONS
(CONTINUOUS BENCH-SCALE UNIT)
PRODUCT DATA

| EXAMPLE | 44 | 45 | 46 | 47 | 48 | 49 | 50 | 51 |
|---|---|---|---|---|---|---|---|---|
| New Polyacrylonitrile in Stripped Product by Calc., wt. % (7) | 19.51 | 20.35 | 20.04 | 20.22 | 21.02 | 20.92 | 19.78 | 20.26 |
| Polyacrylonitrile from Feed by Calc., wt. % of Stripped Product (7) | 2.48 | 2.47 | 2.47 | 2.46 | 2.47 | 2.43 | 2.48 | 2.47 |
| Total Polymer in Stripped Product by Calc., wt. % (7) | 21.99 | 22.82 | 22.51 | 22.68 | 23.49 | 23.35 | 22.26 | 22.73 |
| Total Polymer by Calc. (from volatiles collected), wt. % (8) | 21.85 | 21.55 | 22.50 | 23.28 | 23.93 | 23.71 | 22.22 | 23.20 |
| FNCO by Calc. (from free monomer analysis), | 18.43 | 18.34 | 18.50 | 18.33 | 18.28 | 18.15 | 18.52 | 18.50 |

TABLE VIII B-continued
EFFECT OF REACTION TEMPERATURE AND CATALYST CONCENTRATION IN PREPARATION OF POLYMER/POLYISOCYANATE COMPOSITIONS (CONTINUOUS BENCH-SCALE UNIT)
PRODUCT DATA

| wt. % (9) | | | | | | | | |
|---|---|---|---|---|---|---|---|---|
| FNCO by Calc. (from volatiles collected), wt. % (10) | 18.45 | 18.64 | 18.51 | 18.15 | 18.17 | 18.06 | 18.50 | 18.39 |
| FNCO measured, wt. % | 17.73 | 17.66 | 17.64 | 17.42 | 17.37 | 17.31 | 17.73 | 17.61 |
| Viscosity (Brookfield) at 25° C., cps | 2068 | 2204 | 2656 | 3420 | 2976 | 3180 | 3200 | 6670 |
| Centrifugible Solids, Unstripped, wt. % | 1.41 | 1.86 | 1.74 | 4.53 | 2.72 | — | — | — |
| Top Layer (Clear Layer) Before Tipping, % | 0 | 0 | 0 | 0 | 0 | — | — | — |
| Appearance of Top Layer | — | — | — | — | — | — | — | — |
| Centrifugible Solids, Stripped, wt. % | 1.85 | 2.08 | 1.36 | 1.91 | 1.45 | 1.82 | 1.80 | 2.21 |
| Top Layer (Clear Layer) Before Tipping, % | 0 | 0 | 0 | 0 | 0 | 0 | 0 | 0 |
| Appearance of Top Layer | — | — | — | — | — | — | — | — |
| Middle Layer, % | 0 | 0 | 0 | 0 | 0 | 0 | 0 | 0 |
| Bottom Layer, % | 100 | 100 | 100 | 100 | 100 | 100 | 100 | 100 |
| Filtration Hinderance: (11) | | | | | | | | |
| 150-Mesh Screen, Time to See Screen, sec. | 77 | 85 | 500 | 80 | 122 | 97 | 104 | 92 |
| , % Through | 100 | 100 | 100 | 100 | 100 | 100 | 100 | 100 |
| , Solids on Screen, ppm | 128 | 143 | 108 | 254 | 153 | 201 | 164 | 68 |
| 325-Mesh Screen, Time to See Screen, sec. | 120 | 150 | 1000 | 350 | 260 | 140 | 140 | 103 |
| , % Through | 10.5 | 9.66 | 26.66 | 17.0 | 24.5 | 4.0 | 4.5 | 4.0 |
| , Solids on Screen, ppm. | 476 | 280 | 111 | 159 | 180 | 1113 | 811 | 1213 |
| 700-Mesh Screen, Time to See Screen, ppm | — | — | — | — | — | — | — | — |
| , % Through | — | — | — | — | — | — | — | — |
| , Solids on Screen, ppm | — | — | — | — | — | — | — | — |

| EXAMPLE | 52 | 53 | n | o | p | q | r |
|---|---|---|---|---|---|---|---|
| New Polyacrylonitrile in Stripped Product by Calc., wt. % (7) | 20.07 | 21.11 | — | — | — | — | 20.10 |
| Polyacrylonitrile from Feed by Calc., wt. % of Stripped Product (7) | 2.48 | 2.44 | — | — | — | — | 2.48 |
| Total Polymer in Stripped Product by Calc., wt. % (7) | 22.55 | 23.55 | — | — | — | — | 22.58 |
| Total Polymer by Calc. (from volatiles collected), wt. % (8) | 22.00 | 23.52 | — | — | — | — | 22.86 |
| FNCO by Calc. (from free monomer analysis), wt. % (9) | 18.49 | 18.25 | — | — | — | — | 18.60 |
| FNCO by Calc. (from volatiles collected), wt. % (10) | 18.60 | 18.27 | — | — | — | — | 18.51 |
| FNCO measured, wt. % | 17.87 | 17.55 | — | — | — | — | 18.58 |
| Viscosity (Brookfield) at 25° C., cps | 2850 | 3570 | — | — | — | — | 112000 |
| Centrifugible Solids, Unstripped, wt. % | — | 7.36 | — | — | — | — | 16.78 |
| Top Layer (Clear Layer) Before Tipping, % | — | 0 | — | — | — | — | 0 |
| Appearance of Top Layer | — | — | — | — | — | — | — |
| Centrifugible Solids, Stripped, wt. % | 2.32 | 1.44 | — | — | — | — | 100 |
| Top Layer (Clear Layer) Before Tipping, % | 0 | 0 | — | — | — | — | 0 |
| Appearance of Top Layer | — | — | — | — | — | — | — |
| Middle Layer, % | 0 | 0 | — | — | — | — | 0 |
| Bottom Layer, % | 100 | 100 | — | — | — | — | 100 |
| Filtration Hinderance: (11) | | | | | | | |
| 150-Mesh Screen, Time to See Screen, sec. | 102 | 265 | — | — | — | — | 350 |
| , % Through | 100 | 100 | — | — | — | — | 55 |
| , Solids on Screen, ppm | 164 | 35 | — | — | — | — | 473 |
| 325-Mesh Screen, Time to See Screen, sec. | 140 | 285 | — | — | — | — | 14 |
| , % Through | 2.5 | 22 | — | — | — | — | 3.5 |
| , Solids on Screen, ppm | 1080 | 241 | — | — | — | — | 914 |
| 700-Mesh Screen, Time to See Screen, ppm | — | — | — | — | — | — | — |
| , % Through | — | — | — | — | — | — | — |
| , Solids on Screen, ppm | — | — | — | — | — | — | — |

(7), (8), (9), (10) and (11) same as in Table IB.

EXAMPLES 54 THROUGH 56

In Examples 54 through 56 and Run s, the procedure described in regard to Examples 1 through 20 was used except that certain reaction conditions were different as provided in Table IX. A process study was carried out to determine the effects of stripping temperature on a polymer/polyisocyanate compositions properties. The data is limited to batch stripping only.

The isocyanate/polymer/polyol blends (IPB) and isocyanate/catalyst/polymer/polyol blends (ICPPB) used in these Examples and Run were prepared in accordance with the procedures described hereinabove.

Unstripped products were stripped at about 90° C. and 130° C. As the data indicates, products stripped at 130° C. (Example 55 and Run s) had an average higher viscosity than products stripped at about 90° C. (Examples 54 and 56). The increase in viscosity may be attributed mainly to rearrangement of an isocyanate structure—dimerization or trimerization or the like. Filterability and free isocyanate content (FNCO) of the product were not affected. Compared with batch stripping, a continuous stripping system has a very short residence time. Therefore, the product stripped at 130° C. in a continuous stripping system may not have higher viscosity. The suggested stripping temperature in the case of batch stripping ranges from 90° C. to 95° C.

Comparative Example E described hereinabove provides the filterability measurements for the polyisocyanate used in Example 54 through 56 and Run s.

TABLE IX

**EFFECT OF STRIPPING TEMPERATURE ON POLYMER/POLYISOCYANATE COMPOSITIONS
(BATCH-STRIPPING PROCESS)
PRODUCT DATA**

| EXAMPLE | 54 | 55 | 56 | S |
|---|---|---|---|---|
| Blend Identification | ICPPB-3 | IPB-4 | IPB-4 | ICPPB-3 |
| Stripping Temperature, °C. | 92 | 130 | 91 | 130 |
| New Polyacrylonitrile in Stripped Product by Calc., wt. %(7) | 20.26 | 20.92 | 20.92 | 20.26 |
| Polyacrylonitrile from Feed by Calc., wt. % of Stripped Product(7) | 2.47 | 2.43 | 2.43 | 2.47 |
| Total Polymer in Stripped Product by Calc., wt. %(7) | 22.73 | 23.35 | 23.35 | 22.73 |
| Total Polymer by Calc. (from volatiles collected), wt. %(8) | 23.20 | 23.64 | 23.71 | 23.42 |
| FNCO by Calc. (from free monomer analysis), wt. %(9) | 18.50 | 18.15 | 18.15 | 18.50 |
| FNCO by Calc. (from volatiles collected), wt. %(10) | 18.39 | 18.07 | 18.06 | 18.34 |
| FNCO measured, wt.% | 17.61 | 17.10 | 17.31 | 17.32 |
| Viscosity (Brookfield) at 25° C. cps | 6670 | 4400 | 3180 | 11260 |
| Centrifugible Solids, Unstripped, wt. % | — | — | — | — |
| Top Layer (Clear Layer) Before Tipping, % | — | — | — | — |
| Appearance of Top Layer | — | — | — | — |
| Centrifugible Solids, Stripped, wt. % | 2.21 | 2.43 | 1.82 | 4.29 |
| Top Layer (Clear Layer) Before Tipping, % | 0 | 0 | 0 | 0 |
| Appearance of Top Layer | — | — | — | — |
| Middle Layer, % | 0 | 0 | 0 | 0 |
| Bottom Layer, % | 100 | 100 | 100 | 100 |
| Filtration Hinderance: (11) | | | | |
| 150-Mesh Screen, Time to See Screen, sec. | 92 | 97 | 97 | 330 |
| , % Through | 100 | 100 | 100 | 100 |
| , Solids on Screen, ppm | 68 | 114 | 201 | 86 |
| 325-Mesh Screen, Time to See Screen, sec. | 103 | 115 | 140 | 180 |
| , % Through | 4.0 | 5.0 | 4.0 | 5.5 |
| , Solids on Screen, ppm | 1213 | 760 | 1113 | 382 |
| 700-Mesh Screen, Time to See Screen, sec. | — | — | — | — |
| , % Through | — | — | — | — |
| , Solids on Screen, ppm | — | — | — | — |

(7), (8), (9), (10) and (11) same as in Table IB.

EXAMPLES 57 and 58

In Examples 57 and 58 and comparative Example FF, the procedure described in regard to Example 1 through 20 was used except that certain reaction conditions were different as provided in Table XA below. A process study was carried out to evaluate the performance of t-butyl peroctoate as a catalyst in the preparation of polymer/polyisocyanate compositions.

The isocyanate/catalyst blend (ICB) and isocyanate/catalyst/polymer/polyol blends (ICPPB) used in these Examples and comparative Example were prepared in accordance with the procedures described hereinabove.

Examples 57 and 58 illustrate the production of stable polymer/polyisocyanate compositions utilizing TBPO as a catalyst. The relatively high viscosities of these compositions are attributable to the small polymer particle size as shown in an electron micrograph. The smaller polymer particle size results from increased grafting caused by the use of TBPO as a free radical polymerization catalyst. Compared with the use of VAZO-64 catalyst, a lower monomer conversion results from the use of TBPO as a catalyst in the preparation of polymer/polyisocyanate compositions.

Comparative Example FF illustrates that a polymer/polyisocyanate composition containing acrylonitrile homopolymer in Isocyanate I cannot be prepared using TBPO as a catalyst. The reactor plugged up and the run was not completed.

Comparative Example E described hereinabove provides the filterability measurements for the polyisocyanate used in Examples 57 and 58 and comparative Example FF.

TABLE X A

**EVALUATION OF T-BUTYL PEROCTOATE CATALYST IN PREPARATION OF
POLYMER/POLYISOCYANATE COMPOSITIONS
(CONTINUOUS BENCH-SCALE UNIT)
PROCESS DATA**

| EXAMPLE | 57 | 58 | FF |
|---|---|---|---|
| Blend Identification | ICPPB-4 | ICPPB-5 | ICB-10 |
| Reaction Temperature, °C. | 130 | 130 | 130 |
| Residence Time, min. | 12 | 12 | 12 |
| Catalyst | TBPO | TBPO | TBPO |
| Catalyst Conc. in Feed, wt. % | 2.40 | 2.40 | 2.40 |
| Feed Stream Containing Catalyst | Isocyanate | Isocyanate | Isocyanate |
| Monomer Content in Feed, wt. % (1) | 23.67 | 23.59 | — |
| Ratio of Acrylonitrile to Second Monomer, wt. % | 100/0 | 100/0 | 100/0 |
| Second Monomer | None | None | None |
| Blend Feed Rate, gm/hr (2) | 2125 | 2154 | — |
| Monomer Feed Rate, gm/hr (3) | 659 | 665 | — |
| Product Weight, gm/hr | 2776 | 2825 | — |
| Material Balance, % | 99.71 | 100.21 | — |
| Stripping (Batch) Temperature, °C. | 90–95 | 90–95 | — |
| Residual Acrylonitrile in Unstripped Product, wt. % | 5.22 | 5.28 | — |
| Second Monomer in Unstripped Product, wt. % | — | — | — |
| TSMN in Unstripped Product, wt. % | — | — | — |
| Volatiles Collected During Stripping, wt. % (4) | 4.59 | 4.47 | — |

TABLE X A-continued
EVALUATION OF T-BUTYL PEROCTOATE CATALYST IN PREPARATION OF POLYMER/POLYISOCYANATE COMPOSITIONS
(CONTINUOUS BENCH-SCALE UNIT)
PROCESS DATA

| EXAMPLE | 57 | 58 | FF |
|---|---|---|---|
| Conversions, Acrylonitrile, % (5) | 78.01 | 77.57 | — |
| Second Monomer, % (5) | — | — | — |
| Combined, % (5) | 78.01 | 77.57 | — |
| Combined (from volatiles collected), % (6) | 80.61 | 81.05 | — |

(1), (2), (3), (4), (5) and (6) same as in Table IA.

TABLE X B
EVALUATION OF T-BUTYL PEROCTOATE CATALYST IN PREPARATION OF POLYMER/POLYISOCYANATE COMPOSITIONS
(CONTINUOUS BENCH-SCALE UNIT)
PRODUCT DATA

| EXAMPLE | 57 | 58 | FF |
|---|---|---|---|
| New Polyacrylonitrile in Stripped Product by Calc., wt. % (7) | 19.48 | 19.32 | — |
| Polyacrylonitrile from Feed by Calc., wt. % of Stripped Product (7) | 2.44 | 0 | — |
| Total Polymer in Stripped Product by Calc., wt. % (7) | 21.92 | 19.32 | — |
| Total Polymer by Calc. (from volatiles collected), wt. % (8) | 22.42 | 20.01 | — |
| FNCO by Calc. (from free monomer analysis), wt. % (9) | 18.19 | 18.09 | — |
| FNCO by Calc. (from volatiles collected), wt. % (10) | 18.07 | 17.93 | — |
| FNCO measured, wt. % | 17.17 | 16.96 | — |
| Acidity as HCl, wt. % | 0.014 | 0.013 | — |
| Viscosity (Brookfield) at 25° C., cps | 6570 | 7060 | — |
| Centrifugible Solids, Unstripped, wt. % | 8.01 | 4.42 | — |
| Top Layer (Clear Layer) Before Tipping, % | 0 | 0 | — |
| Appearance of Top Layer | — | — | — |
| Centrifugible Solids, Stripped, wt. % | 2.77 | 3.23 | — |
| Top Layer (Clear Layer) Before Tipping, % | 0 | 0 | — |
| Appearance of Top Layer | — | — | — |
| Middle Layer, % | 0 | 0 | — |
| Bottom Layer, % | 100 | 100 | — |
| Filtration Hinderance: (11) | | | |
| 150-Mesh Screen, Time to See Screen, sec. | 600 | 220 | — |
| , % Through | 66.17 | 100 | — |
| , Solids on Screen, ppm | 258 | 46 | — |
| 325-Mesh Screen, Time to See Screen, sec. | 225 | 300 | — |
| , % Through | 10.17 | 18.5 | — |
| , Solids on Screen, ppm | 477 | 284 | — |
| 700-Mesh Screen, Time to See Screen, sec. | — | — | — |
| , % Through | — | — | — |
| , Solids on Screen, sec. | — | — | — |

(7), (8), (9), (10) and (11) same as in Table IB.

EXAMPLES 59 AND 60
Polyurethane Elastomers

Polyurethane elastomers were produced from the polyols, hydroxy-type extenders and the isocyanate reactants, i.e., the polyisocyanate and polymer/polyisocyanates identified in Table XI below. Those ingredients not heretofore described are described as follows:

Polyol VII: A 50/50 wt. blend of ethylene glycol and an adduct of about 2.4 moles ethylene oxide per mole of aniline, the adduct having a theoretical number average molecular weight of about 198 and a hydroxyl number of about 565 and the blend having a theoretical number average molecular weight of about 95 and hydroxyl number of about 1180.

In each case, dibutyltin dilaurate catalyst was used in an amount of 0.01 to 0.03 wt.% based on the total weight of polyol and extender. The polyol, extender and catalyst were mixed and heated at 60° C. for one hour under vacuum to remove dissolved gases. The isocyanate reactant was similarly vacuum stripped of dissolved gases. The ratio of polyol to extender (70/30) was selected on the basis of the hardness desired for the polyurethane. The amount of isocyanate component used is expressed in terms of isocyanate index, i.e., an index of 100 designates that the isocyanate component is used in such amount that provides a number of isocyanate groups equal to the number of hydroxyl groups provided by the amount of polyol-extender blends used. Thus, when a 105 isocyanate index is used, 1.05 equivalent weights of isocyanate component is used per equivalent weight of the polyol-extender blend. An isocyanate index of 105 was used in all Examples.

The preparation of elastomers was carried out by mixing the appropriate amount (e.g., one equivalent weight) of polyol-extender blend containing the catalyst with the appropriate amount of isocyanate component (e.g., 1.05 equivalent weight), stirring under vacuum for about one minute and pouring into a preheated glass mold constructed of two glass pieces and Teflon spacers. The filled glass mold was then heated in an oven at 100° C. for 16 hours to provide the elastomer which was then cut and tested pursuant to the following ASTM methods:

| Test | Procedure |
|---|---|
| Hardness | ASTM 2240 |
| Tensile Strength | ASTM D-412 |
| Elongation | ASTM D-412 |
| Die C Tear | ASTM D-624 |

| Test | Procedure |
|---|---|
| Flex Modulus at 75° F. | ASTM D-790 |
| Izod Impact | ASTM D-256 |
| Multiple | Flex Modulus at −20° F./ Flex Modulus at 158° F. |

Sag—The sag test is used to measure the resistance of RIM urethanes to drooping at elevated temperatures. There is no ASTM designation at the present time. The test involves clamping a sample (usually 1″×6″ varying thickness), so that 4″ is allowed to be unsupported. The clamped samples is then placed in an oven for one hour at 250° F. The heat causes the material to droop. The difference between the height of the unsupported end of the sample before and after the test is called the sag value. Most automotive specifications require a sag value of less than 0.5″ under the conditions noted above. Sag is closely related to the thickness of the sample tested. For accurate results, make all sag specimens the same thickness.

The elastomers produced by Examples 59 and 60 had higher flexural modulii than the comparative elastomer (Example GG) produced from Isocyanate I containing no dispersed polymer particles and stabilizer. The other physical properties of the elastomers of Example 59 and 60 were comparable to the physical properties of the comparative elastomer of Example GG. The polymer/polyisocyanate composition utilized in Example 59 is the reaction product of Example 32 prepared with ICPPPB-1. The polymer/polyisocyanate composition utilized in Example 60 is the reaction product of Example 33 prepared with ICPPPB-2.

TABLE XI
POLYURETHANE ELASTOMERS

| EXAMPLE | 59 | 60 | GG |
|---|---|---|---|
| Isocyanate Component | | | |
| Isocyanate Identification | Product of Example 32 | Product of Example 33 | Isocyanate I |
| Monomer (s) | Acrylontrile | Acrylonitrile | None |
| Monomer ratio | 100/0 | 100/0 | 0 |
| Viscosity | 6400 | 2550 | — |
| Monomer Content | 25.4 | 22.5 | 0 |
| Polymer Content | 28.0 | 22.7 | 0 |
| Calculated NCO No. | 16.1 | 20.5 | — |
| Measured NCO No. | 15.4 | 19.6 | — |
| NCO | 0.7 | 0.9 | — |
| Polyol Component (1) | | | |
| Polyol Identification | Polymer/Polyol I | Polymer Polyol I | — |
| Extender Component (1) | | | |
| Extender Identification | Polyol VII | Polyol VII | — |
| Physical Properties | | | |
| No. Plaques Averaged | 3 | 2 | 2 |
| No. Test Pieces Averaged | 9 | 6 | 6 |
| Shore D Hardness | 84 | 82 | 79 |
| Tensile Strength, psi | 7039 | 5973 | 5605 |
| Ultimate Elongation, % | 77 | 93 | 138 |
| Die "C" Tear, pli | 932 | 821 | 819 |
| Flex Modulus × 10⁻³ | | | |
| at −20° F. | 410 | 356 | 302 |
| at 75° F. | 293 | 253 | 197 |
| at 158° F. | 162 | 144 | 113 |
| 75° F. | 96 | 56 | — |
| Sag (1 hr. at 250° F.) | 0.55 | 0.50 | 0.45 |
| Izod Impact (ft. lbs) | 2.7 | 1.6 | 6.7 |

(1) Polymer/Polyol I was used as the polyol reactant and Polyol VII was used as the extender in a ratio of Polymer/Polyol I to Polyol VII of 70/30.

EXAMPLES 61 AND 62

Polyurethane Foams

High resiliency molded polyurethane foams were produced from polyols and isocyanate reactants, i.e., the polyisocyanates and polymer/polyisocyanates identified in Table XII below. The ingredients of the foam formulations and their amounts are listed in Table XII. Those ingredients not heretofore described are described as follows:

Polyol VIII: A polyether polyol produced by polymerizing propylene oxide and then ethylene oxide using glycerol as a starter. This polyether polyol has an approximate molecular weight of 4500 and a hydroxyl number of approximately 34. It contains about 85.5 percent by weight propylene oxide, 14.5 percent by weight ethylene oxide and about 73 percent primary hydroxyl groups.

Polymer/Polyol II: A polymer/polyol prepared by polymerizing styrene/acrylonitrile in Polyol VIII using VAZO as a catalyst. This polymer/polyol has a hydroxyl number of approximately 28. The polymer contains a one to one weight ratio of styrene to acrylonitrile and comprises 21 percent by weight of the total weight of the polymer/polyol.

Silicone Surfactant I: A high resilience foam surfactant within the scope of U.S. Pat. No. 3,741,917.

Amine Catalyst I: This is a composition consisting of about 70 percent by weight bis-(N,N-dimethylaminoethyl)-ether and about 30 percent by weight dipropylene glycol solvent.

Amine Catalyst II: This is a composition consisting of about 33.3 percent by weight 3-dimethylamino-N,N-dimethylpropionamide and 66.6 percent by weight ethoxylated phenol solvent.

Amine Catalyst III: Diethanolamine.

DABCO-33LV

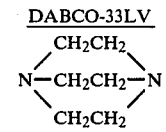

In each case, the surfactant, polymer/polyol and the isocyanate reactant were weighed into an 8-liter, baffled stainless steel beaker and mixed 60 seconds at 2000 rpm with two 2.5 inch 6 blade turbine stirrers (placed 2.5 inches apart at the base of the shaft). Stirring was stopped for fifteen seconds to de-gas and was continued again for five seconds. Water, DABCO-33LV and the amine catalysts were added and mixing continued an additional five seconds. The dibutyltin dilaurate was then added and mixing continued for five seconds. The foaming mixture was poured into a 24″×24″×20″ paper-lined box and foam rise time was recorded. The foam was allowed to cure overnight at room temperature.

The following test procedures were used to measure the physical properties of the foams:

| Test | Procedure |
|---|---|
| Indentation Load Deflection (ILD) | ASTM D1564-69 |
| Compression Set | ASTM D1564-69 |
| Tensile Strength | ASTM D1564-69 |
| Elongation | ASTM D1564-69 |
| Tear Resistance (Strength) | ASTM D1564-69 |
| Air Porosity | A specimen of foam |

-continued

| Test | Procedure |
|---|---|

½ inch in thickness is compressed between two pieces of flanged plastic tubing 2¼ inches in diameter (ID). This assembly then becomes a component in an air flow system. Air at a controlled velocity enters one end of the tubing, flows through the foam specimen and exits through a restriction at the lower end of the assembly. The pressure drop across the foam due to the restriction of air passage is measured by means of an inclined closed manometer. One end of the manometer is connected to the upstream side of the foam and the other end to the downstream side. The flow of air on the upstream side is adjusted to maintain a differential pressure across the specimen of 0.1 inch of water. The air porosity of the foam is reported in units of air flow per unit area of specimen, cubic feet per minute per square foot.

Rise Time   The interval of time from the formation of the complete foam formulation to the attainment of the maximum height of the foam.

Support Factor or Load Ratio is equal to the 65% ILD value divided by the 25% ILD value.

Humid Aging - described in ASTM D-3574, Standard Method of Test for Flexible Urethane Foam.

The results of these tests are listed in Table XII below. The foams produced by Examples 61 and 62 were characterized by improved indentation load deflection (ILD) values compared to foams produced from corresponding polyisocyanates containing no dispersed polymer particles and no stabilizer (see comparative Examples HH and II). ILD is a measure of flex modulus and increased ILD means an increased flex modulus. The data in Table XII also shows no substantial deterioration in the other physical properties of foams made pursuant to Examples 61 and 62.

TABLE XII

| POLYURETHANE FOAMS | | | | |
|---|---|---|---|---|
| EXAMPLE | 61 | 62 | HH | II |
| Formulations, pbw | | | | |
| Isocyanate (product of Example 18), 103 Index (1) | 55.2 | — | — | — |
| Isocyanate TDI, 103 Index | — | — | 32.9 | — |
| Isocyanate (product of Example 19), 103 Index (2) | — | 54.6 | — | — |
| Isocyanate V, 103 Index | — | — | — | 33.4 |
| Polymer/Polyol II | 100 | 100 | 100 | 100 |
| Water | 2.6 | 2.6 | 2.6 | 2.6 |
| Amine Catalyst I | 0.08 | 0.10 | 0.08 | 0.10 |
| Amine Catalyst I 0.08 | | 0.10 | 0.08 | 0.10 |
| Amine Catalyst II | — | 0.30 | — | 0.30 |
| Amine Catalyst III | 0.7 | — | 0.7 | — |
| DABCO-33LV | 0.30 | 0.35 | 0.30 | 0.35 |
| Dibutyltin dilaurate | 0.015 | 0.015 | 0.015 | 0.015 |
| Silicone Surfactant I | 1.2 | 1.5 | 1.2 | 1.5 |
| Mold Exit Time, secs. | 51 | 64 | 40 | 45 |
| Physical Properties | | | | |
| Density, core, lb./ft.$^3$ | 3.01 | 3.12 | 2.53 | 2.60 |
| Porosity, ft.$^3$/min./ft.$^2$ | 22/ 24 | 16 | 14 | |
| Resiliency, % ball rebound | 63 | 64 | 60 | 60 |
| ILD (lb./50 in.$^2$) | | | | |
| 25% | 63.9 | 58.5 | 40.4 | 40.7 |
| 65% | 165.5 | 156.0 | 102.0 | 105.0 |
| 25% Return, % | 83.2 | 83.0 | 81.7 | 82.8 |
| Support Factor | 2.59 | 2.67 | 2.52 | 2.58 |
| Tensile Strength, lb./in.$^2$ | 31.1 | 26.0 | 24.5 | 20.1 |
| Elongation, % | 142/ 129 | 167 | 134 | |
| Tear Resistance, lb./in. | 2.34 | 2.15 | 2.54 | 2.00 |
| 75% Compression Set, $C_d$, % | 6.9 | 7.0 | 10.2 | 9.1 |
| Humid Aging (5 hrs. at 120° C.) | | | | |
| 50% Compression Set, $C_d$, % | 13.8 | 18.3 | 15.8 | 24.3 |

TABLE XII-continued

| POLYURETHANE FOAMS | | | | |
|---|---|---|---|---|
| EXAMPLE | 61 | 62 | HH | II |
| 50% CLD Load Loss, % | 29.2 | 32.8 | 27.4 | 28.9 |

(1) The polymer/polyisocyanate composition utilized in Example 61 is the reaction product of Example 18 prepared with IPOL-13.
(2) The polyisocyanate composition utilized in Example 62 is the reaction product of Example 19 prepared with IPOL-14.

What is claimed is:

1. A polymer/polyisocyanate composition comprising:
   (1) a major amount of a first organic polyisocyanate;
   (2) a minor amount of a first polymer of at least one ethylenically unsaturated monomer stably dispersed in said polyisocyanate; and
   (3) a minor amount of a stabilizer selected from the group consisting of:
      (a) a polyoxyalkylene polyol having a number average molecular weight of at least 4000, and
      (b) an isocyanato terminated prepolymer formed by reacting said polyol and a second organic polyisocyanate with the proviso that the isocyanato terminated prepolymer and the first organic polyisocyanate are present in a relative amount that provides greater than 25 equivalents of isocyanato groups per equivalent of hydroxyl groups.

2. A composition as claimed in claim 1 wherein the polyol contains stably dispersed therein a minor amount of a second polymer of at least one ethylenically unsaturated monomer.

3. A composition as claimed in claim 1 wherein the polyol contains an ester group.

4. A composition as claimed in claim 1 wherein the stabilizer is a polyoxalkylene polyol selected from the group consisting of:
   (i) a polypropylene oxide diol made from propylene oxide and dipropylene glycol and having a theoretical number average molecular weight of about 4000 and a hydroxyl number of about 27.9;
   (ii) a polypropylene oxide-polyethylene oxide triol made from propylene and ethylene oxides and glycerine and having a theoretical number average molecular weight of about 4950 and a hydroxyl number of about 36.2, wherein the alkylene oxide units are present primarily as blocks and the end units are substantially all ethylene oxide units, i.e., the ethylene oxide is used to cap the triol; based on its total weight, this triol contains about 14 weight percent ethyleneoxy units;
   (iii) a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units;
   (iv) a polypropylene oxide-polyethylene oxide polyol made from propylene oxide and ethylene oxide and an 80/20 blend by weight of sorbitol and glycerine said polyol having a theoretical number average molecular weight of about 10,8000 and a hydroxyl number of about 29.55, wherein the alkylene oxide units are present primarily in blocks, and the end units are substantially all ethylene oxide units, i.e., the ethylene oxide is used to cap the polyol; the polyol contains about 8.6 weight percent ethyleneoxy units based on the total polyol weight.

5. A composition as claimed in claim 1 wherein the stabilizer is an isocyanato terminated prepolymer selected from the group consisting of:
(i) a prepolymer of about 60 parts by weight of a liquid 4,4'-diphenylmethylene diisocyanate modified with carbodiimide lineages and having a calculated equivalent weight of 144 and a free isocyanato content of 29.2 weight percent and about 40 parts by weight of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units, said prepolymer having a free isocyanato content of about 16.39 weight percent and a Brookfield viscosity of 1110 cps at 25° C.;
(ii) a prepolymer of about 60 parts by weight of a polymeric 4,4'-diphenylmethylene diisocyanate having a calculated equivalent weight of about 140 and a free isocyanato content of 30 weight percent and about 40 parts by weight of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units, said prepolymer having a free isocyanato content of about 17.04 weight percent and a Brookfield viscosity of 1424 cps at 25° C.;
(iii) a blend of equal parts by weight of:
   (a) a prepolymer of about 60 parts by weight of a polymeric 4,4'-diphenylmethylene diisocyanate having a calculated equivalent weight of about 140 and a free isocyanato content of about 30 weight percent and about 40 parts by weight of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units; and
   (b) a polymeric 4,4'-diphenylmethylene diisocyanate having a calculated equivalent weight of about 140 and a free isocyanato content of about 30 weight percent;
said blend having a free isocyanato content of about 21.95 weight percent and a Brookfield viscosity of 1570 cps at 25° C.

6. A composition as claimed in claim 2 wherein the stabilizer is a polymer/polyol containing about 16 weight percent polyacrylonitrile polymerized is a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units.

7. A composition as claimed in claim 2 wherein the stabilizer is a polymer/prepolymer selected from the group consisting of:
(i) a polymer/prepolymer containing about 18 weight percent of polyacrylonitrile polymerized in a prepolymer of about 60 parts by weight of a polymeric 4,4'-diphenylmethylene diisocyanate having a calculated equivalent weight of about 140 and a free isocyanato content of about 30 weight percent and about 40 parts by weight of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units, said polymer/prepolymer having a free isocyanato content of about 12.94 weight percent and a Brookfield viscosity of 9340 cps at 25° C.;
(ii) a polymer/prepolymer containing about 17.35 weight percent of polyacrylonitrile polymerized in a prepolymer of about 60 parts by weight of a liquid 4,4'-diphenylmethylene diisocyanate modified with carbodiimide linkages and having a calculated equivalent weight of 144 and a free isocyanato content of 29.2 weight percent and about 40 parts by weight of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units, said polymer/prepolymer having a free isocyanato content of about 12.59 weight percent and a Brookfield viscosity of 9400 cps at 25° C.;
(iii) a blend of:
   (a) about 30 parts by weight of a polymeric 4,4'-diphenylmethylene diisocyanate having a calculated equivalent weight of about 140 and a free isocyanato content of about 30 weight percent,
   (b) about one part by weight of azo-bis-isobutyronitrile, and
   (c) about 70 parts by weight of a polymer/prepolymer containing 60 parts by weight of a polymeric 4,4'-diphenylmethylene diisocyanate having a calculated equivalent weight of about 140 and a free isocyanato content of about 30 weight percent and about 40 parts by weight of a polymer/polyol containing about 16 weight percent of polyacrylonitrile polymerized in a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units, said polymer/polyol having a hydroxyl number of 22.09 and a Brookfield viscosity of 3100 cps at 25° C., said blend (iii) having a free isocyanato content of about 20.91 weight percent and a Brookfield viscosity of 590 cps at 25° C.; and (iv) a blend of:
  (a) about 70 parts by weight of a polymeric 4,4'-diphenylmethylene diisocyanate having a calculated equivalent weight of about 140 and a free isocyanato content of about 30 weight percent,
  (b) about 30 parts by weight of a polymer/prepolymer containing 60 parts by weight of a polymeric 4,4'-diphenylmethylene diisocyanate having a calculated equivalent weight of about 140 and a free isocyanato content of about 30 weight percent and about 40 parts by weight of a polymer/polyol containing about 16 weight percent of polyacrylonitrile polymerized in a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units, said blend (iv) having a free isocyanato content of about 25.95 weight percent and a Brookfield viscosity of 155 cps at 25° C.

8. A composition as claimed in claim 3 wherein the stabilizer is a modified polyol containing an ester group selected from the group consisting of:

(i) a polyol adduct of 0.5 mole of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units and one mole of Maleic anhydride, said adduct having an acid number of 7.23 mg KOH/gm and a Brookfield viscosity of 2068 cps at 25° C.;

(ii) a polyol adduct of 0.5 mole of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units and one mole of maleic anhydride, said adduct having an acid number of 7.77 mg KOH/gm and a Brookfield viscosity of 2068 cps at 25° C.;

(iii) a polyol adduct of 0.5 mole of a polypropylene oxide-polyethylene oxide triol made from propylene and ethylene oxides and glycerine and having a theoretical number average molecular weight of about 4950 and a hydroxyl number of about 36.2, wherein the alkylene oxide units are present primarily as blocks and the end units are substantially all ethylene oxide units, i.e., the ethylene oxide is used to cap the triol; based on its total weight, this triol contains about 14 weight percent ethyleneoxy units and one mole of maleic anhydride, said adduct having an acid number of 12.51 mg KOH/gm and a Brookfield viscosity of 1172 cps at 25° C.;

(iv) a polyol adduct of 0.5 mole of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units and one mole of maleic anhydride, said adduct having an acid number of 13.09 mg KOH/gm and a Brookfield viscosity of 2492 cps at 25° C.; and (v) a polyol adduct of 0.5 mole of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units and one mole of succinic anhydride, said adduct having an acid number of 13.7 mg KOH/gm and a Brookfield viscosity of 2850 cps at 25° C.

9. A composition as claimed in claim 1 wherein the polymer is polyacrylonitrile homopolymer.

10. A composition as claimed in claim 1 wherein the polymer is a copolymer of acrylonitrile and a monomer selected from the group consisting of acrylamide, acrylic acid, methyl methacrylate, vinylidene chloride and styrene.

11. A composition as claimed in claim 1 wherein the polymer is a terpolymer of acrylonitrile, acrylic acid and acrylamide.

12. A composition as claimed in claim 2 wherein the first polymer is polyacrylonitrile homopolymer.

13. A composition as claimed in claim 2 wherein the first polymer is a copolymer of acrylonitrile and a monomer selected from the group consisting of acrylamide, acrylic acid, methyl methacrylate, vinylidene chloride and styrene.

14. A composition as claimed in claim 2 wherein the first is a terpolymer of acrylonitrile, acrylic acid and acrylamide.

15. A composition as claimed in claim 3 wherein the polymer is polyacrylonitrile homopolymer.

16. A composition as claimed in claim 3 wherein the polymer is a copolymer of acrylonitrile and a monomer selected from the group consisting of acrylamide, acrylic acid, methyl methacrylate, vinylidene chloride and styrene.

17. A composition as claimed in claim 3 wherein the polymer is a terpolymer of acrylonitrile, acrylic acid and acrylamide.

18. A composition as claimed in claim 2 wherein the second polymer is polyacrylonitrile homopolymer.

19. A composition as claimed in claim 1 wherein the first organic polyisocyanate is selected from the group consisting of:
   (i) a polymeric 4,4'-diphenylmethylene diisocyanate having a calculated equivalent weight of about 140 and a free isocyanato content of about 30 weight percent;
   (ii) a liquid 4,4'-diphenylmethylene diisocyanate modified with carbodiimide linkages and having a calculated equivalent weight of 144 and a free isocyanato content of 29.2 weight percent;
   (iii) a polymeric 4,4'-diphenylmethylene diisocyanate having a calculated equivalent weight of about 140 and a free isocyanato content of 30.06 weight percent;
   (iv) a polymeric 4,4'-diphenylmethylene diisocyanate having a calculated equivalent weight of about 135 and a free isocyanato content of 31.5 weight percent; and
   (v) a blend of about 80 parts by weight of tolylene diisocyanates and 20 parts by weight of a polymeric 4,4'-diphenylemethylene diisocyanate having a calculated equivalent weight of about 133 and a free isocyanato content of 31.5 weight percent; and
   (vi) tolylene diisocyanate.

20. A composition as claimed in claim 2 wherein the first organic polyisocyanate is selected from the group consisting of the organic polyisocyanates of groups
   (I) a polymeric 4,4'-diphenylmethylene diisocyanate having a calculated equivalent weight of about 140 and a free isocyanato content of about 30 weight percent;
   (II) a liquid 4,4'-diphenylmethylene diisocyanate modified with carbodiimide linkages and having a calculated equivalent weight of 144 and a free isocyanato content of 29.2 weight percent;
   (III) a polymeric 4,4'-diphenylmethylene diisocyanate having a calculated equivalent weight of about 140 and a free isocyanato content of 30.06 weight percent;
   (IV) a polymeric 4,4'-diphenylmethylene diisocyanate having a calculated equivalent weight of about 135 and a free isocyanato content of 31.5 weight percent;
   (V) a blend of about 80 parts by weight of tolylene diisocyanates and 20 parts by weight of a polymeric 4,4'-diphenylmethylene diisocyanate having a calculated equivalent weight of about 133 and a free isocyanato content of 31.5 weight percent;
   (VI) tolylene diisocyanate.

21. A composition as claimed in claim 3 wherein the first organic polyisocyanate is selected from the group consisting of the organic polyisocyanates of groups
   (I) a polymeric 4,4'-diphenylmethylene diisocyanate having a calculated equivalent weight of about 140 and a free isocyanato content of about 30 weight percent;
   (II) a liquid 4,4'-diphenylmethylene diisocyanate modified with carbodiimide linkages and having a calculated equivalent weight of 144 and a free isocyanato content of 29.2 weight percent;
   (III) a polymeric 4,4'-diphenylmethylene diisocyanate having a calculated equivalent weight of about 140 and a free isocyanato content of 30.06 weight percent;
   (IV) a polymeric 4,4'-diphenylmethylene diisocyanate having a calculated equivalent weight of about 135 and a free isocyanato content of 31.5 weight percent;
   (V) a blend of about 80 parts by weight of tolylene diisocyanates and 20 parts by weight of a polymeric 4,4'-diphenylemethylene diisocyanate having a calculated equivalent weight of about 133 and a free isocyanato content of 31.5 weight percent;
   (VI) tolylene diisocyanate.

22. A composition as claimed in claim 1 wherein the second organic polyisocyanate is selected from the group consisting of the organic polyisocyanates of groups
   (I) a polymeric 4,4'-diphenylmethylene diisocyanate having a calculated equivalent weight of about 140 and a free isocyanato content of about 30 weight percent; and
   (II) a liquid 4,4'-diphenylmethylene diisocyanate modified with carbodiimide linkages and having a calculated equivalent weight of 144 and a free isocyanato content of 29.2 weight percent.

23. A process for preparing a polymer/polyisocyanate composition which is convertible by reaction with a poly(active hydrogen organic compound to a polyurethane product comprising polymerizing in situ a minor amount of at least one ethylenically unsaturated monomer forming a first polymer in a major amount of a first organic polyisocyanate in the presence of an effective amount of a free radical catalyst and a minor amount of a stabilizer selected from the group consisting of (a) a polyoxyalkylene polyol having a number average molecular weight of at least 4000 and (b) an isocyanato terminated prepolymer formed by reacting said polyol and second organic polyisocyanate with the proviso that the isocyanato terminated prepolymer and the first organic polyisocyanate are present in a relative amount that provides greater than 25 equivalents of isocyanato groups per equivalent of hydroxyl groups, at a temperature ranging from about 70° C. to about 140° C. to form said composition, said stabilizer in an effective amount improving the affinity of the polymer particles for said first organic polyisocyanate and minimizing agglomeration of said polymer particles in said first organic polyisocyanate to provide a stable dispersion of the polymer particles in said first organic polyisocyanate.

24. A process as claimed in claim 23 wherein the first organic polyisocyanate and the stabilizer are added in the form of a blend.

25. A process as claimed in claim 23 wherein the first organic polyisocyanate, the stabilizer and the free radical catalyst are added in the form of a blend.

26. A process as claimed in claim 23 wherein the polyol contains stably dispersed therein a minor amount of a second polymer of at least one ethylenically unsaturated monomer.

27. A process as claimed in claim 23 wherein the polyol contains an ester group.

28. A process as claimed in claim 26 wherein the first organic polyisocyanate and the stabilizer are added in the form of a blend.

29. A process as claimed in claim 26 wherein the first organic polyisocyanate, the stabilizer and the free radical catalyst are added in the form of a blend.

30. A process as claimed in claim 27 wherein the first organic polyisocyanate and the stabilizer are added in the form of a blend.

31. A process as claimed in claim 27 wherein the first organic polyisocyanate, the stabilizer and the free radical catalyst are added in the form of a blend.

32. A process as claimed in claim 24 wherein the stabilizer is a polyoxalkylene polyol selected from the group consisting of:
   (i) a polypropylene oxide diol made from propylene oxide and dipropylene glycol and having a theoretical number average molecular weight of about 4000 and a hydroxyl number of about 27.9;
   (ii) a polypropylene oxide-polyethylene oxide triol made from propylene and ethylene oxides and glycerine and having a theoretical number average molecular weight of about 4950 and a hydroxyl number of about 36.2, wherein the alkylene oxide units are present primarily as blocks and the end units are substantially all ethylene oxide units, i.e., the ethylene oxide is used to cap the triol; based on its total weight, this triol contains about 14 weight percent ethyleneoxy units.
   (iii) a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units;
   (iv) a polypropylene oxide-polyethylene oxide polyol made from propylene oxide and ethylene oxide and an 80/20 blend by weight of sorbitol and glycerine said polyol having a theoretical number average molecular weight of about 10,800 and a hydroxyl number of about 29.55 wherein the alkylene oxide units are present primarily in blocks, and the end units are substantially all ethylene oxide units, i.e. the ethylene oxide is used to cap the polyol; the polyol contains about 8.6 weight percent ethyleneoxy units based on the total polyol weight.

33. A process as claimed in claim 24 wherein the stabilizer is an isocyanate terminated prepolymer selected from the group consisting of:
   (i) a prepolymer of about 60 parts by weight of a liquid 4,4'-diphenylmethylene diisocyanate modified with carboniimide lineages and having a calculated equivalent weight of 144 and a free isocyanato content of 29.2 weight percent and about 40 parts by weight of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units, said prepolymer having a free isocyanato content of about 16.39 weight percent and a Brookfield viscosity of 1110 cps at 25° C.;
   (ii) a prepolymer of about 60 parts by weight of a polymeric 4,4'-diphenylmethylene diisocyanate having a calculated equivalent weight of about 140 and a free isocyanato content of 30 weight percent and about 40 parts by weight of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units, said prepolymer having a free isocyanato content of about 17.04 weight percent and a Brookfield viscosity of 1424 cps at 25° C.;
   (iii) a blend of equal parts by weight of:
      (a) a prepolymer of about 60 parts by weight of a polymeric 4,4'-diphenylmethylene diisocyanate having a calculated equivalent weight of about 140 and a free isocyanato content of about 30 weight percent and about 40 parts by weight of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units; and
      (b) a polymeric 4,4'-diphenylmethylene diisocyanate having a calculated equivalent weight of about 140 and a free isocyanato content of about 30 weight percent;
   said blend having a free isocyanato content of about 21.95 weight percent and a Brookfield viscosity of 1570 cps at 25° C.

34. A process as claimed in claim 27 wherein the stabilizer is a polymer/polyol containing about 16 weight percent polyacrylonitrile polymerized in a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units.

35. A process as claimed in claim 27 wherein the stabilizer is a polymer/prepolymer selected from the group consisting of:
   (i) a polymer/prepolymer containing about 18 weight percent of polyacrylonitrile polymerized in a prepolymer of about 60 parts by weight of a polymeric 4,4'-diphenylmethylene diisocyanate having a calculated equivalent weight of about 140 and a free isocyanato content of about 30 weight percent and about 40 parts by weight of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units, said polymer/prepolymer having a free isocyanato content of about 12.94 weight percent and a Brookfield viscosity of 9340 cps at 25° C.;

(ii) a polymer/prepolymer containing about 17.35 weight percent of polyacrylonitrile polymerized in a prepolymer of about 60 parts by weight of a liquid 4,4'-diphenylmethylene diisocrynate modified with carbodiimide linkages and having a calculated equivalent weight of 144 and a free isocyanato content of 29.2 weight percent and about 40 parts by weight of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units, said polymer/prepolymer having a free isocyanato content of about 12.59 weight percent and a Brookfield viscosity of 9400 cps at 25° C.;

(iii) a blend of:
  (a) about 30 parts by weight of a polymeric 4,4'-diphenylmethylene diisocyanate having a calculated equivalent weight of about 140 and a free isocyanato content of about 30 weight percent,
  (b) about one part by weight of azo-bis-isobutyronitrile, and
  (c) about 70 parts by weight of a polymer/prepolymer containing 60 parts by weight of a polymeric 4,4'-diphenylmethylene diisocyanate having a calculated equivalent weight of about 140 and a free isocyanato content of about 30 weight percent and about 40 parts by weight of a polymer/polyol containing about 16 weight percent of polyacrylonitrile polymerized in a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e, the ethylene oxide is used to cap the triol; based on its total weight, this triol contains about 14 weight percent ethyleneoxy units, said polymer/polyol having a hydroxyl number of 22.09 and a Brookfield viscosity of 3100 cps at 25° C., said blend (iii) having a free isocyanato content of about 20.91 weight percent and a Brookfield viscosity of 590 cps at 25° C.; and (iv) a blend of:
  (a) about 70 parts by weight of a polymeric 4,4'-diphenylmethylene diisocyanate having a calculated equivalent weight of about 140 and a free isocyanato content of about 30 weight percent,
  (b) about 30 parts by weight of a polymer/prepolymer containing 60 parts by weight of a polymeric 4,4'-diphenylmethylene diisocyanate having a calculated equivalent weight of about 140 and a free isocyanato content of about 30 weight percent and about 40 parts by weight of a polymer/polyol containing about 16 weight percent of polyacrylonitrile polymerized in a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units, said blend (iv) having a free isocyanato content of about 25.95 weight percent and a Brookfield viscosity of 155 cps at 25° C.

36. A process as claimed in claim 28 wherein the stabilizer is modified polyol containing an ester group selected from the group consisting of:

(i) a polyol adduct of 0.5 mole of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units and one mole of Maleic anhydride, said adduct having an acid number of 7.23 mg KOH/gm and a Brookfield viscosity of 2068 cps at 25° C.;

(ii) a polyol adduct of 0.5 mole of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e. the ethylene oxide is used to cap the triol; based on its total weight, this triol contains about 14 weight percent ethyleneoxy units and one mole of maleic anhydride, said adduct having an acid number of 7.77 mg KOH/gm and a Brookfield viscosity of 2068 cps at 25° C.;

(iii) a polyol adduct of 0.5 mole of a polypropylene oxide-polyethylene oxide triol made from propylene and ethylene oxides and glycerine and having a theoretical number average molecular weight of about 4950 and a hydroxyl number of about 36.2, wherein the alkylene oxide units are present primarily as blocks and the end units are substantially all ethylene oxide units, i.e. the ethylene oxide is used to cap the triol; based on its total weight, this triol contains about 14 weight percent ethyleneoxy units and one mole of maleic anhydride, said adduct having an acid number of 12.51 mg KOH/gm and a Brookfield viscosity of 1172 cps at 25° C.;

(iv) a polyol adduct of 0.5 mole of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units and one mole of maleic anhydride, said adduct having an acid number of 13.09 mg KOH/gm and a Brookfield viscosity of 2492 cps at 25° C.; and (v) a polyol adduct of 0.5 mole of a polypropylene oxide-polyethylene oxide triol made from propylene and ethylene oxides and glycerine and having a theoretical number average molecular weight of about 6000 and a hydroxyl number of about 28.09, wherein the alkylene oxide units are present primarily in blocks and the end units are substantially all ethylene oxide units, i.e., the ethylene oxide is used to cap the triol; based on its total weight, this triol contains about 14 weight percent ethyleneoxy units and one mole of succinic anhydride, said adduct having an acid number of 13.7 mg KOH/gm and a Brookfield viscosity of 2850 cps at 25° C.

37. A process as claimed in claim 23 wherein the free radical catalyst is 2,2'-azo-bis-isobutyronitrile.

38. A process as claimed in claim 23 wherein the free radical catalyst is tert-butyl peroctoate.

39. A process as claimed in claim 24 wherein the free radical catalyst is benzoyl peroxide.

40. A method for producing a polyurethane elastomer by reacting a mixture comprising (a) a polymer/polyisocyanate composition as claimed in claim 1 and (b) a polyol(active hydrogen) organic compound, in the presence of (c) a catalyst for the reaction of (a) and (b) to produce the polyurethane.

41. A method for producing a polyurethane elastomer by reacting a mixture comprising (a) a polymer/polyisocyanate composition as claimed in claim 2 and (b) a poly(active hydrogen) organic compound, in the presence of (c) a catalyst for the reaction of (a) and (b) to produce the polyurethane.

42. A method for producing a polyurethane elastomer by reacting a mixture comprising (a) a polymer/polyisocyanate composition as claimed in claim 3 and (b) a poly (active hydrogen) organic compound, in the presence of (c) a catalyst for the reaction of (a) and (b) to produce the polyurethane.

43. A method for producing a polyurethane foam by reacting and foaming a mixture comprising (a) the polymer/polyisocyanate composition claimed in claim 1, (b) a poly (active hydrogen) organic compound, (c) a catalyst for the reaction of (a) and (b) to produce the polyurethane, (d) a blowing agent and (e) a foam stabilizer.

44. A method for producing a polyurethane foam by reacting and foaming a mixture comprising (a) the polymer/polyisocyanate composition claimed in claim 2, (b) a poly (active hydrogen) organic compound, (c) a catalyst for the reaction of (a) and (b) to produce the polyurethane, (d) a blowing agent and (e) a foam stabilizer.

45. A method for producing a polyurethane foam by reacting and foaming a mixture comprising (a) the polymer/polyisocyanate composition claimed in claim 3, (b) a poly (active hydrogen) organic compound), (c) a catalyst for the reaction of (a) and (b) to produce the polyurethane, (d) a blowing agent and (e) a foam stabilizer.

46. The polyurethane elastomer as claimed in claim 40.

47. The polyurethane elastomer as claimed in claim 41.

48. The polyurethane elastomer as claimed in claim 42.

49. The polyurethane foam as claimed in claim 43.

50. The polyurethane foam as claimed in claim 44.

51. The polyurethane foam as claimed in claim 45.

* * * * *